United States Patent [19]
Christopher et al.

[11] Patent Number: 5,805,779
[45] Date of Patent: Sep. 8, 1998

[54] PROGRAMMABLE HAND HELD LABELER

[75] Inventors: Amy S. Christopher, Miamisburg; Donald A. Morrison, Dayton; Mark W. Roth, Miamisburg; Rex D. Watkins, Franklin, all of Ohio

[73] Assignee: Monarch Marking Systems, Inc., Dayton, Ohio

[21] Appl. No.: 763,247

[22] Filed: Dec. 10, 1996

Related U.S. Application Data

[62] Division of Ser. No. 482,152, Jun. 8, 1995, Pat. No. 5,594,838, which is a division of Ser. No. 858,703, Mar. 27, 1992, Pat. No. 5,483,624.

[51] Int. Cl.⁶ ........................................... G06K 15/00
[52] U.S. Cl. ................................. 395/115; 395/112
[58] Field of Search ............................. 395/112, 113, 395/114, 115, 116, 101, 117, 834, 830, 872, 874, 876; 347/171

[56] References Cited

U.S. PATENT DOCUMENTS

| | | |
|---|---|---|
| 4,652,317 | 3/1987 | Seestrom . |
| 4,734,710 | 3/1988 | Sato et al. ............................. 347/171 |
| 5,075,874 | 12/1991 | Steeves et al. ......................... 395/112 |
| 5,108,207 | 4/1992 | Isebe et al. ............................ 395/115 |

FOREIGN PATENT DOCUMENTS

| | | |
|---|---|---|
| 0 208 203 | 1/1987 | European Pat. Off. . |
| 0 209 752 | 1/1987 | European Pat. Off. . |
| 0 430 609 A1 | 6/1991 | European Pat. Off. . |

*Primary Examiner*—Arthur G. Evans
*Attorney, Agent, or Firm*—McAndrews, Held & Malloy, Ltd.

[57] ABSTRACT

A hand held labeler is programmable to operate in accordance with a sequence of commands forming an application program that is downloaded to the labeler and stored in a random access memory. Each command is associated with a command routine selected from a set of command routines that is stored in a read only memory. The commands of the application program and associated command routines are executed by a microprocessor of the labeler to perform flexible data collection, data manipulation and label printing operations.

8 Claims, 48 Drawing Sheets

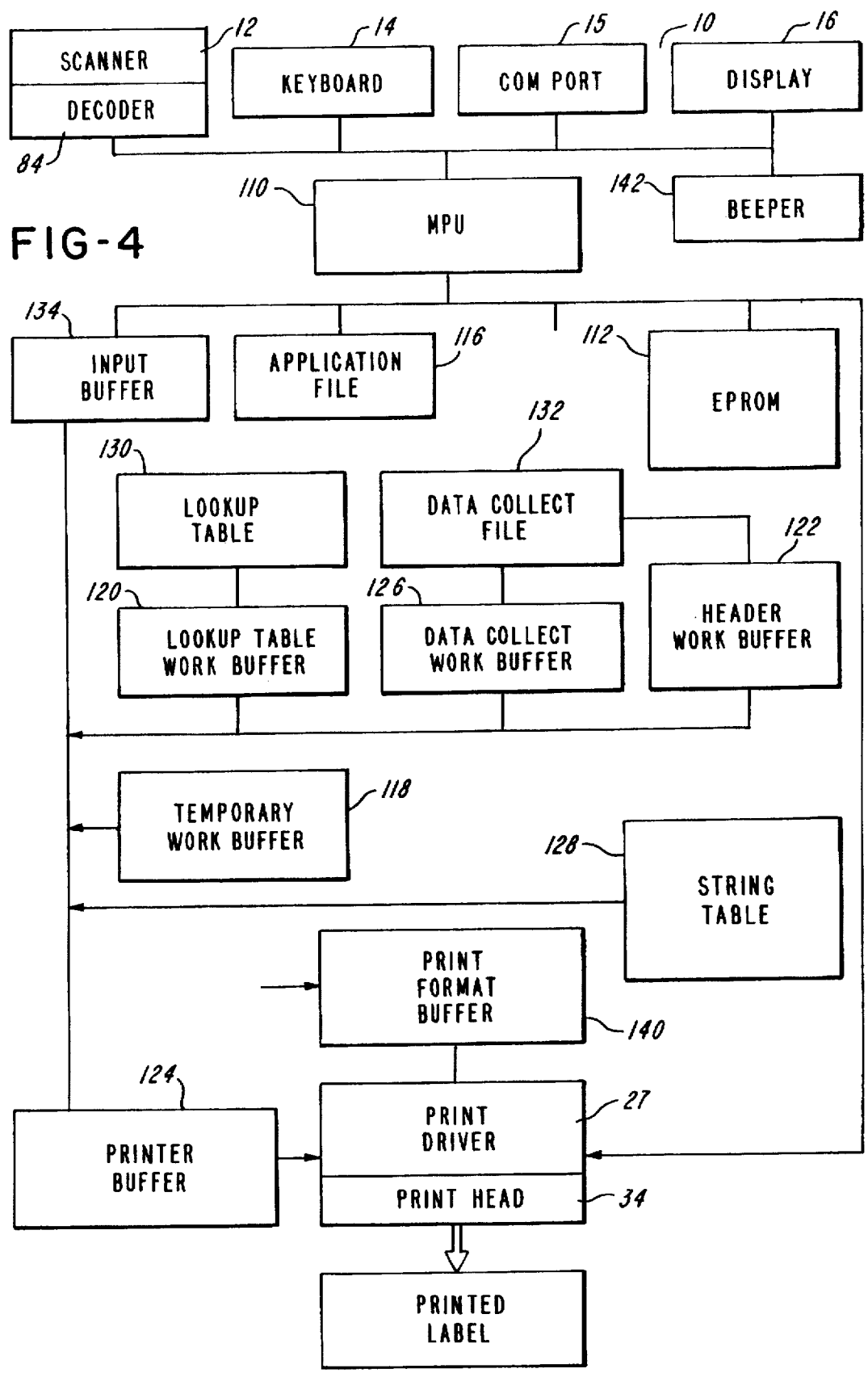

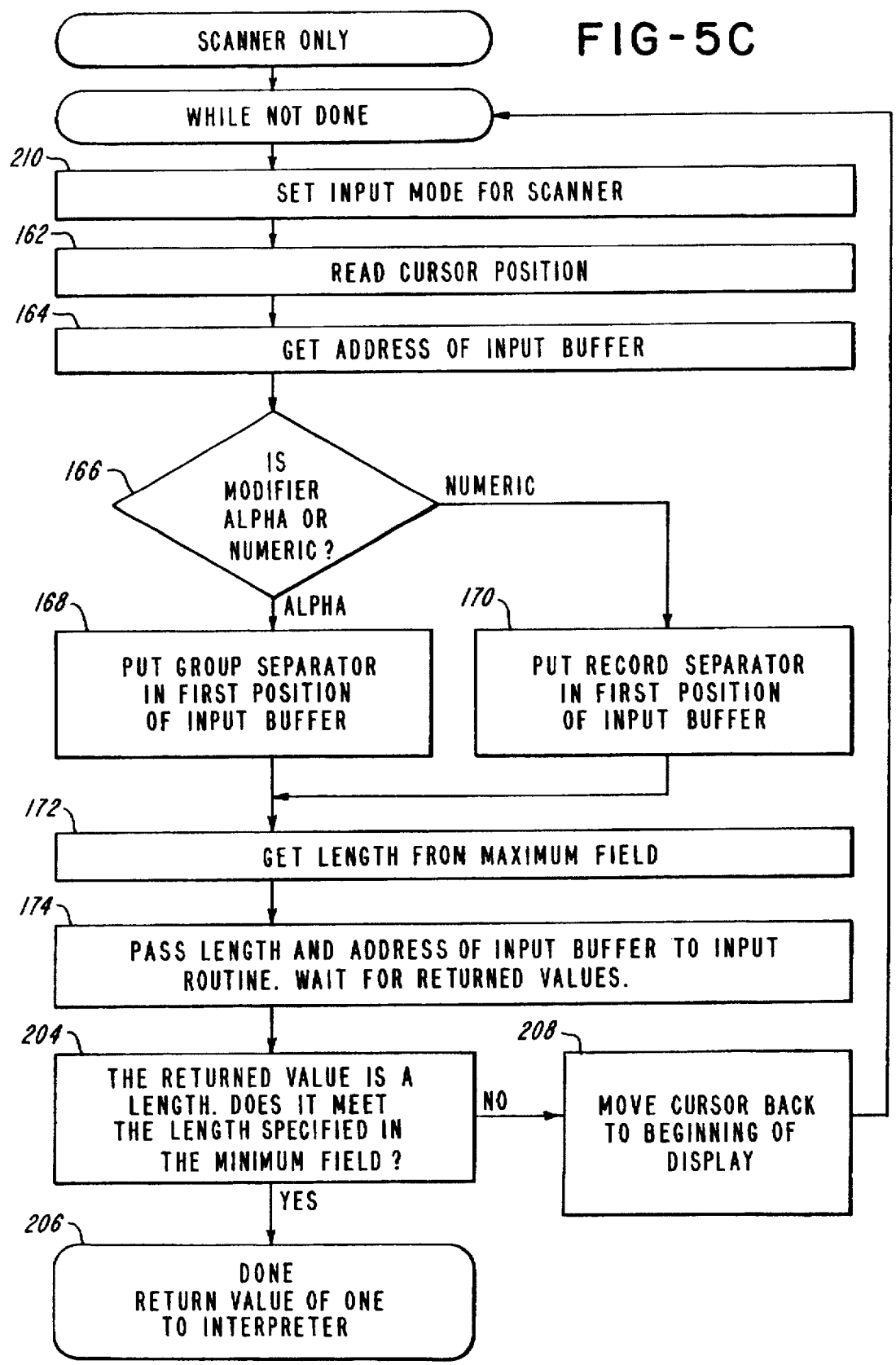

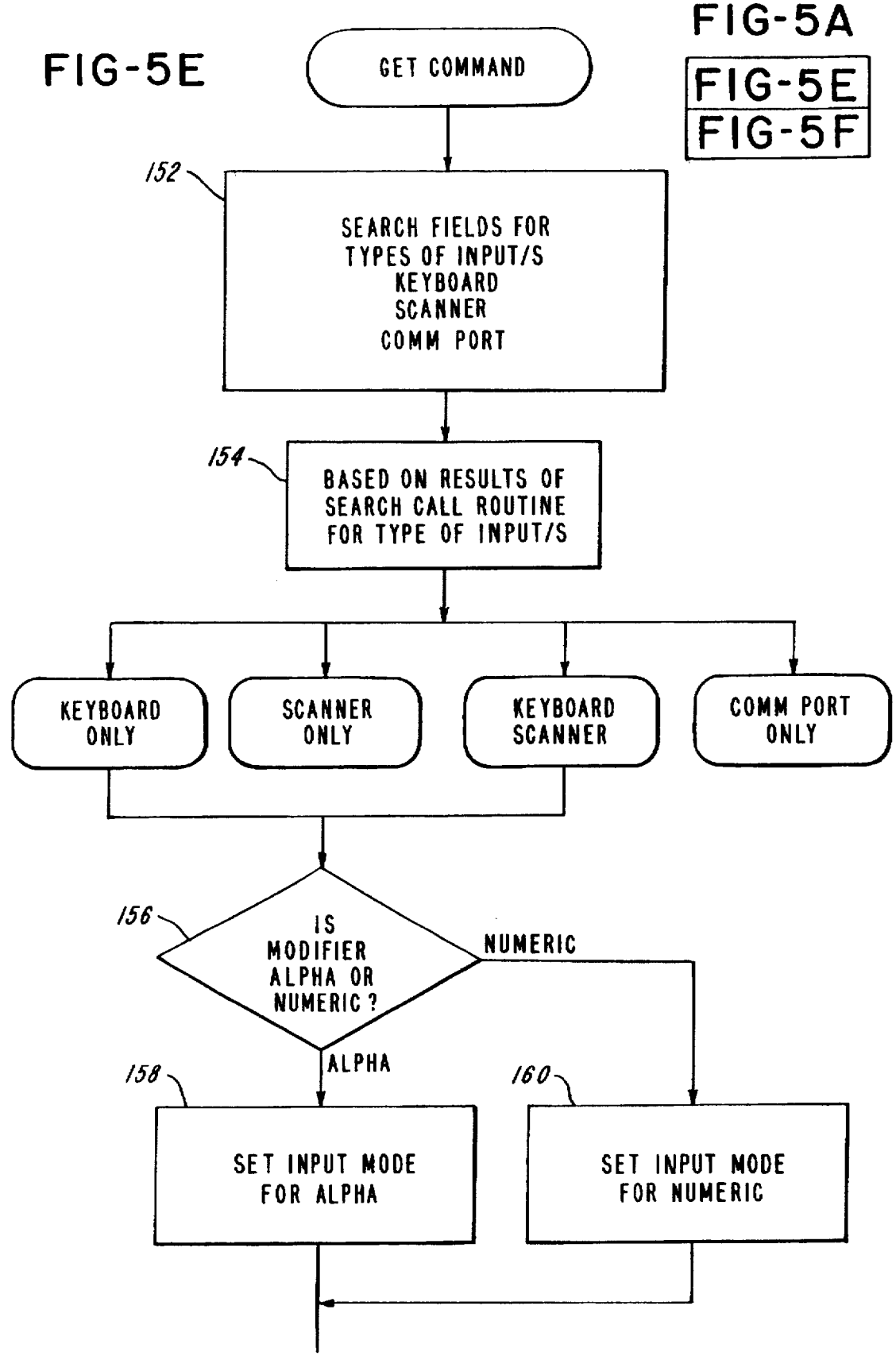

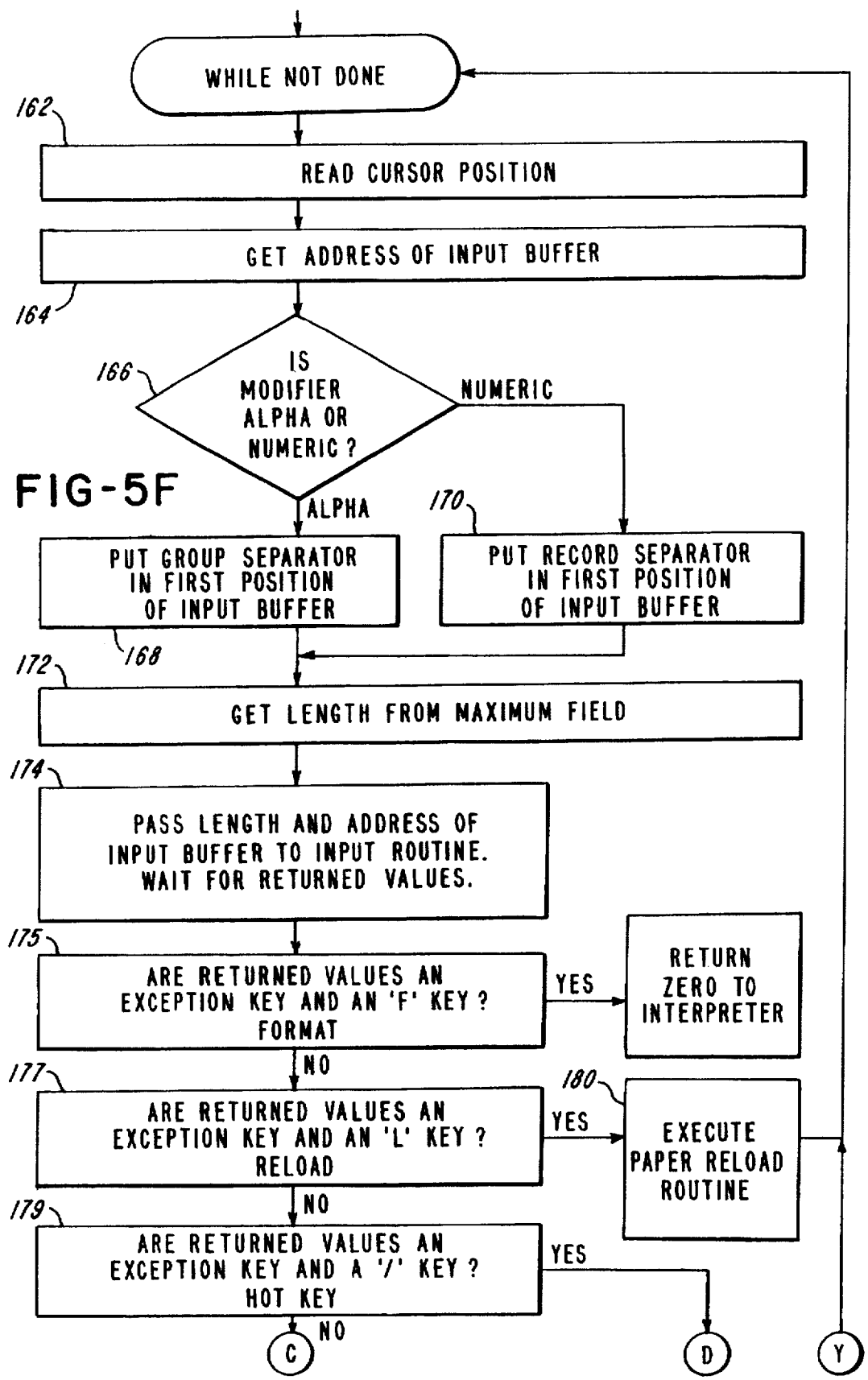

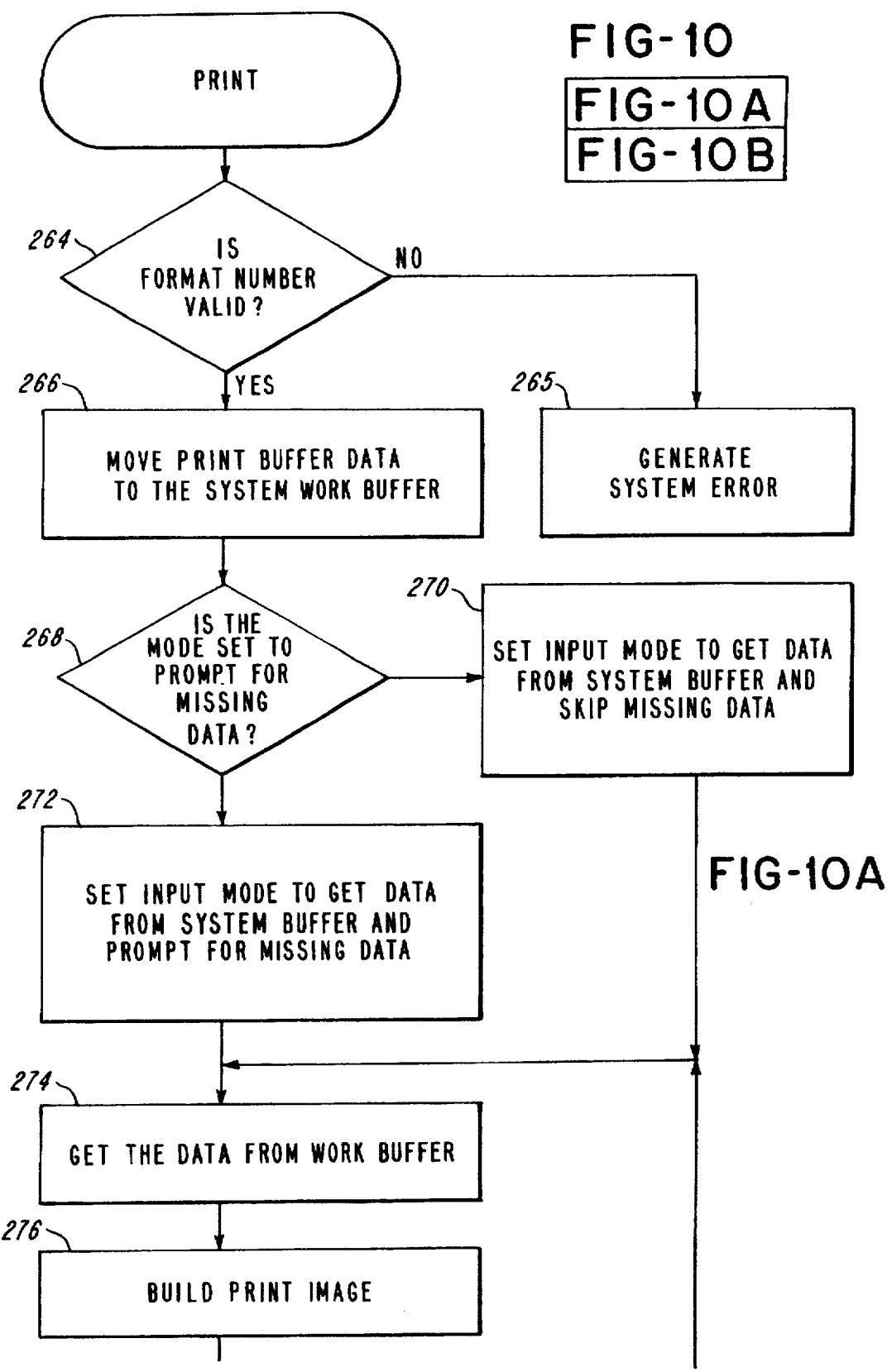

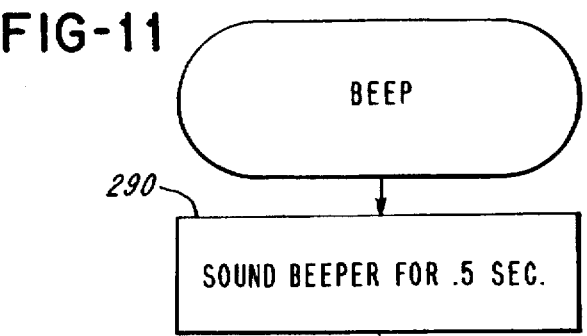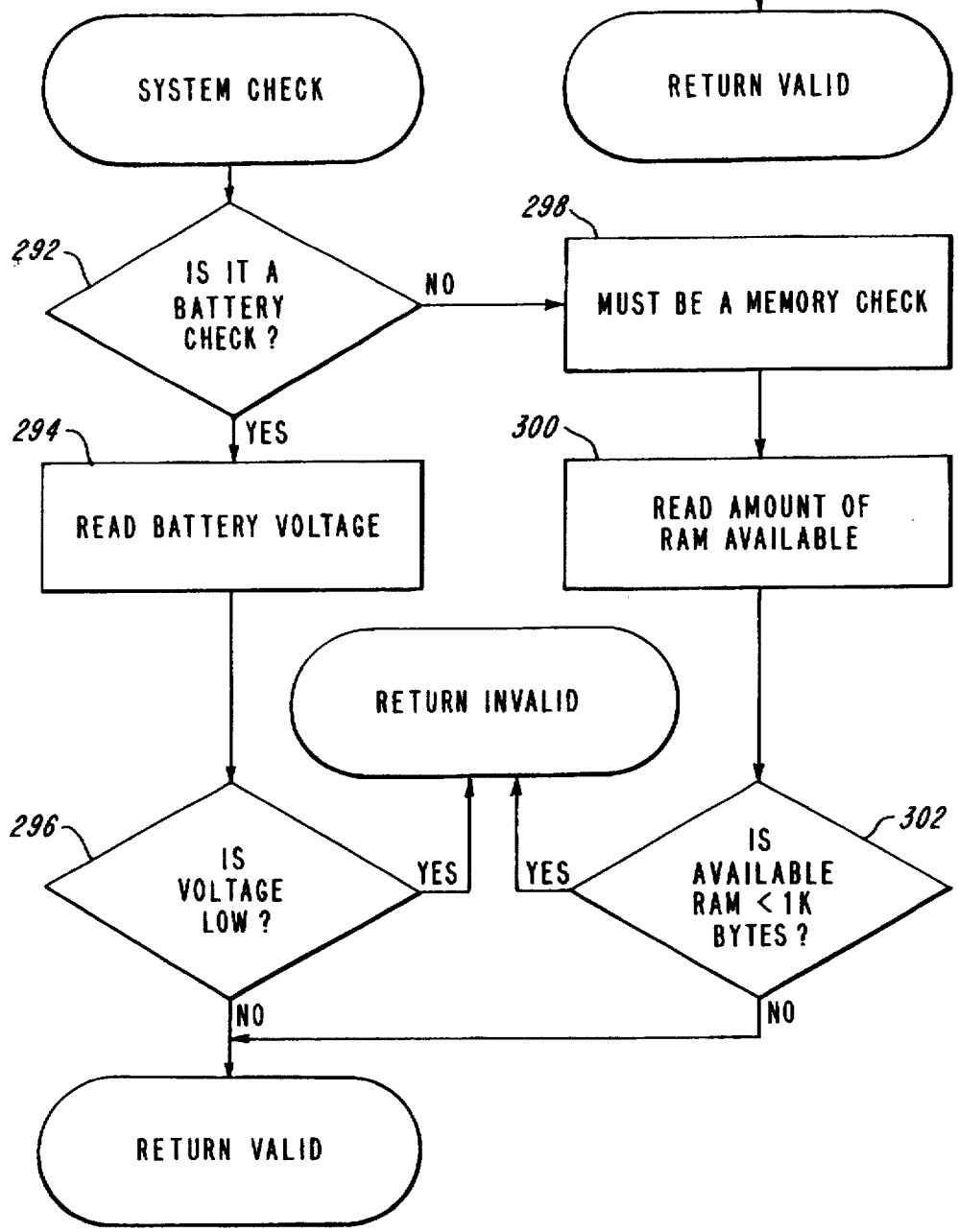

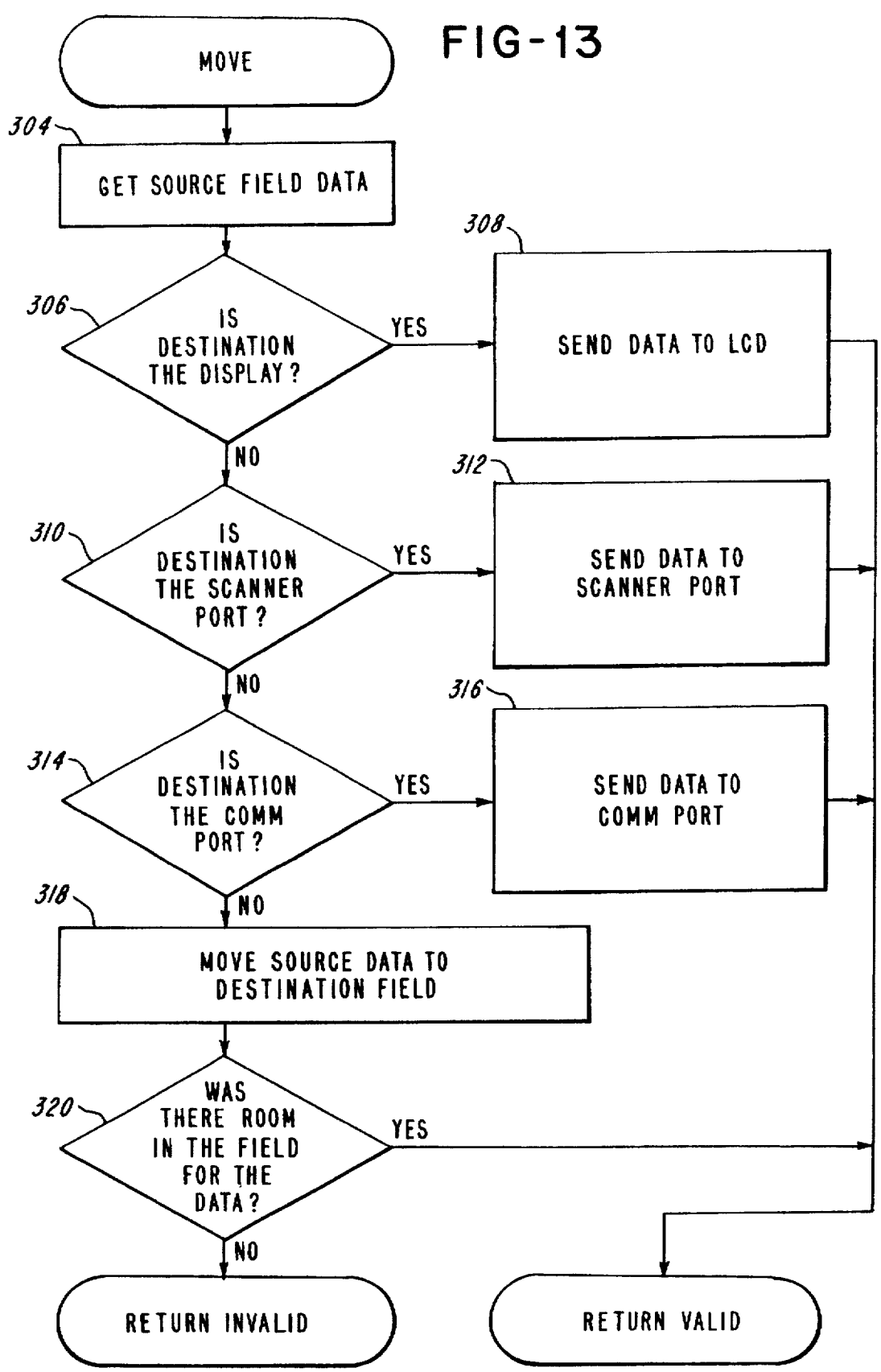

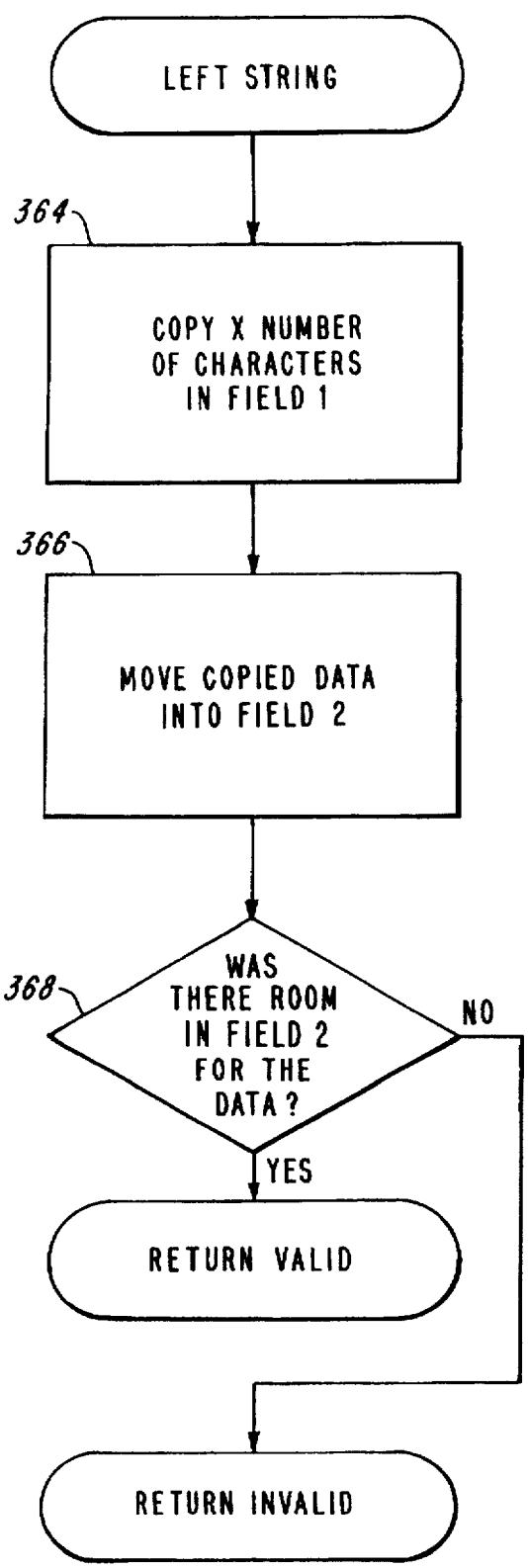
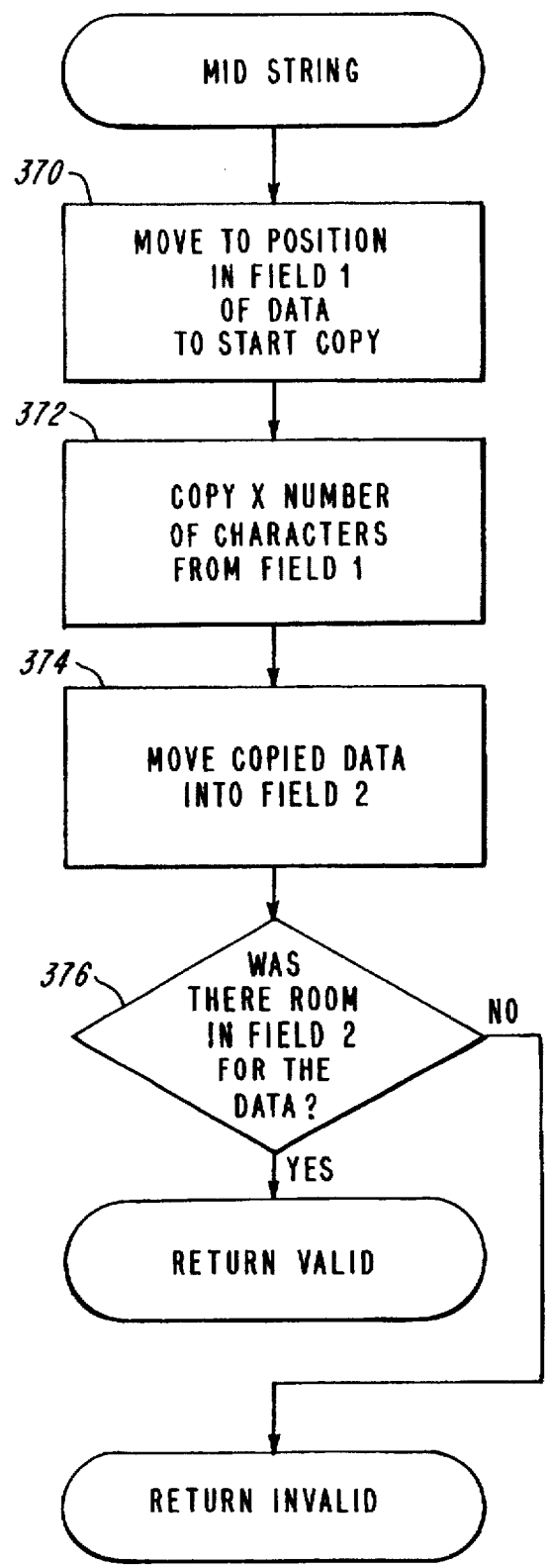

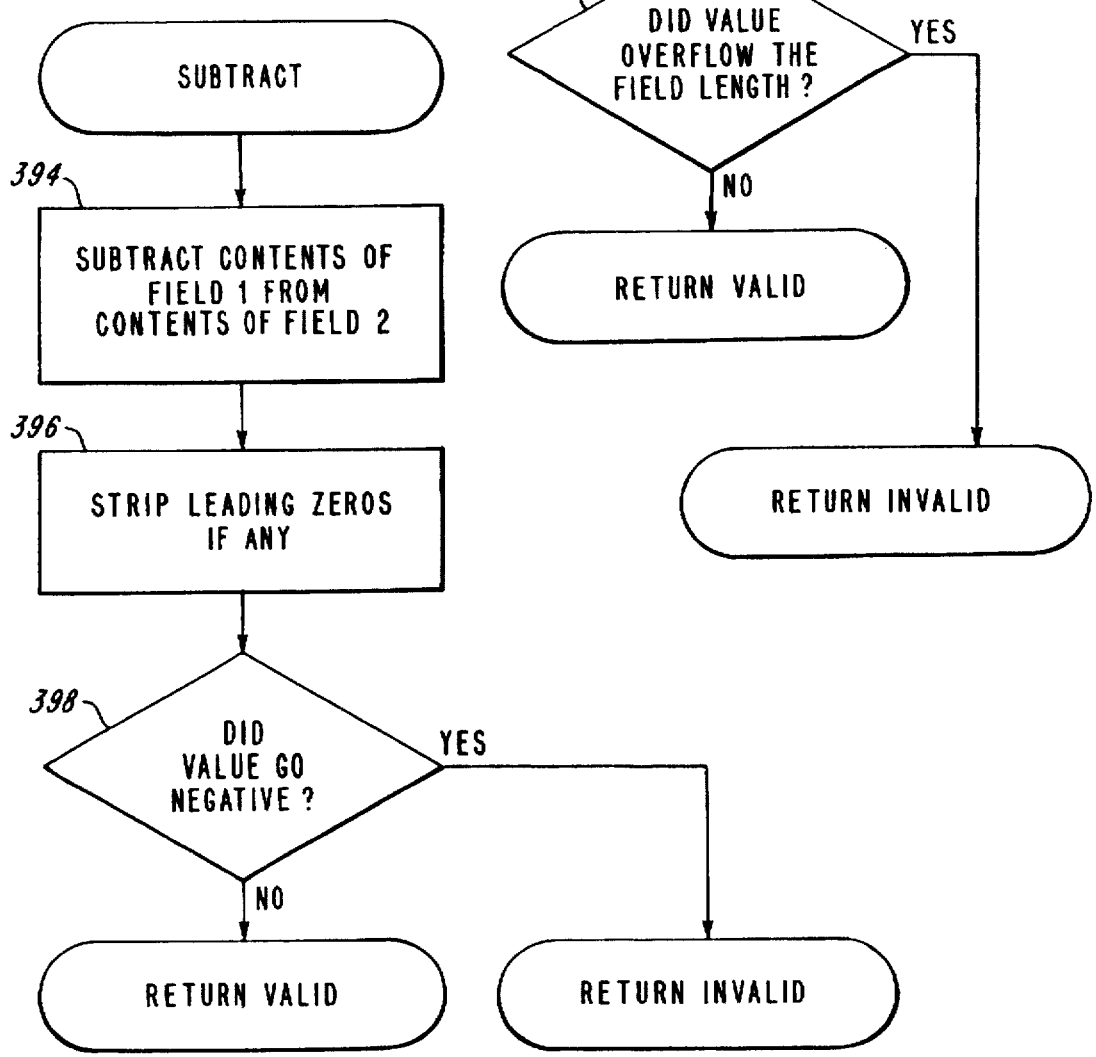

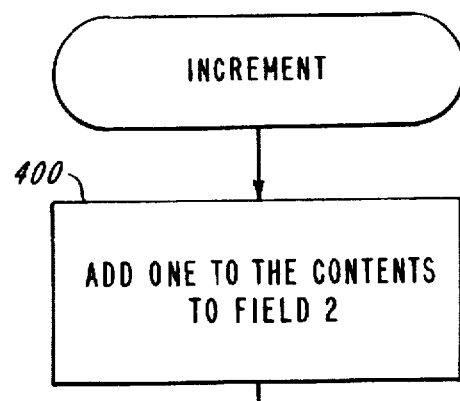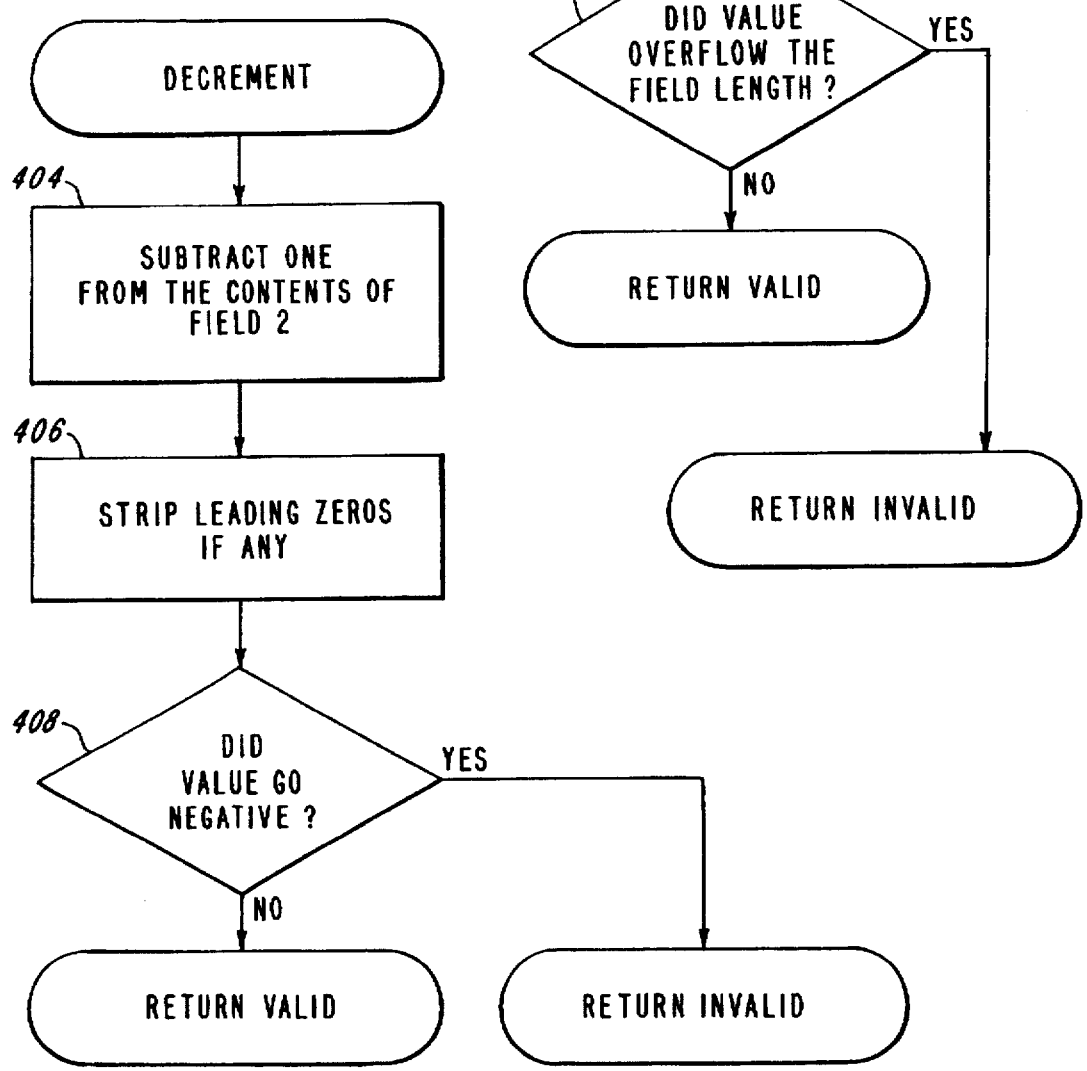

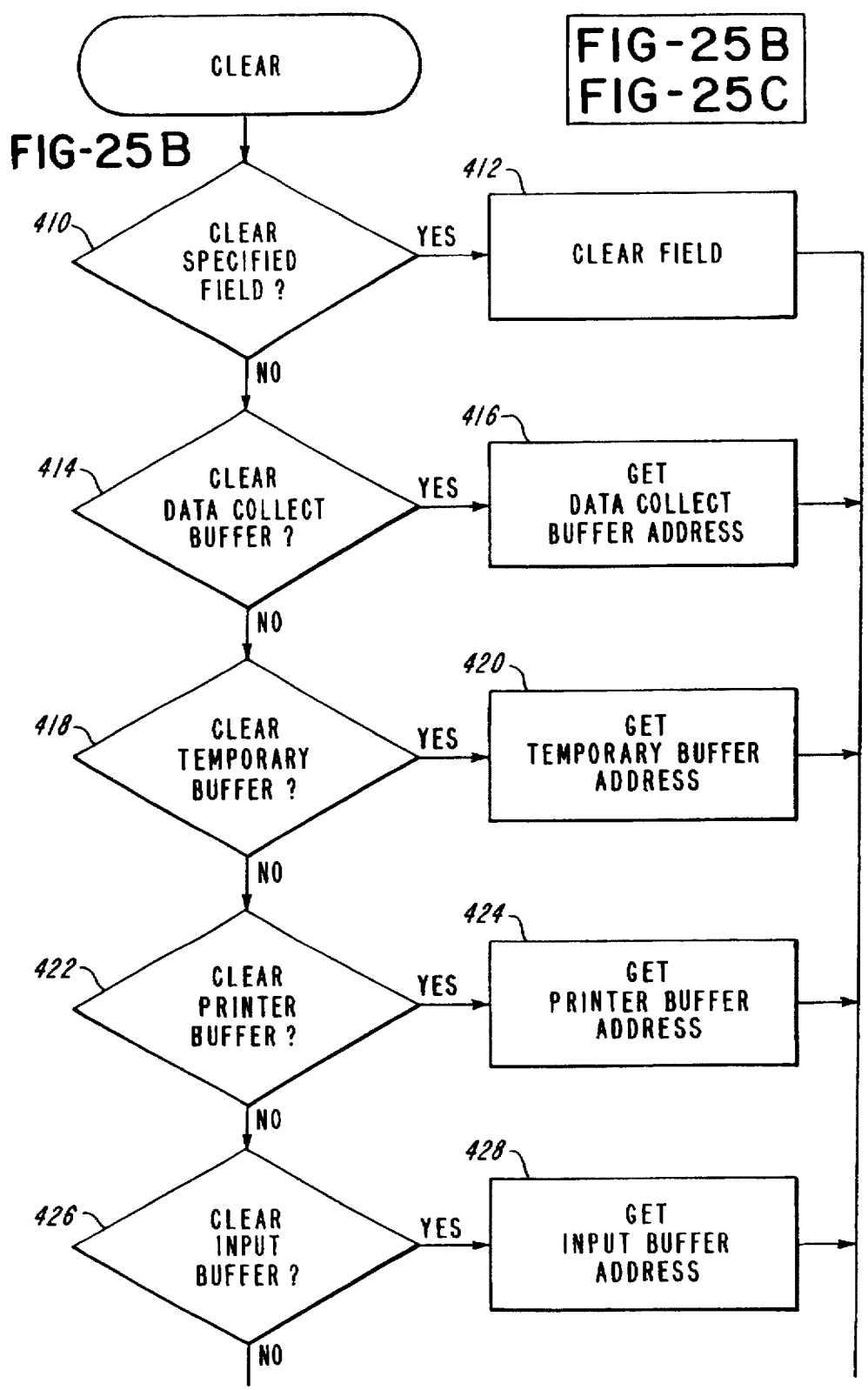

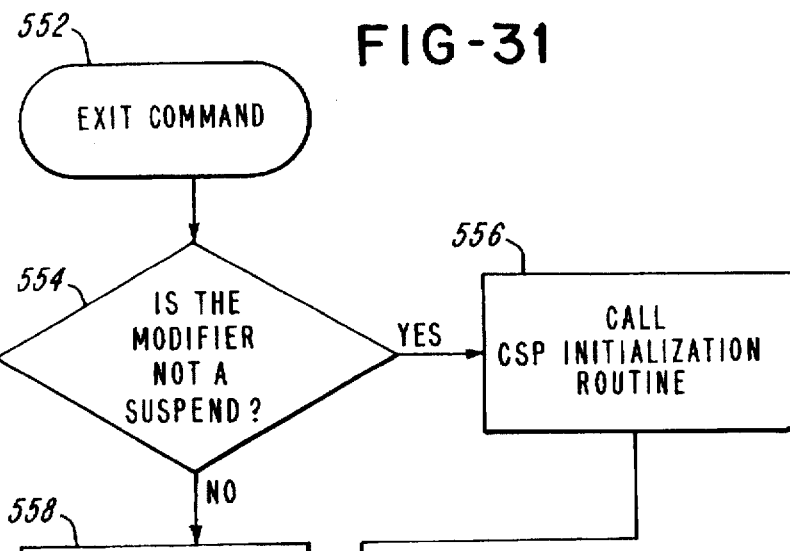
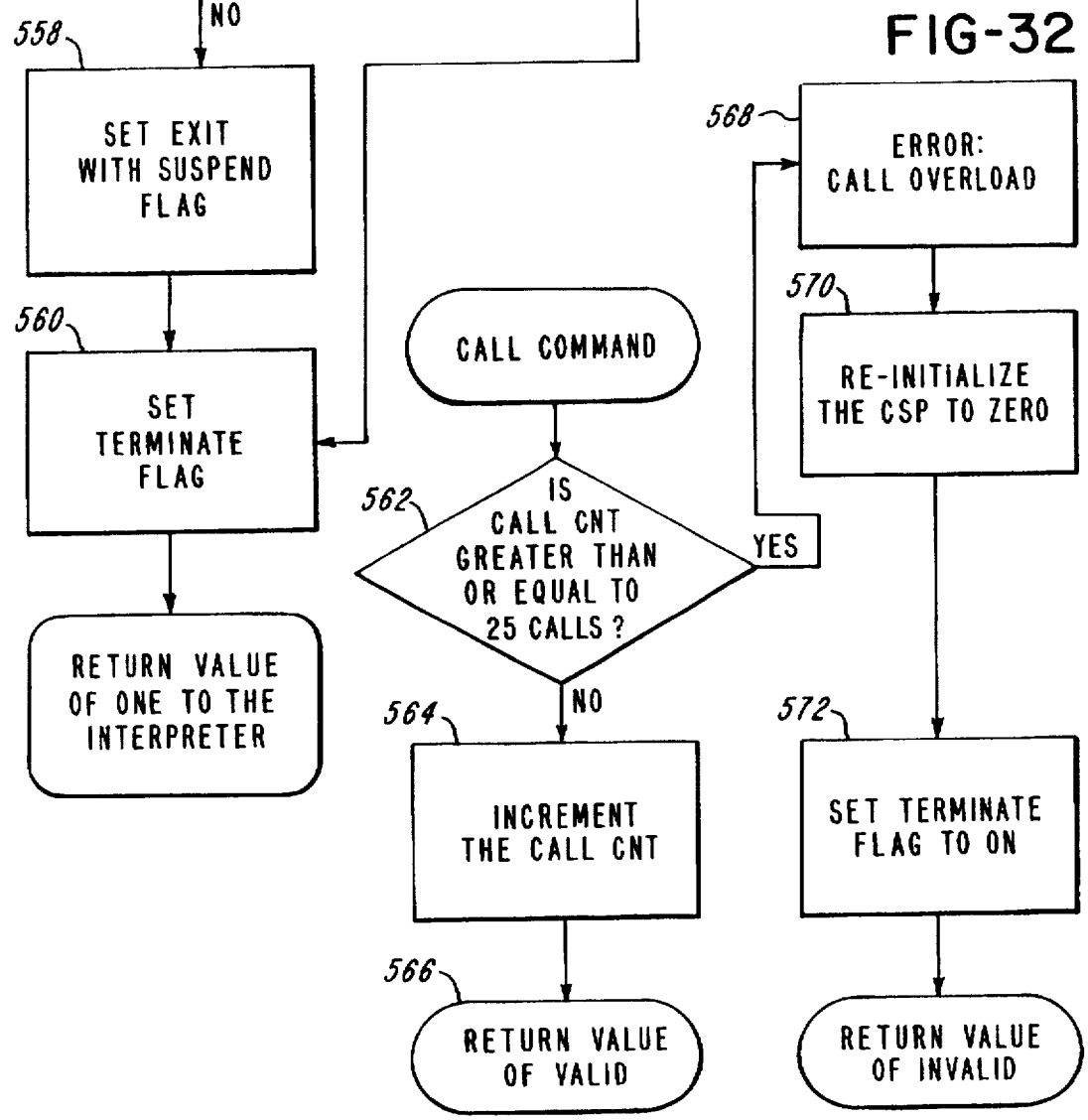

| | VALUE |
|---|---|
| 00 | |
| 01 | |
| 02 | |
| 03 | |
| 04 | |
| 05 | |
| 06 | |
| 07 | |
| 08 | |
| 09 | |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |
| 24 | |

CSP ELEMENTS

ENABLE/DISABLE FLAGS: 0 1 2 3 4 (<, >, S, R, L)

LOCATION OF HOT KEY ROUTINES: 5 6 7 8 9 10 11 12 13 14 (<, >, S, R, L)

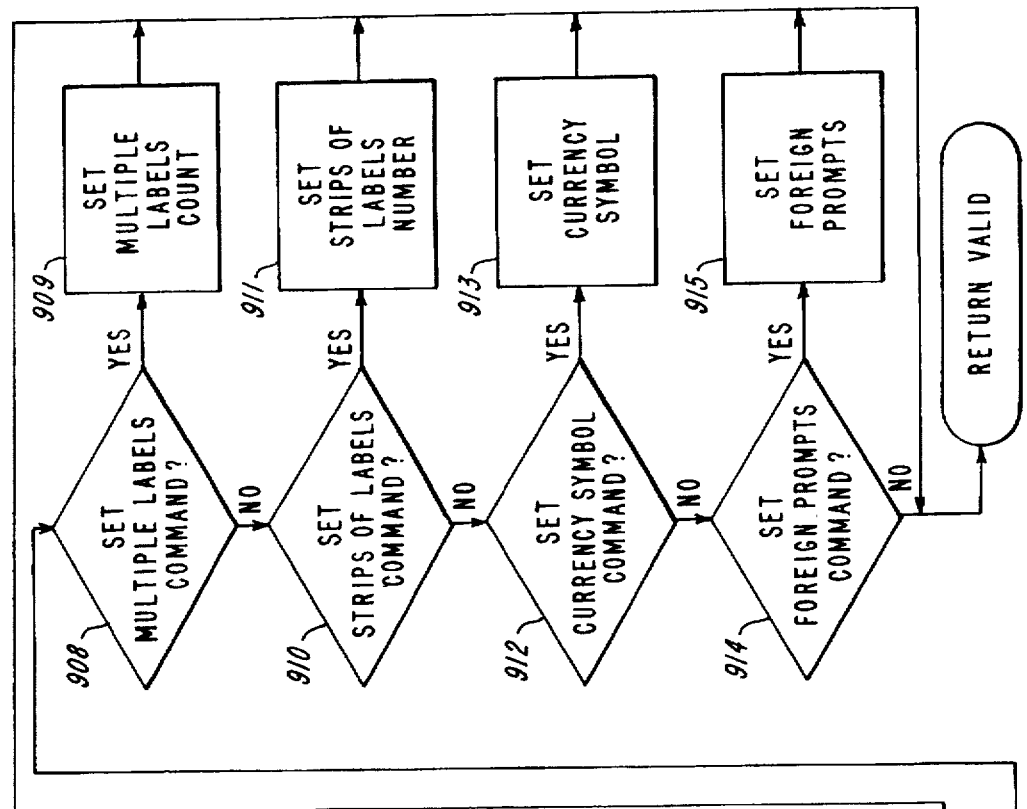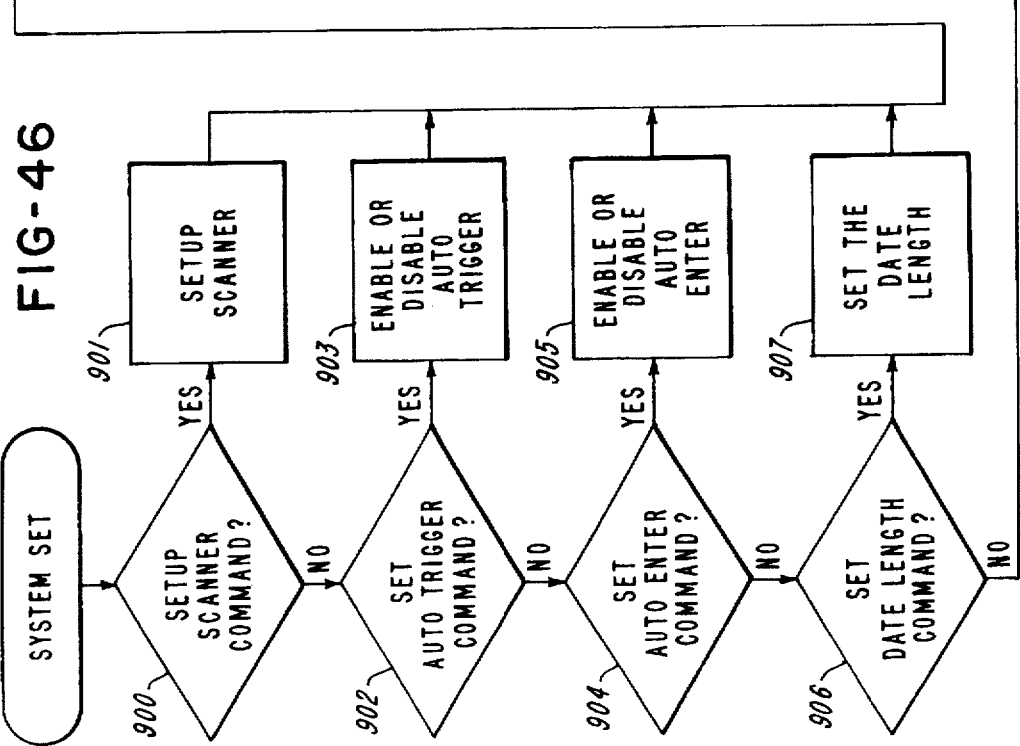
FIG-46

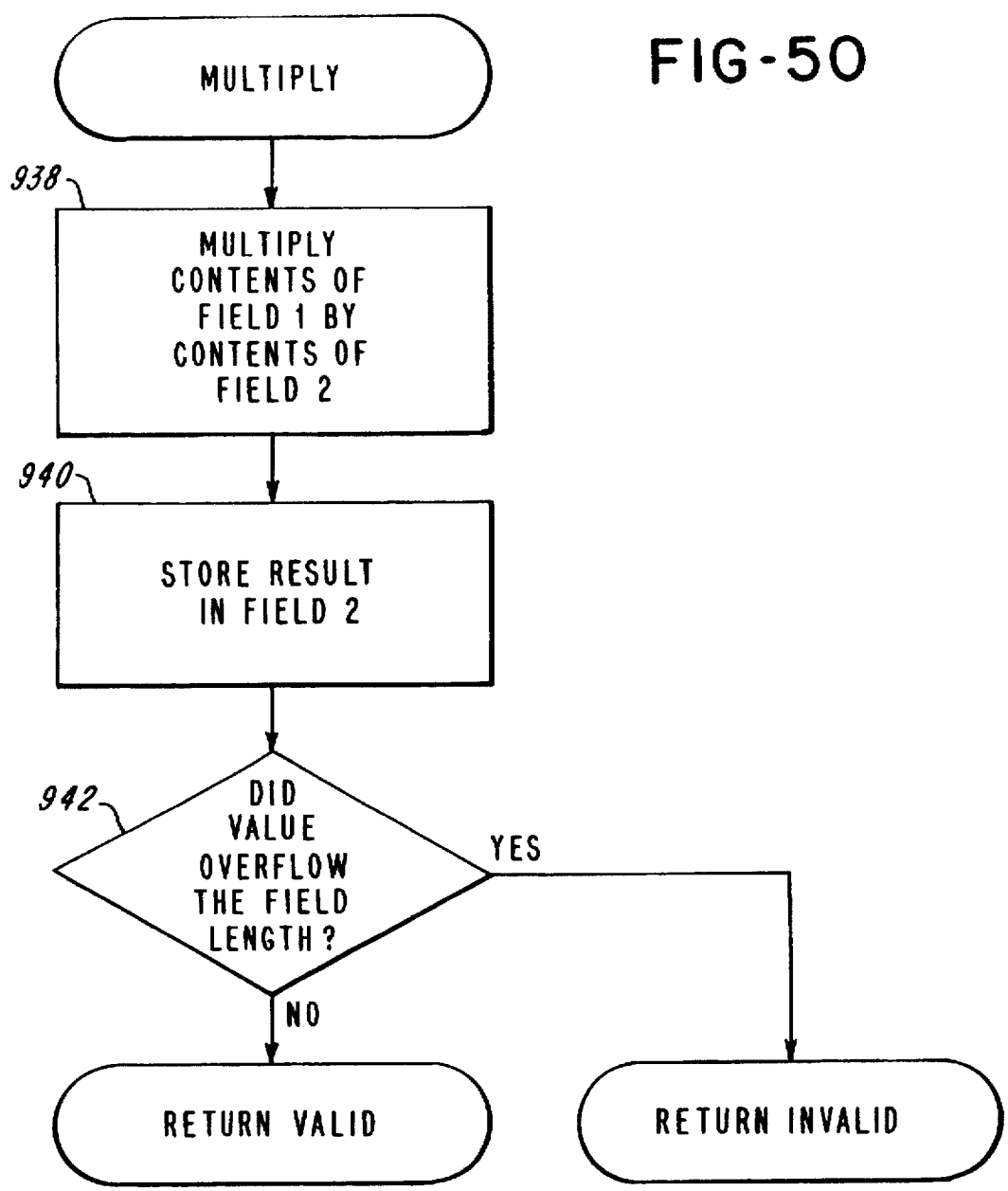

PROGRAMMABLE HAND HELD LABELER

This is a divisional of U.S. patent application Ser. No. 08/482,152 filed Jun. 8, 1995, now U.S. Pat. No. 5,594,838, which is a divisional of U.S. patent application Ser. No. 07/858,703 filed Mar. 27, 1992, now U.S. Pat. No. 5,483,624.

TECHNICAL FIELD

The present invention relates to an apparatus and method for printing labels and more particularly to a hand held labeler that is programmable to operate in accordance with a user generated sequence of commands forming an application program transmitted to the labeler. Each command is selected from a programming language command set having a corresponding set of command routines stored in the labeler, the commands and command routines allowing the labeler to perform flexible data collection, data manipulation and label printing operations.

BACKGROUND OF THE INVENTION

Hand held labelers are known for printing information on labels. Known labelers have included a keyboard and/or an optical reader or scanner for inputting data including scanned bar code information to the labeler to print the input information on a label. One labeler employing a scanner is shown in U.S. Pat. No. 4,652,317. However, this labeler is limited in that only one bar code may be scanned and stored at a time for printing that single bar code on one or more labels. Other labelers are known wherein scanned information including a number of different bar codes can be input to the labeler and stored for data acquisition or printing. However, these labelers are limited in that they are not capable of manipulating the data entered into the labeler to move the data in association with any other data stored in the memory. More particularly, these known labelers typically employ a look up table that associates data in a fixed manner. If a first piece of data is not associated with a second piece of data in the look up table, these known labelers cannot print a label with both the first and second pieces of data because the labeler is not capable of manipulating the data to associate the two otherwise non-associated pieces of data.

Further, known labelers typically include software programs stored in a ROM, PROM or the like that define the operations of the labeler in a fixed manner that can only be changed by replacing the memory or by removing the memory from the labeler for reprogramming and reinserting the reprogrammed memory back into the labeler. One labeler is known that stores the software programs defining the labeler's operation in a read only memory; however, the labeler also stores information in a programmable memory to enable or disable various ones of the labeler's operations. By downloading new enable/disable information to this labeler, the executable operations of the labeler can be changed. Although this labeler is more flexible than other labelers, it does not allow a user to redefine or reprogram an enabled operation to change the way in which the operation is performed or to change the fixed sequence in which enabled operations are performed. Further, although information can be downloaded to this labeler from a remote location, the labeler cannot support real time interactivity with the remote location during a printing operation. Therefore, if a printing operation is started which is dependant upon particular information being stored in the labeler and that particularly information is not stored in the labeler the printing operation is aborted to allow the required information to be downloaded into the labeler. Thereafter the printing operation must be restarted from the beginning.

Known labelers further typically require data that is input to the printer to be tied or linked to a specific or selected print format. More particularly, data cannot be entered into a typical labeler without first inputting a print format for the data. With these printers, in order to print the same data in accordance with two different print formats, the data must be entered twice, once in association with one of the print formats and a second time in association with the other print format. Also, these known labelers cannot collect data separately from data to be printed.

SUMMARY OF THE INVENTION

In accordance with the present invention, the disadvantages of prior hand held labelers as discussed above have been overcome. The hand held labeler of the present invention is programmable to operate in accordance with a user generated sequence of commands forming an application program that is transmitted to the labeler. Each command of the application program is selected from a programming language command set having a corresponding set of command routines stored in the labeler, the commands and command routines allowing the labeler to perform flexible data collection, data manipulation and label printing operations.

More particularly, the hand held labeler of the present invention includes a first memory storing a fixed set of command routines including a print command routine to control a print operation of the labeler, a plurality of data manipulation command routines to control the manipulation of stored data and a data collection command routine to control an operation for collecting data input to the labeler. A second memory that is programmable stores data and the user generated sequence of commands forming the application program. Each command in the application program selects an associated command routine stored in the first memory for execution. The application program stored in the second memory is executed by a processor by executing the selected command routines stored in the first memory to control at least one of the print, data manipulation or data collection operations of the labeler. When a new application program is transmitted to the labeler, the labeler of the present invention dynamically builds in the second memory all of the work buffers that are needed in order to execute the application. This feature allows the second memory of the labeler to be allocated in the most efficient manner to allow the maximum amount of data to be collected within the labeler.

The data collection and manipulation command routines allow data to be input to the labeler from any combination of multiple input sources including a keyboard, a scanner and a communication port; and further allow a label to be printed with data received from any combination of these input sources. Further, data can be input to the labeler independent of a print format so that data can be entered once for printing in accordance with a number of different formats. A user can also define data to be printed separately from data to be collected such that not all data input to the labeler needs to be collected and not all data collected needs to be printed. The data input to the labeler can further be accepted and stored for printing at a later time.

The data manipulation routines also allow selected data to be moved in the second memory in association with any other selected data in the second memory to allow associated data to be printed on a label together or to be coupled to the communication port or interface for uploading to a remote location. Thus, a look up table can be downloaded from a remote location to the labeler, the look up table modified by the data manipulation routines and the look up table uploaded back to the remote location. The data manipulation routines also allow data input to the labeler from any of the input sources to be verified.

The labeler of the present invention supports real time interactivity with a remote location via the communication port or interface. This allows the labeler to request information from the remote location as needed by an application program without interrupting a printing or data collection operation.

The labeler of the present invention also includes at least one programmable key that is user definable to cause a user defined operation to occur upon actuation of the programmable key.

These and other objects, advantages and novel features of the present invention as well as details of an illustrative embodiment thereof will be more fully understood from the following description and from the drawings.

BRIEF DESCRIPTION OF THE DRAWINGS

FIG. 4 is a block diagram of the labeler shown in FIG. 1;

FIG. 11 is a flow chart illustrating a Beep command routine of the labeler;

FIG. 12 is a flow chart illustrating a System Check Command routine of the labeler;

FIG. 13 is a flow chart illustrating a Move command routine of the labeler;

FIG. 18 is a flow chart illustrating a Left String command routine of the labeler;

FIG. 19 is a flow chart illustrating a Midstring command routine of the labeler;

FIG. 21 is a flow chart illustrating an Add command routine of the labeler;

FIG. 22 is a flow chart illustrating a Subtract routine of the labeler;

FIG. 23 is a flow chart illustrating a Increment command routine of the labeler;

FIG. 24 is a flow chart illustrating a Decrement command routine of the labeler;

FIG. 31 is a flow chart illustrating an Exit command routine of the labeler;

FIG. 32 is a flow chart illustrating a Call command routine of the labeler;

FIG. 46 is a flow chart illustrating a System Set command routine of the labeler;

FIG. 50 is a flow chart illustrating a Multiply command routine of the labeler.

DESCRIPTION OF THE PREFERRED EMBODIMENT

Figure 1:
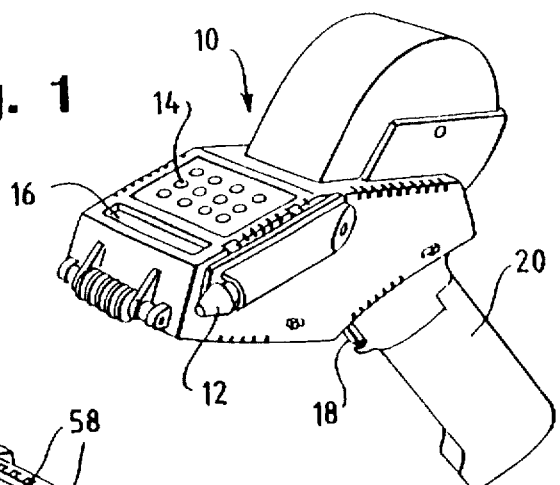
FIG. 1 is a perspective view of the hand held labeler of the present invention.

A hand held labeler 10 in accordance with present invention, as shown in FIG. 1, includes a bar code scanner 12, a keyboard 14 and a communication port 15 (FIG. 4) for entering information into the labeler 10. The scanner 12 is preferably an optical scanner; although other scanners such as magnetic scanners may be used to scan bar codes and the like that are capable of being sensed by the scanner and converted to digital information. The keyboard 14 includes a number of fixed operation keys for entering alphanumeric information and control information to the labeler. The keyboard 14 also includes five programmable keys each of which is user definable to cause a user defined operation to occur upon the actuation of the key as discussed in detail below. A display 16 allows the labeler 10 to communicate information to the user such as prompts. Although the printing and label applying operation of the labeler 10 may be automatically controlled in accordance with an application program stored in the labeler, a user may also initiate a printing operation by actuating a trigger switch 18. The trigger switch 18 is mounted on a handle 20 of the labeler 10 for convenience. If desired, however, a print actuation switch may be included among the key switches forming the keyboard 14.

Figure 2:
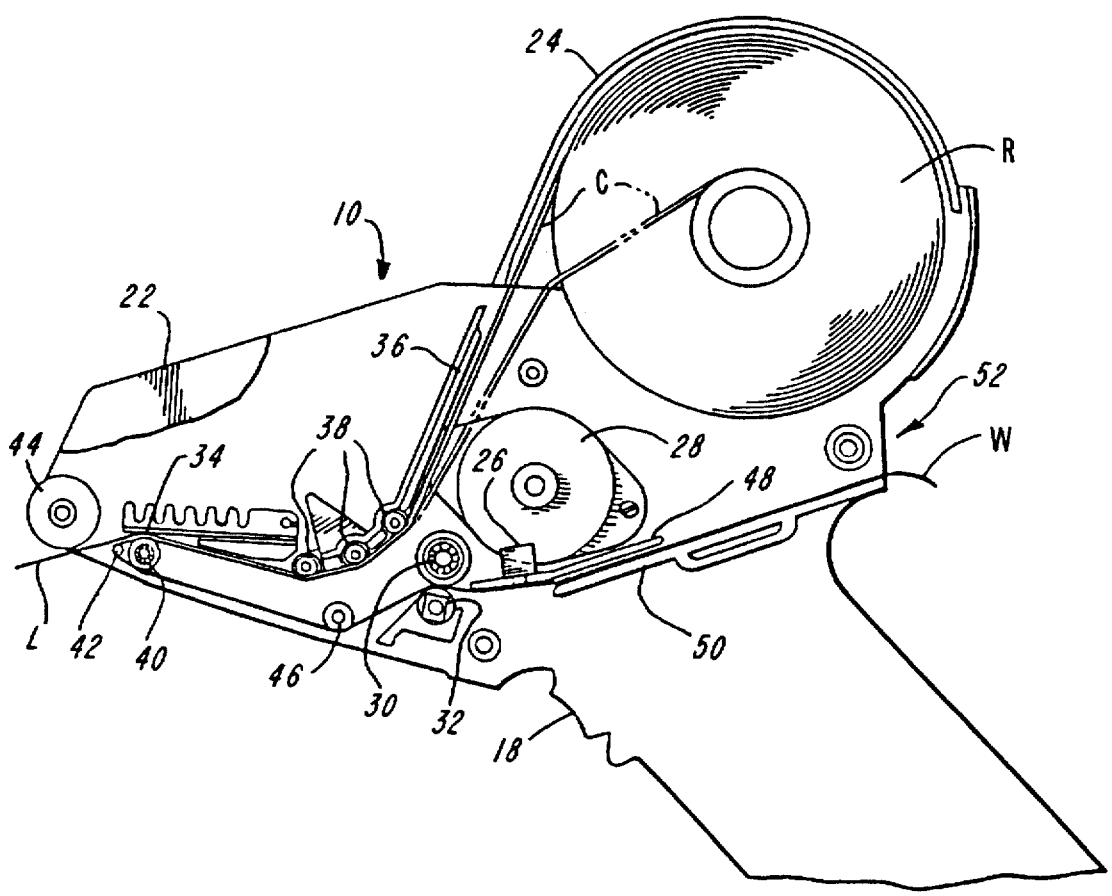
FIG. 2 is a diagrammatic side elevation view of the labeler depicted in FIG. 1.

As shown in FIG. 2, the labeler 10 includes a frame or housing 22. A label supply roll R is mounted on the housing 22, the roll R being shielded from ambient conditions, such as dust, by a cover 24. The roll R is comprised of a composite label web C shown by both a solid line representing a full roll R and phantom lines representing a nearly depleted roll. The composite web C includes a carrier web W having a coating of release material such as silicone wherein the labels, such as a label L, are releasably secured to the carrier web W by a pressure sensitive adhesive. The underside of the carrier web W may be provided with marks that are detected by an optical sensor 26 for various control functions of the labeler 10.

In response to the actuation of the trigger switch 18 or a print command from the labeler's microprocessor an electric motor 28 rotates a driving roll 30 coupled thereto wherein the driving roll 30 cooperates with an idler roll 32 to advance the composite web C past a print head 34. The print head 34 prints information on the leading label L as it passes thereby. More particularly, as the composite web C is paid out from the roll R, the web C passes between a pair of guides only one 36 of which is shown. Rollers 38 guide the composite web C around a curve where the composite web C passes between the printhead 34 and a cooperating platen 40. The printhead 34 is preferably a thermographic printhead, although other printheads may be employed. The printhead 34 includes a straight line of closely spaced print elements that extend perpendicular t the direction of movement of the composite web C. A delaminator 42 includes a peel roller positioned closely adjacent to the line of pressure contact between the printhead 34 and the platen 40. The carrier web W passes about a portion of the delaminator 42 to effect delamination of the leading label L. The leading label L is then passed into label applying relationship with respect to an applicator roll 44 so that the leading label L may be applied to an article. From the delaminator 42, the carrier web W again passes into contact with the platen 40 from which it is guided by a roll 46 to the driving roll 30 and the idler roll 32, the web W passing there between. The web W then moves past the optical sensor 26 and is pushed along guides 48 and 50 to an exit opening 52 in the housing 22.

Figure 3:
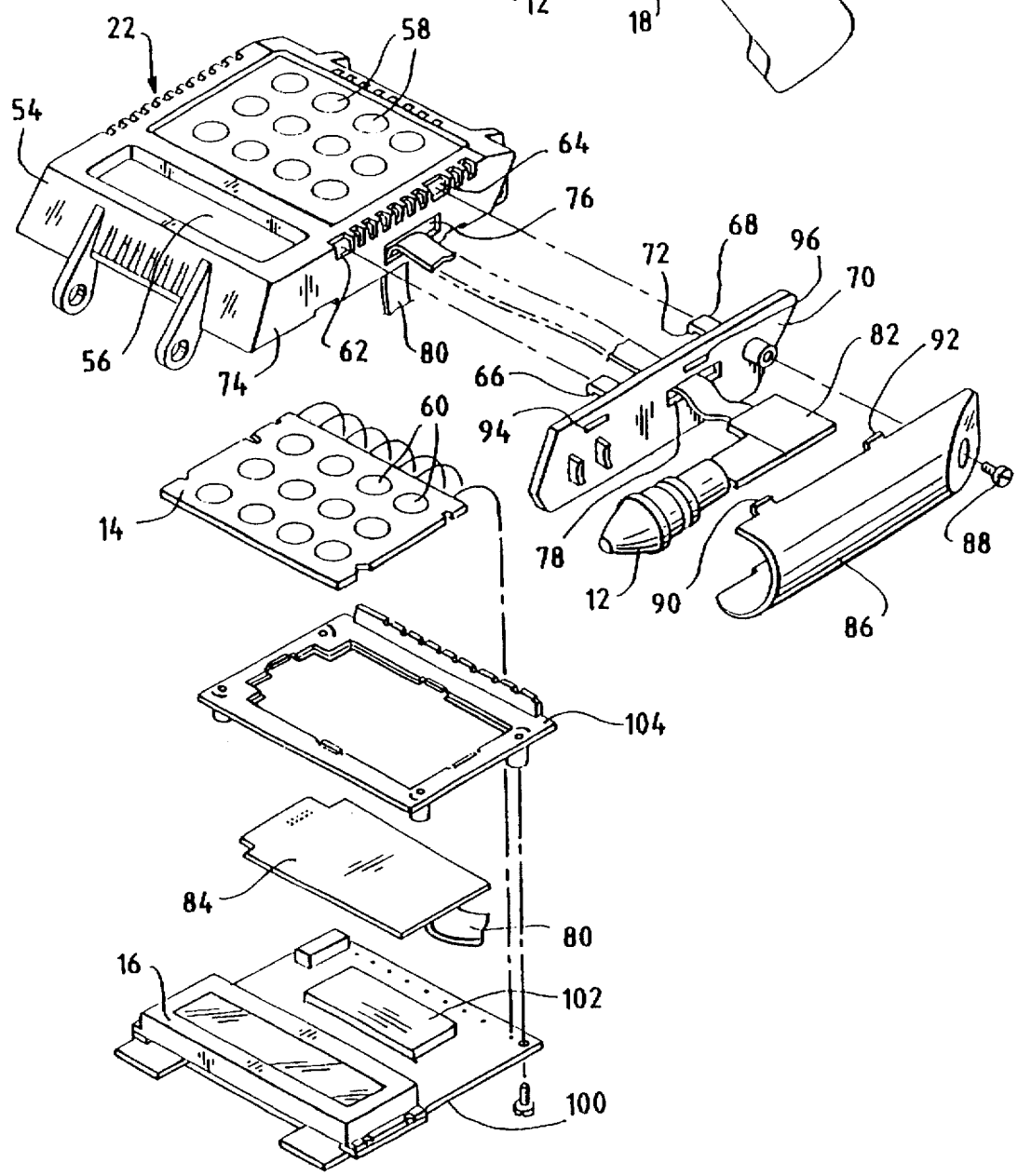
FIG. 3 is an exploded perspective view of one section of the hand held labeler shown in FIG. 1.

As shown in FIG. 3, the housing 22 has an upper section 54 that includes a rectangular aperture 56 aligned with the display 16. The upper housing section 54 further includes a plurality of circular apertures 58 that are aligned with the key switches 60 of the keyboard 14. Alternatively a large single aperture could be formed in the upper housing section 54 to accommodate the entire keyboard. A pair of small rectangular apertures 62 and 64 are formed in the housing section 54 for receiving respective flanges 66 and 68 of a mounting bracket 70. Each of the flanges 66 and 68 includes a lip 72 that engages the inner surface of a sidewall 74 of the housing section 54 so as to retain the mounting bracket 70 secured to the upper housing section 54. The upper housing section 54 and mounting bracket 70 are formed with respective slots 76 and 78, the slots being aligned to allow an electrical ribbon connector 80 to pass from a printed circuit board 82 associated with the optical scanner 12 to a decoder/ power down chip 84 contained within the labeler housing 22. The decoder/power down chip 84 identifies an optically scanned coded record or bar code and transmits digital signals representing the scanned code to a main processor chip 102. A power down circuit on the board 82 turns off both the optical scanner 12 and the decoder portion of the chip 84 when the optical scanner is not in use so as to conserve power. A cover 86 is secured to the mounting bracket 70 by means of a screw 88 and a pair of flanges 90 and 92 that extend through respective slots 94 and 96 formed in the mounting bracket 70. The cover 86 encloses the body 98 of the optical scanner and the printed circuit board 82 to provide an integrally formed labeler and optical scanning device. A mounting plate 100 supports the display 16 as well as the microprocessor chip 102 that is coupled to the decoder/power down chip 84 mounted there above. The keyboard 14 is mounted on another mounting plate 104 beneath which is disposed the decoder/power down chip 84.

As shown in FIG. 4, a microprocessor 110 included in the microprocessor chip 102 operates in accordance with an operating system stored in a read only memory 112 that is preferably an EPROM to execute an application program 116 stored in a file of a random access memory, RAM 114. More particularly, the application program 116 is formed of a sequence of commands selected from a programming language command set to allow flexible data collection, data manipulation and label printing operations to occur. The operating system of the labeler 10 stored in the EPROM 112 includes a number of command routines as discussed in detail below with respect to FIGS. 5–35. Each command routine is associated with a command from the programming language command set such that each command in the sequence of commands forming an application program selects its associated command routine stored in the EPROM 112 for execution. Specifically, the microprocessor 110 executes an application program 116 in accordance with an application program interpreter depicted in FIG. 38 by executing the command routines selected by the sequence of commands in the application program.

The application program 116 is generated by a user on a personal computer or host computer at a remote location. The application program 116 is downloaded from the remote location to the labeler 10 via the communication port or interface 15. The communication interface 15 may be such as an RS 232 interface, a radio frequency, R.F., interface or the like. Configuration records are downloaded with the application program to provide definitions of the work buffers needed to implement the application. The work buffers are dynamically built in the RAM 114 as discussed in detail below, wherein the buffer definitions indicate the amount of memory to be allocated to each of the work buffers. More particularly, definitions for a temporary work buffer 118, a look up table work buffer 120, a header work buffer 122, a print work buffer 124, a data collect work buffer 126, and an ASCII string table 128 are downloaded to the labeler 10 in that order if needed, followed by the application program 116 and look up table records. The look up table records are stored in a file 130 of the RAM 114. A data collect file 132 is formed in the RAM 114 from the remaining memory after all of the work buffers have been built and the application program and look up table stored. The data collect file 132 is thus as large as possible given the size of a particular look up table, application and program and associated work buffers. The configuration record for each of the work buffers includes an acronym identifying the particular buffer or table, followed by a check sum that is followed by the length of the first field in the buffer and a designation as to whether that first field is an alpha field or a numeric field, the information defining the first field being followed by similar information defining the remaining fields of the buffer/file. It is noted that the download processing routines as well as the application program interpreter are included in the labeler's operating system stored in the EPROM 112.

The work buffers built in the RAM 114 are utilized to store various types of data as follows. The temporary work buffer 118 is used to store data in order to carry out arithmetic operations or other intermediate data manipulation operations. The string table 128 stores alpha, numeric or alphanumeric strings that are output, for example, to the display 16 to display messages to the user such as prompts. The print buffer 124 stores an image of the data to be printed on a label, the label image data being coupled to the print driver 27 under the control of the microprocessor 110, the print driver including the print head 34, motor 28, etc. The header work buffer stores data that is used infrequently and relates to or can be associated with a group of individual data pieces that are stored in the data collect work buffer 126. The header data in the header work buffer 122 and the individual data pieces stored in the data collect work buffer 126 are combined in the data collect file 132. Each of the look up table records stored in the look up table file 130 have a number of fields. The look up table associates the data in the fields of a record so that the data in one field can be accessed by data in an associated field. In accordance with the present invention, the look up table downloaded from the remote location and stored in the file 130 of the RAM 114 can be modified and uploaded to the remote location as discussed below.

All data input to the labeler 10 from the input sources 12, 14 and 15 is temporarily stored in an input buffer 134. Data stored in the input buffer 134 can be copied to the look up table work buffer 120, the data collect work buffer 126, the header work buffer 122, the temporary work buffer 118 and/or the print buffer 124. Similarly, data that is stored in the string table 128 can be copied to the look up table work buffer 120, the data collect work buffer 126, the header work buffer 122, the temporary work buffer 118 or the print buffer 124. The data that is stored in the look up table work buffer 120 can be copied to the look up table file 130, the data collect work buffer 126, the header work buffer 122, the temporary work buffer 118, and/or the printer buffer 124. Data in the data collect work buffer 126 can be copied to the look up table work buffer 120, the data collect file 132, the header work buffer 122, the temporary work buffer 118 and/or the print buffer 124. The data in the header work buffer 122 can be copied to the data collect file 132, the look up table work buffer 120, the data collect work buffer 126, the temporary work buffer 118 and/or the print buffer 124. Further, data in the temporary work buffer can be copied to the look up table work buffer 120, the data collect buffer 126, the header work buffer 122 and/or the print buffer 124. It is noted that the print buffer 124 is a write only buffer.

The data input to the labeler 10 is manipulated and moved among the various work buffers and files to associate selected data together in a flexible manner so that the associated data can be printed on a label together and/or uploaded to the remote location via the communication interface 15. The desired data manipulation is programmed by a user when the application program is generated using data manipulation commands associated with the data manipulation command routines stored in the EPROM 112. Besides the data manipulation command routines, the set of command routines stored in the EPROM 112 include input and output routines to control the receipt of data input to the labeler 10, i.e., data collection routines and output routines such as a print routine and an upload routine. The command routines are described below with reference to FIGS. 5–35.

The input\output commands and associated command routines that control such operations as data collection, communications and printing are illustrated in FIGS. 5–12. These routines include a Get routine that allows the microprocessor 110 to control the receipt of data input from the keyboard 14, scanner 12 and the communication port 15, the received data being placed in the input buffer 134. A scanner initialize routine is used to initialize the scanner 12 to read the desired bar code symbology. A Locate routine is used to position a cursor on the display 16. A Download routine is used to download a new look up file into the labeler 10. It is noted that the downloading of a new application program and configuration records are controlled by the software routine shown in FIG. 36 discussed in detail below. An upload routine is used to upload files to the host computer via the communication port 15. A Print routine is used to print the contents of the print buffer 124 in a specified format, selected from a print format buffer 140. A Beep routine is used to sound a beeper 142 of the labeler 10. A System Set routine is used to set various system parameters of the labeler 10 including a scanner parameter, an autotrigger parameter, an autoenter parameter, a date length parameter, a multiple label parameter, a strips of labels parameter, a currency symbol parameter and a foreign prompt parameter. A System Check routine is used to check the status of various system parameters such as the voltage level of the labeler's battery or the available space in the RAM 114. It is noted that other data collection commands such as Move and Clear also perform data manipulation operations and are discussed in detail below.

Figure 5B:
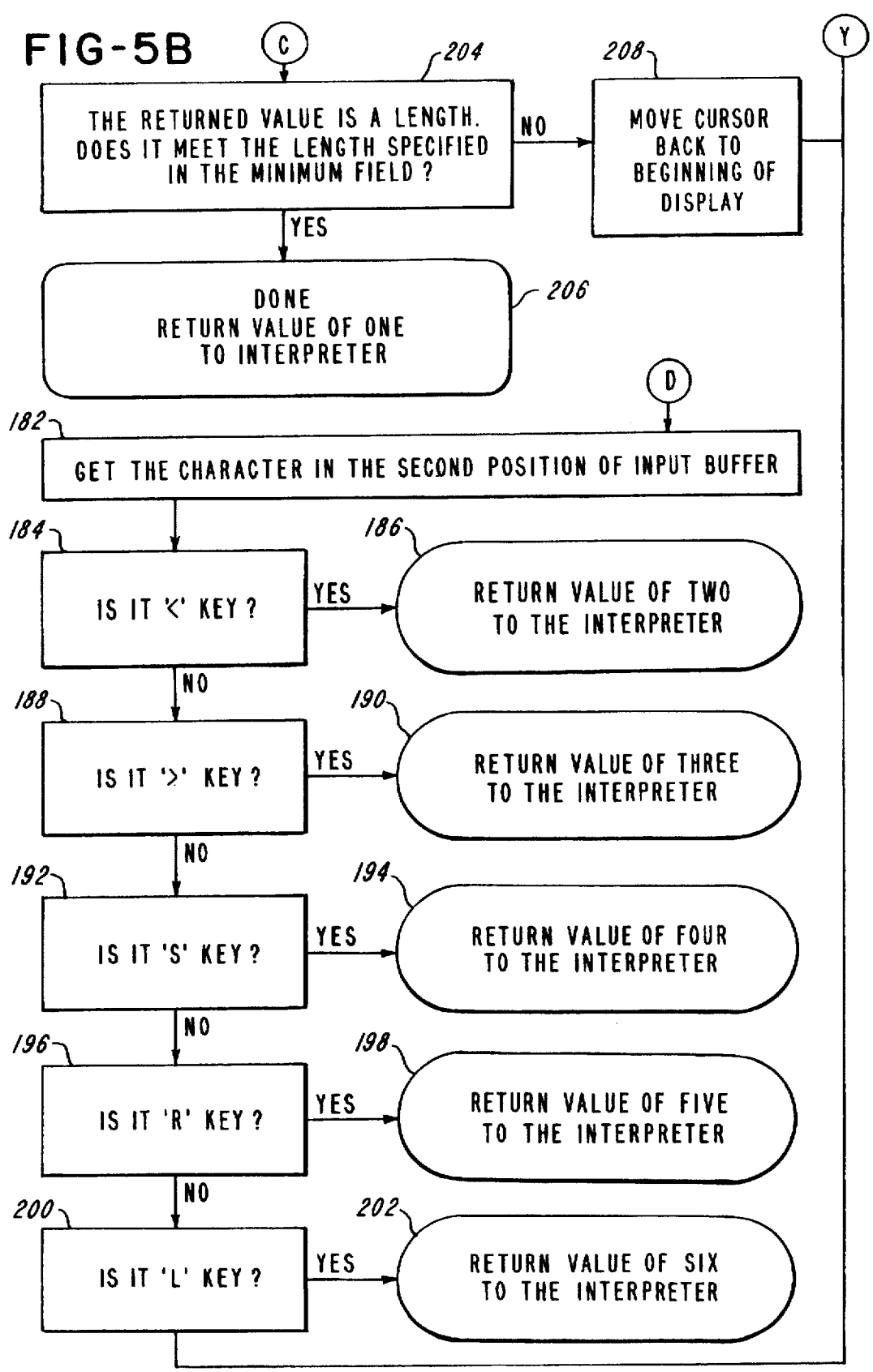
FIGS. 5A–B form a flow chart illustrating a Get command routine of the labeler.
Figure 5D:
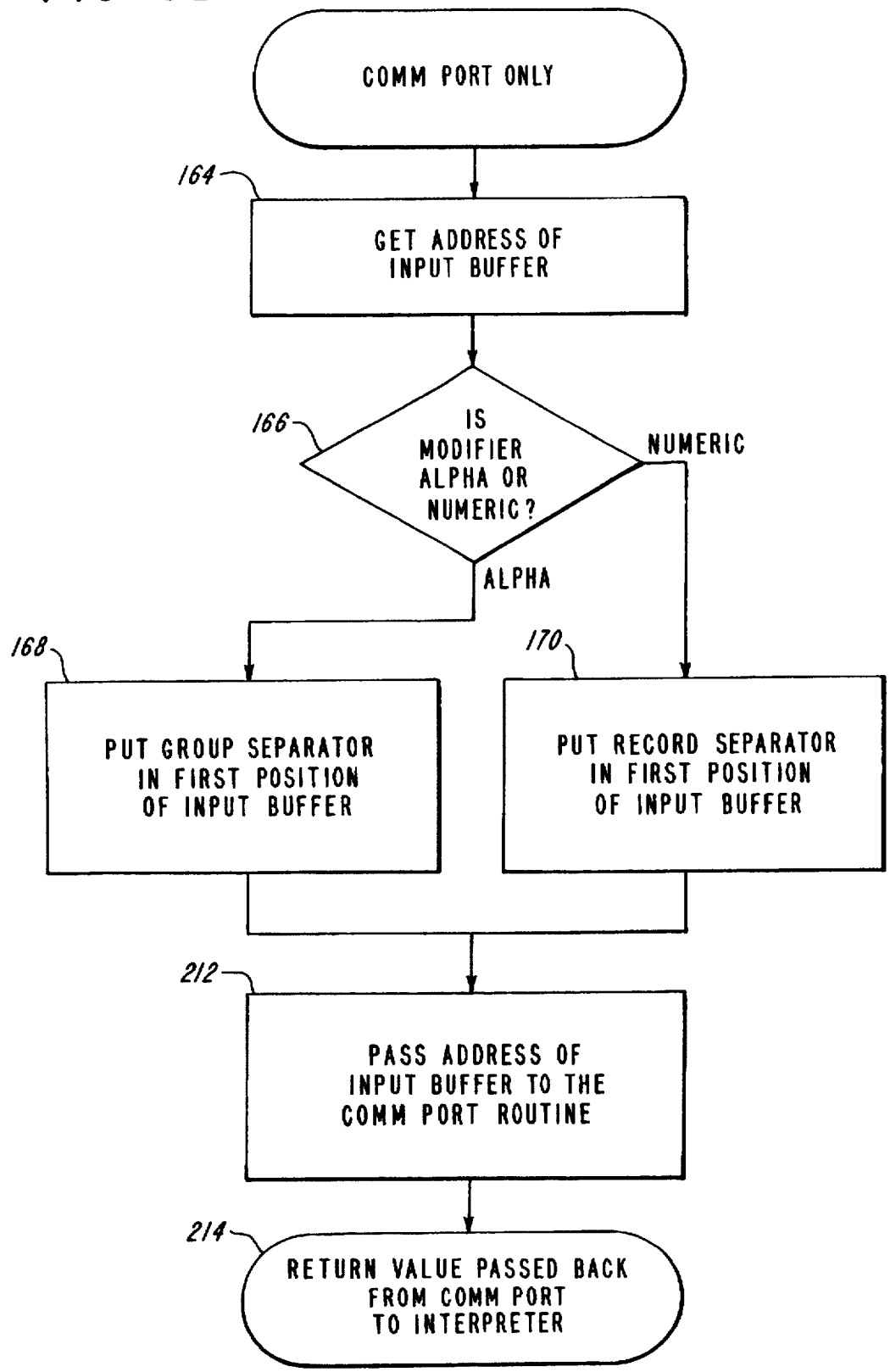

As shown in FIGS. 5A–B, the Get command and routine controls the receipt of data input to the labeler 10 from the keyboard 14, scanner 12 and communication port 15. The Get command includes information identifying whether the data to be input is alphanumeric or numeric, identifies the source of the input data, i.e., the scanner 12, keyboard 14 and/or communication port 15; and the minimum and maximum number of characters allowed for a valid data entry. Upon executing a Get command in accordance with the Get command routine, the microprocessor 110 at a block 152 determines from the Get command the source or sources of the input data. Thereafter, at a block 154 the microprocessor proceeds to the routine associated with the particular input source, i.e., a keyboard only routine, a scanner only routine, a keyboard/scanner routine and a communication port only routine.

It is noted that the keyboard only and keyboard/scanner routines are substantially the same and will therefore be described as one routine. If the source of input data is the keyboard or a combination of the keyboard and scanner, the microprocessor 110 at a block 156 determines whether the data to be received is alphanumeric or numeric as specified in the Get command and at respective blocks 158 and 160 the microprocessor 110 sets the input mode accordingly. Thereafter, the microprocessor proceeds to a block 162 where the position of the cursor on the display 16 is read and stored. Thereafter, at a block 164, the microprocessor 110 gets the address of the input buffer 164 and proceeds to block 166. At block 166 the microprocessor determines whether the mode is alphanumeric or numeric. If the mode is alphanumeric, the microprocessor proceeds to a block 168 to put a group separator in the first position of the input buffer. If the microprocessor determines at block 166 that the Get command has specified the numeric mode, at block 170 the microprocessor puts a record separator in the first position of the input buffer. The group separator and the record separator are used by other command routines to identify the type of data stored in the input buffer. From blocks 168 and 170 the microprocessor 110 proceeds to a block 172 to retrieve from the Get command the length of the maximum field. At block 174 the microprocessor passes the length of the maximum field obtained at block 172 and the address of an input buffer to an input routine to tell the input routine the maximum number of characters to get and where to put them. The input routine is responsive to this information to look for an interrupt from the particular input device, i.e., the keyboard or scanner and when the interrupt is received, the microprocessor 110 in accordance with the input routine moves the data to the input buffer 134. The input routine also causes the microprocessor 110 to return information regarding the actual length of the data taken into the input buffer 134 and whether an exception key has been hit as indicated by values returned from the execution of the input routine. At a block 175, the microprocessor 110 determines whether the returned values indicate that a "F" exception key has been actuated and if so returns a 0 to the application interpreter as discussed below. Similarly, at blocks 177 and 179 the microprocessor 110 determines whether the "L" exception key has been actuated or whether the "/" exception key has been actuated. The "F" exception key is actuated in order to exit the Get routine immediately. The "L" exception key is used to allow an operator to reload the paper supply and afterwards to resume the "getting" of information. The "/" exception key is actuated immediately preceding the actuation of one of the programmable keys. If the microprocessor determines at block 179 that the "/" exception key and a programmable key were actuated, the microprocessor proceeds to block 182 to determine from the second position of the input buffer which of the programmable keys has been actuated. The labeler 10 is illustrated with five programmable keys having the designations "<", ">", "S", "R", and "L" although more or less than five programmable keys may be provided in accordance with the present invention. If the microprocessor 110 determines at a block 184 that the "<" programmable key has been actuated, the microprocessor returns a value of two to the application program interpreter at a block 186. If the microprocessor determines at a block 188 that the ">" exception key has been actuated, the microprocessor at a block 190 returns a value of three to the application program interpreter. If the microprocessor determines at a block 192 that the "S" programmed key has been actuated the microprocessor at a block 194 returns a value of four to the application program interpreter. If the microprocessor determines at a block 196 that a "R" programmed key has been actuated the microprocessor returns a value of five to the application program interpreter at a block 198 and if the microprocessor determines at a block 200 that the "L" programmed key has been actuated, the microprocessor returns a value of six to the application program interpreter at a block 202. As discussed in detail below, the application program interpreter is responsive to the values returned from the Get routine to control the execution of the appropriate programmable key routine.

If the microprocessor 110 determines at block 179 that none of the exception keys were actuated, the microprocessor proceeds to a block 204 to determine whether the length value returned to the Get command routine from the input routine meets the minimum length required by the Get command and if so, the microprocessor 110 proceeds to block 206 to return a value of one to the application program interpreter indicating a valid return. If, however, the microprocessor 110 determines at block 204 that the minimum length requirement specified in the Get command has not been met, the microprocessor 110 at a block 208 moves the cursor on the display 16 to the starting position of the display and returns to block 162.

If the microprocessor 110 determines at block 154 that the input source is identified as the scanner 12 only, the microprocessor at a block 210 sets the input mode for scanner and proceeds to execute blocks 162, 164, 166, 168, 170, 172, 174, 204, 206, and 208 as discussed above. If the microprocessor determines at block 154 that the input source is the communication port 15 only, the microprocessor executes blocks 164, 166, 168 and 170 as discussed above. Thereafter, the microprocessor 110 proceeds to a block 212 to pass the address of the input buffer to a communication port routine that moves the data from the communication port 15 to the input buffer 134, passing back a return value to be passed to the application program interpreter.

Figure 6:
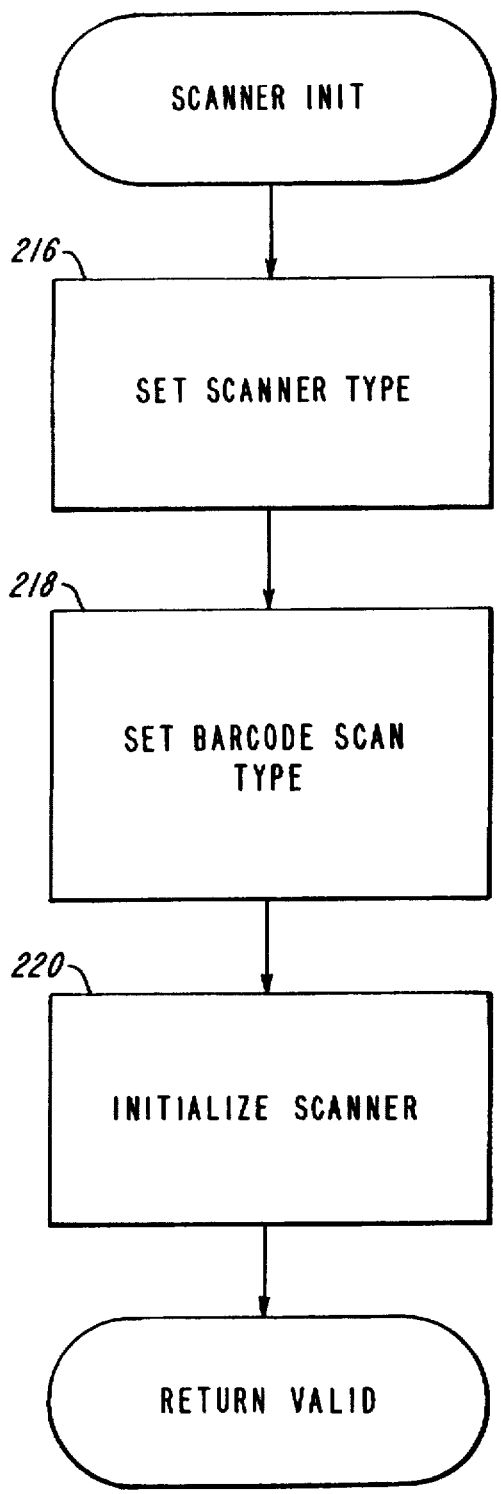
FIG. 6 is a flow chart illustrating a Scan Initialize command routine of the labeler.

The scanner initialization command and command routine as shown in FIG. 6 is used to initialize the scanner 12 to read the desired bar code symbology. The scanner initialize command includes information identifying the type of scanner 12 being used with the labeler 10 and the type of bar code to be scanned, i.e., for example, whether the bar code is a UPC bar code, a code 39 bar code, etc. In accordance with the scanner initialization command routine, the microprocessor 110 at a block 216 sets the scanner type according to the type of scanner identified in the scanner initialization command. Thereafter, at a block 218, the microprocessor 110 sets the bar code scan type to the bar code type identified in the scanner initialization command. Finally, at block 220 the microprocessor 110 initializes the scanner 12 to receive the type of bar codes designated in the command.

Figure 7:
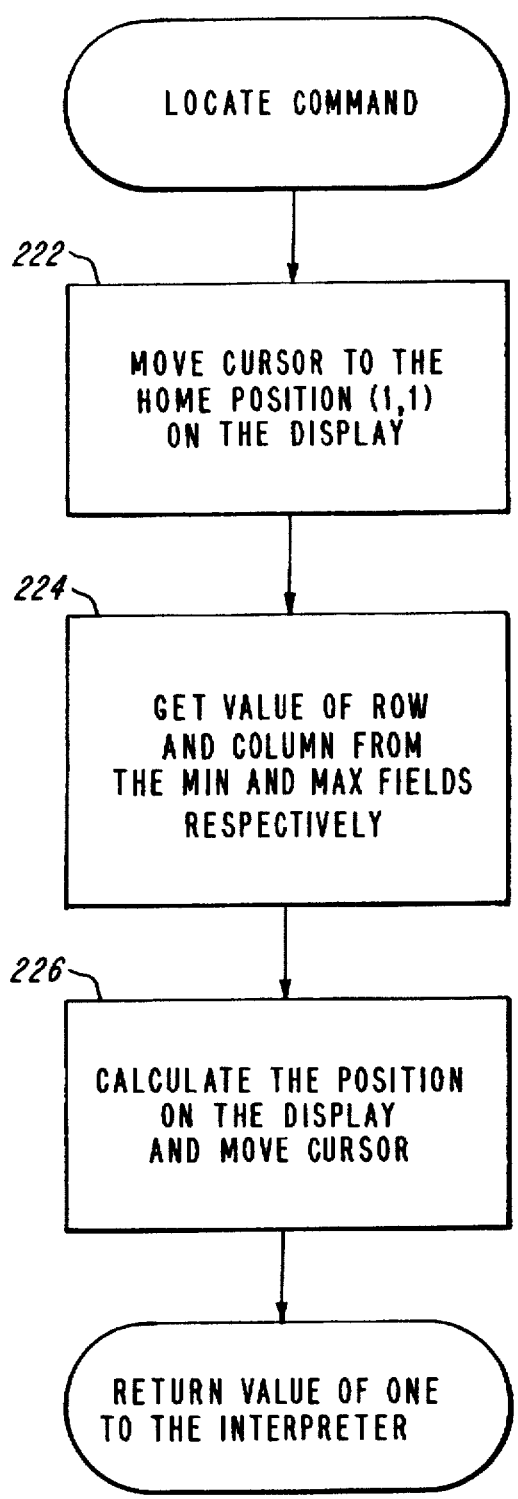
FIG. 7 is a flow chart illustrating a Locate command routine of the labeler.

The Locate command and command routine as depicted in FIG. 7 positions the cursor on the display 16 to the row and column of the display specified in the command. More particularly, at a block 222, the microprocessor 110 moves the cursor to the home position on the display 16 wherein the home position represents the first column in the first row of the display. Thereafter, at block 224 the microprocessor 110 gets the row and column positions specified in the Locate command and at block 226 calculates the position on the display 16 for the cursor and moves the cursor to the calculated position.

Figure 8:
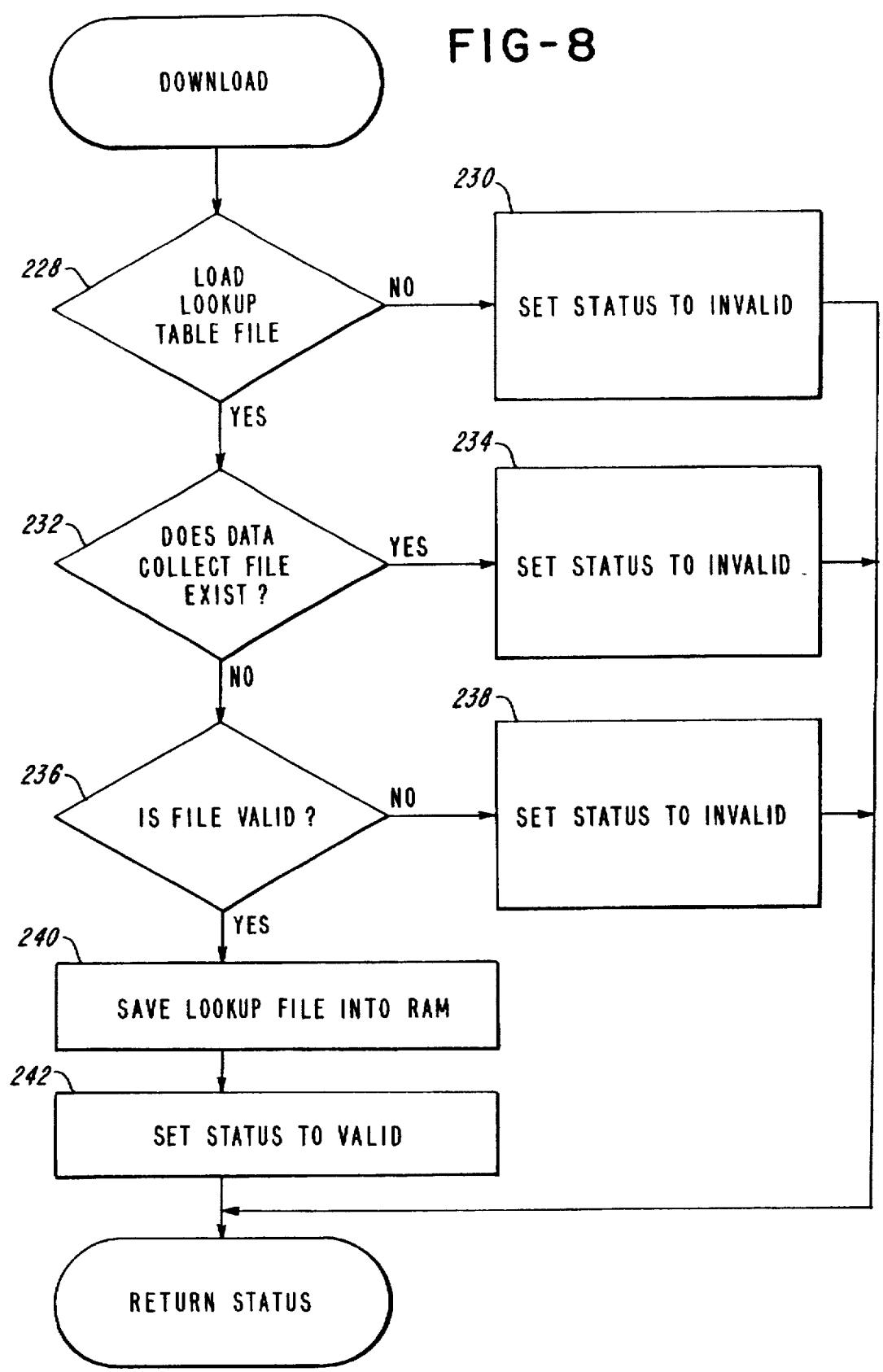
FIG. 8 is a flow chart illustrating a Download command routine of the labeler.

The Download command and command routine depicted in FIG. 8 is used to load a new look up table from the host computer to the labeler 10 via the communication port 15. It is noted that the look up table is the only file that is allowed to be downloaded by this command. An attempt to download any other information will cause a warning to be issued and an invalid path to be taken. In order for a successful download to occur the data collect file 132 must be empty. If the data collect file is not empty a warning is issued and the invalid path is taken. The download command essentially puts the labeler 10 into a receive mode. More particularly, in response to a download command, the microprocessor 110 at a block 228 determines whether this is an attempt to download a look up table or not. If the host computer is attempting to download a file other than the look up table, the microprocessor 110 proceeds from block 228 to block 230 to set the status to invalid so that a warning can be issued. If the microprocessor 110 determines at block 228 that the host computer is attempting to download a look up table, the microprocessor 110 proceeds to block 232 to determine whether the data collect file exists and at block 236 whether the data collect file is empty. If the microprocessor 110 determines that the data collect file does not exist or that the data collect does exist but is not empty, the microprocessor proceeds to respective blocks 234 or 238 to set the status to invalid. If, however, the microprocessor 110 determines that the data collect file does exist and is empty, the microprocessor 110 at block 240 saves the look up file received in the look up table file 130. From block 240, the microprocessor 110 proceeds to block 242 to set the return value to the valid status. It is noted that each command can optionally identify the respective paths of the application program to be taken if the command operation is performed in a "valid" manner or an "invalid" manner. If the "valid" and "invalid" paths are specified in the command, the return value when set to the valid status identifies the valid path to be taken and when set to the invalid status identifies the invalid path to be taken. Return values are discussed in more detail below with respect to the application program interpreter.

Figure 9:
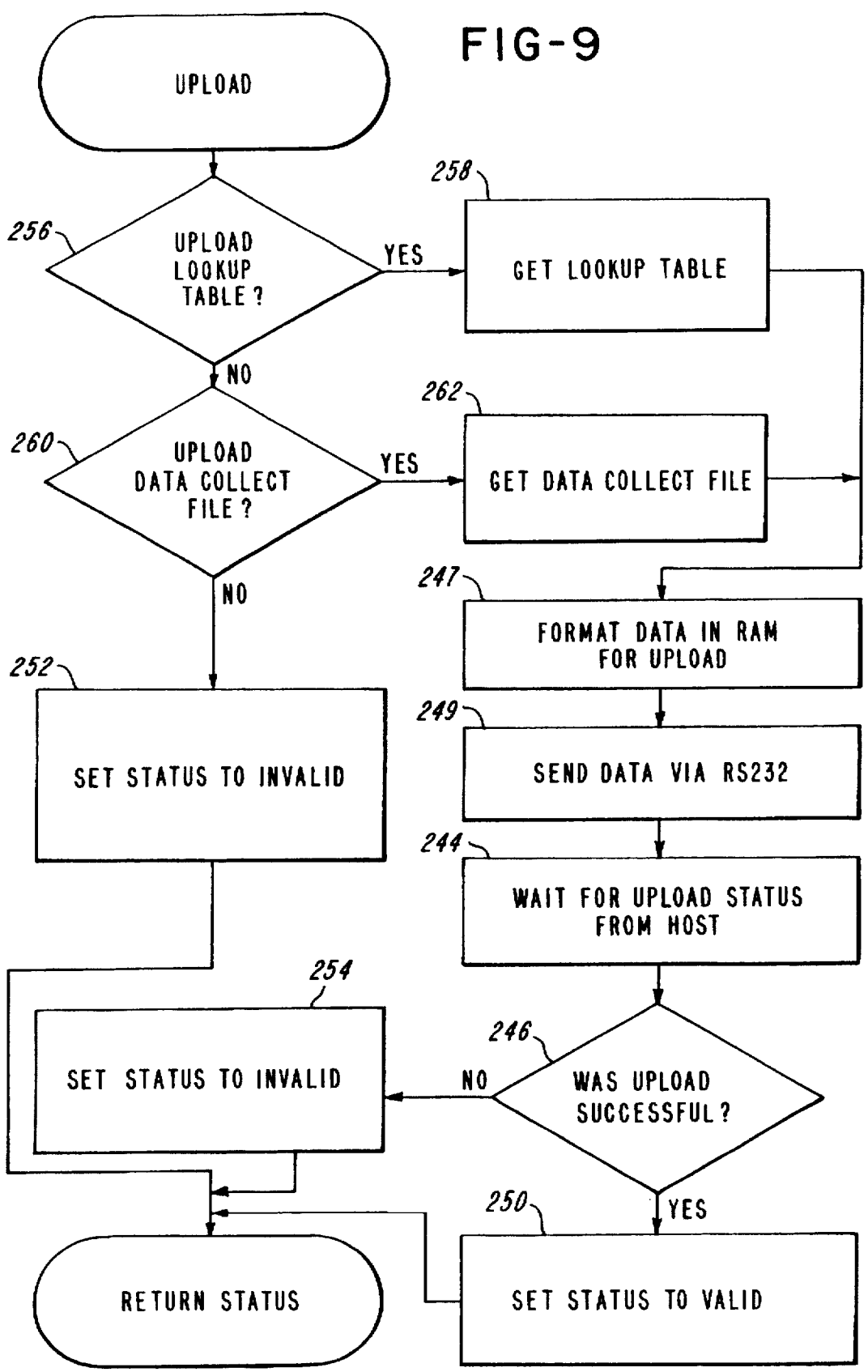
FIG. 9 is a flow chart illustrating an Upload command routine of the labeler.
Figure 10B:
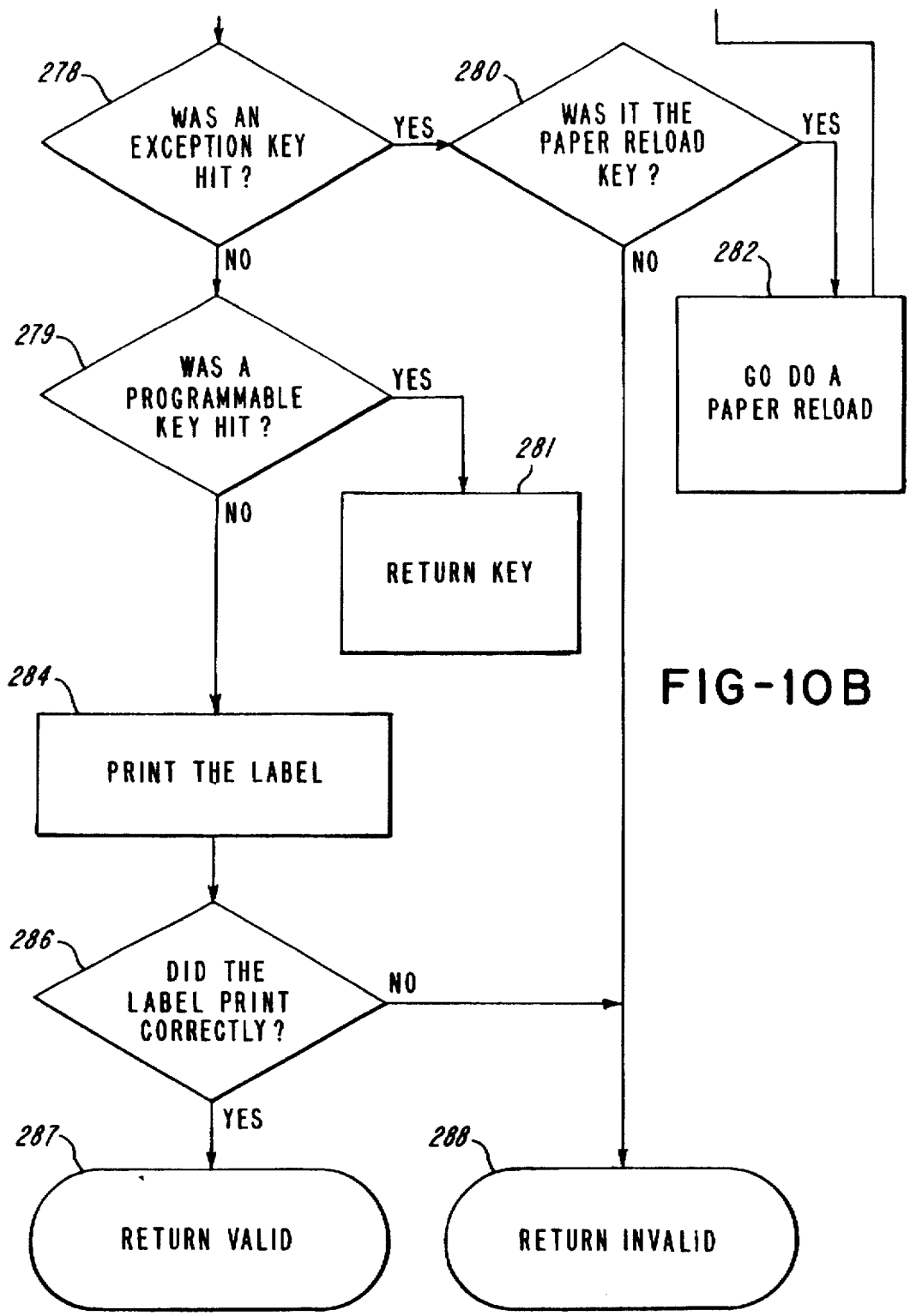
FIG. 10 is a flow chart illustrating a Print command routine of the labeler.

The Upload command and upload command routine depicted in FIG. 9 is used to upload either the data collect file 132 or the look up table file 130 to the host computer via the communication port 15. The upload command includes information identifying the data collect file and the look up file. More particularly, in response to an upload command, the microprocessor 110 at a block 256 determines whether the look up table is to be uploaded. If so, the microprocessor 110 at block 258 gets the look up table from the look up table file 130 and proceeds to block 247. At block 247 microprocessor 110 formats the look up table for an upload and at block 249 the microprocessor sends the look up table to the host computer via the communication port 15. Thereafter at a block 144 the microprocessor 110 waits for the status of the upload from the host computer. If the upload was successful as determined at block 246, the microprocessor 110 sets the return value to valid at a block 250. Otherwise, the return value is set to invalid. If the microprocessor determines at block 260 that the data collect file is to be uploaded, the microprocessor at block 262 gets the data collect file 132 from the RAM. 114 and implements blocks 247 and 249 to upload the data collect file to the host computer via the communication port 15. If neither the look up table or the data collect file were not specified in the upload command, the microprocessor 110 proceeds to block 252 from block 260 to set the return value to invalid.

The print command and command routine as shown in FIG. 11 allows the contents of the print buffer 124 to be printed in the format specified in the print command. More particularly, the print command includes information indicating to the microprocessor 110 whether to prompt for null fields or not as well as information identifying the format according to which the information in the print buffer 124 is to print, the allowable formats being stored in the print format buffer 140. In order to execute a print command, the microprocessor 110 at block 264 determines whether the format number specified in the print command is valid or not. If the format number is not valid, at block 265 the microprocessor 110 generates a system error and sets the return value to invalid. If however the format number specified in the print command is valid, the microprocessor 110 proceeds to block 266 from block 264 to move the data in the print buffer 124 to a system work buffer of the RAM 114. Thereafter, at block 268, the microprocessor 110 determines whether the print command specifies that null fields are to be prompted for or not. If null fields, i.e., missing data, are to be prompted for the microprocessor proceeds to block 272 to set the input mode to get data from the system buffer and to prompt the user for the missing data via the display 16. If the print command specifies that null fields are not to be prompted for, the microprocessor proceeds from block 268 to block 270 to set the input mode to get data from the system buffer but to skip the missing data. From block 272 or block 270, the microprocessor proceeds to block 274 to get the data from the system buffer and at block 276, the microprocessor 110 builds an image of the data to be printed for the print driver 27. Thereafter, at a block 278, the microprocessor 110 determines whether an exception key was hit or not and if so, the microprocessor at block 280 determines whether the exception key was the paper reload key. If the paper reload exception key was actuated as determined at block 280, the microprocessor 110 proceeds to block 282 to allow for paper to be reloaded in the labeler 10 and thereafter proceeds to block 274 to allow a label to be printed after the paper is reloaded. If the microprocessor determines at block 278 that no exception key was actuated, the microprocessor proceeds to block 279 to determine whether a programmable key was actuated after the "\" key. If so, the microprocessor 110 returns the programmable key at block 281 so that it can be processed. If neither an exception key or programmable key was actuated, the microprocessor 110 proceeds to block 284 to cause the print driver 24 to print a label. Thereafter, at block 286 the microprocessor 110 determines whether the label was printed correctly. If the label was printed correctly the microprocessor at block 287 sets the return value to valid and if the label did not print correctly the microprocessor 110 sets the return value to invalid at block 288 for the application program interpreter.

The Beep command and Beep command routine depicted in FIG. 11 is an output command and command routine of the labeler. More particularly, the microprocessor 110 is responsive to a beep command in an application program to sound the beeper 142 for 0.5 seconds at a block 290.

The System Set command and command routine depicted in FIG. 46 is used to set various system parameters of the labeler 10. The System Set command includes information identifying the particular parameter to be set, the parameter being the scanner, autotrigger, autoenter, date length, multiple labels, strips of labels, currency symbol or foreign prompts. When the System Set command identifies the scanner parameter, the command also includes information identifying the type of scanner 12 being used with the labeler 10 and the type of bar code to be scanned, i.e. for example, whether the bar code is a UPC bar code, a Code 39 bar codes etc. The System Set command can be used to initialize the scanner 12 in the same manner as the Scanner Initialize command is used. When the System Set command identifies the autotrigger parameter, the command also includes information indicating whether the autotrigger option is enabled or disabled. If the autotrigger option is enabled, a label is printed as soon as an image of the label is built in the print buffer without requiring actuation of the trigger 18 of the labeler 10. Similarly, when the System Set command identifies the autoenter parameter, the command includes information identifying whether the autoenter option is disabled or enabled. If the autoenter option is disabled, a user must actuate the enter key after information is scanned with the scanner 12. If the autoenter option is enabled, the enter key need not be actuated after a scan. When the System Set command identifies the date length parameter, the command also includes the allowable length of the system date of the labeler 10. When the System Set command identifies the multiple labels parameter, the command also includes information identifying the number of identical labels to be printed before a sequential count depicted on the label is incremented. When the System Set command identifies the strips of labels parameter, the command includes information identifying the number of duplicate labels to be printed by the labeler 10. When the System Set command identifies the currency symbol parameter, the command also includes information identifying the particular currency symbol to be used, i.e. the American dollar symbol, the British pound symbol, etc. When the System Set command identifies the foreign prompts parameter, the command also includes information identifying the foreign language to be used for prompts. Spanish, French or German prompts are available as well as English prompts. The microprocessor 110 is responsive to a System Set command to determine at a block 900 whether the scanner parameter is designated in the command and if so, the microprocessor proceeds to block 901 to set up the scanner 12 in a manner similar to that described above with respect to the scanner initialization command. If the microprocessor 110 determines at a block 902 that the System Set command includes the autotrigger parameter, the microprocessor proceeds to block 903 to either enable or disable the autotrigger option as specified in the System Set command. If the microprocessor 110 determines that the autoenter parameter is specified in the System Set command at a block 904, the microprocessor proceeds to block 905 to either enable or disable the autoenter option as specified in the command. If the microprocessor determines at a block 906 that the parameter specified in the System Set command is the date length parameter, the microprocessor proceeds to block 907 to set the length of the date as specified in the command. If the microprocessor determines at a block 908 that the multiple labels parameter is specified in the System Set command, the microprocessor proceeds to block 909 to set the multiple labels count as specified in the command. If the microprocessor determines at a block 910 that the strips of labels parameter is specified in the System Set command, the microprocessor proceeds to block 911 to set the strips of labels number to that designated in the System Set command. If the microprocessor determines at a block 912 that the currency symbol parameter is specified in the System Set command, the microprocessor proceeds to block 913 to set the appropriate currency symbol as specified in the command. Similarly, if the microprocessor 110 determines that the foreign prompt parameter is specified in the System Set command, the microprocessor proceeds to block 915 to set the foreign prompts to the language designated in the System Set command.

The System Check command and command routine depicted in FIG. 12 is used to check the status of the labeler battery and the RAM 114. The System Check command includes information identifying whether the battery or the RAM 114 is to be checked. The microprocessor 110 is responsive to a system check command to first determine at a block 292 whether the System Check command specifies that the battery is to be checked or not. If a system check on the battery is to be performed, the microprocessor 110 proceeds to block 294 to read the voltage on the battery. The microprocessor 110 thereafter proceeds to block 296 to determine whether the battery voltage is low or not. If the microprocessor 110 determines that the battery voltage is low, the microprocessor 110 sets the return status to invalid for the application program interpreter; but if the battery voltage is determined to be adequate, the microprocessor 110 sets the return status to valid. If the microprocessor determines at blocks 292 and a block 298 that a system check is to be performed on the RAM 114 as indicated by the System Check command, the microprocessor 110 proceeds to block 300 to read the amount of available space in the RAM 114. If the amount of available RAM space is less than 1K bytes of memory as determined at block 302, the microprocessor 110 sets the return value to invalid for the application program interpreter. Otherwise the microprocessor sets the return value to valid.

The data manipulation commands and command routines of the labeler 10 allow data to be sorted and associated with other data stored in the RAM 114 using the work buffers and files. Some manipulation command and command routines further perform mathematical operations on the data. Other manipulation and command routines are used to manage the data files whereas other commands and command routines provide controls for the application program itself. The data manipulation commands and command routines allow the user to have great flexibility in rearranging the data in the RAM 114 so that data input from various ones of the input sources 12, 14 and 15 can be selectively associated, at any time, to allow the associated data to be printed together or to be uploaded to the host computer together in order to minimize the need for processing the collected data at the host computer later on. The data manipulation commands and command routines are depicted in FIGS. 13–35.

A Move command and command routine as depicted in FIG. 13 is used to copy data from a source field to a destination field without affecting the contents of the source field. The Move command includes information identifying the source field of data wherein the source field may be the input buffer 134, an ASCII string number stored in the table 128, a literal value, a field in the temporary buffer 118, a field in the data collect work buffer 126, a field in the look up table work buffer 120 or a field in the header work buffer 122. The Move command also includes information identifying the destination of the data, the destination being the input buffer 134, a field in the print buffer 124, a field in the temporary work buffer 118, a field in the data collect work buffer 126, a field in the look up table work buffer 120, a field in the header buffer 122, the scanner 12, the communication port 15 or the display 16. The microprocessor 110 is responsive to a Move command to first get the source field data from the Move command at a block 304. Thereafter, the microprocessor 110 at a block 306 determines whether the destination designated in the Move command is the display 16 and if so the microprocessor 110 at a block 308 sends the field of data from the source identified in the command to the display 16, setting the return value to valid for the application program interpreter. If the microprocessor determines at a block 310 that the destination designated in the Move command is the scanner 12, the microprocessor 110 at block 312 sends the data to the scanner 12 and sets the return value to valid. Similarly, if the microprocessor 110 determines that the destination specified in the Move command is the communication port 15, the microprocessor proceeds from block 314 to a block 316 to send the data from the source specified in the Move command to the communication port 15, setting the return value to valid. If the destination designated in the Move command is neither the display 16, scanner 12 or communication port 314, the microprocessor 110 proceeds to block 318. At block 318, the microprocessor 110 copies the data in the specified source field to the specified destination field. Thereafter, at block 320 the microprocessor 110 determines whether the destination field was large enough for the source field data. If so, the microprocessor 110 sets the return value to valid; but if it was not large enough, the microprocessor 110 sets the return value to invalid.

Figure 14:
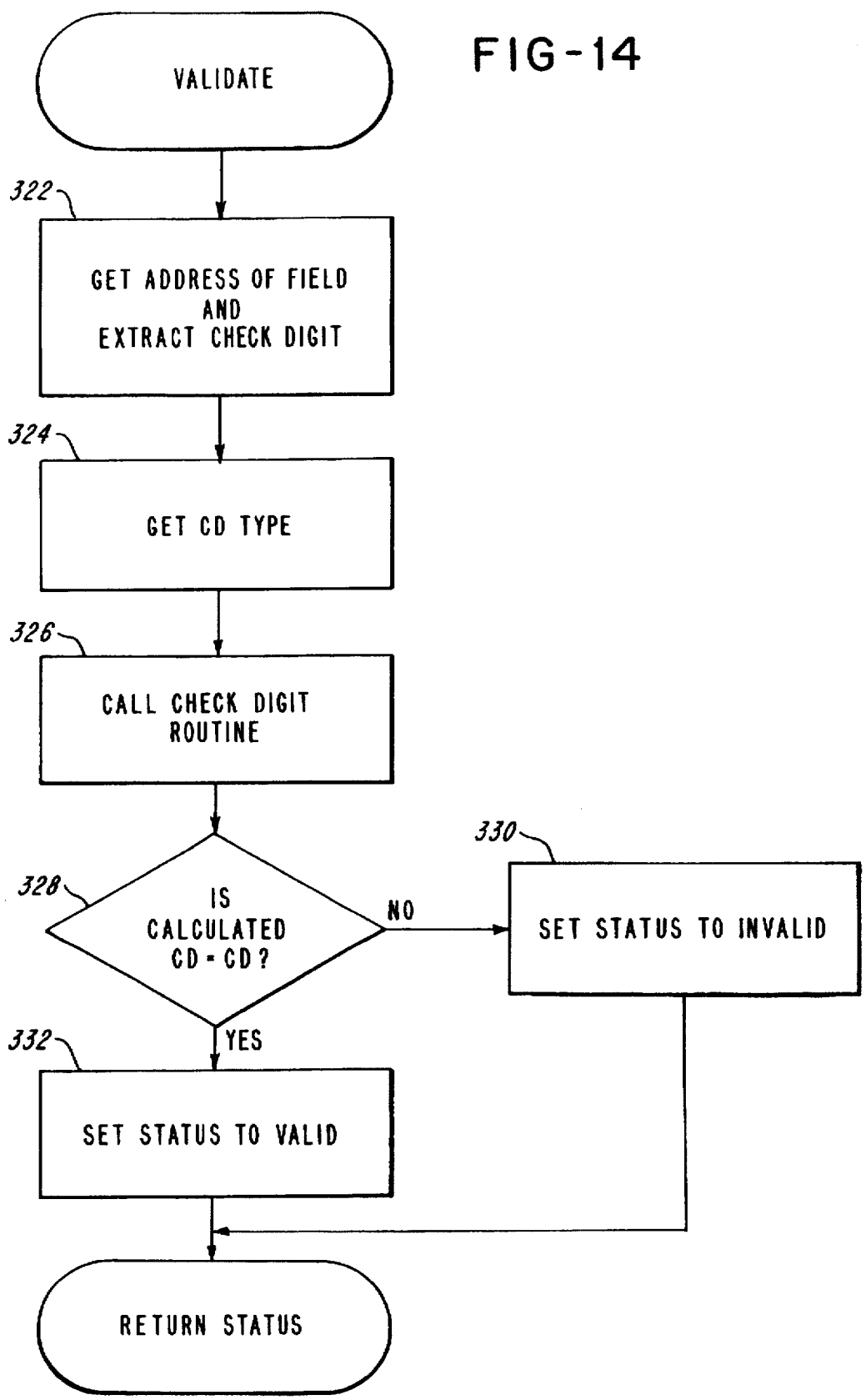
FIG. 14 is a flow chart illustrating a Validate command routine of the labeler.

A Validate command and command routine as depicted in FIG. 14 is used to validate a field of data utilizing the check digit of the field. The Validate command includes information identifying the field to be validated and the type of check digit used. The microprocessor 110 is responsive to a validate command to get the address of the field and extract the check digit from the field at a block 322. Thereafter, at block 324, the microprocessor 110 gets the type of check digit from the Validate command. At block 326 the microprocessor 110 calls a check digit routine associated with the check digit type specified in the Validate command to calculate a check digit value for the field specified. Thereafter, at block 328 the microprocessor 110 determines whether the check digit calculated at block 326 is equal to the check digit specified in the field of data. If it is not, the microprocessor 110 at block 330 sets the return value to invalid. If however the calculated check digit is equal to the check digit specified in the field of data, the microprocessor 110 sets the return value to valid status.

Figure 15:
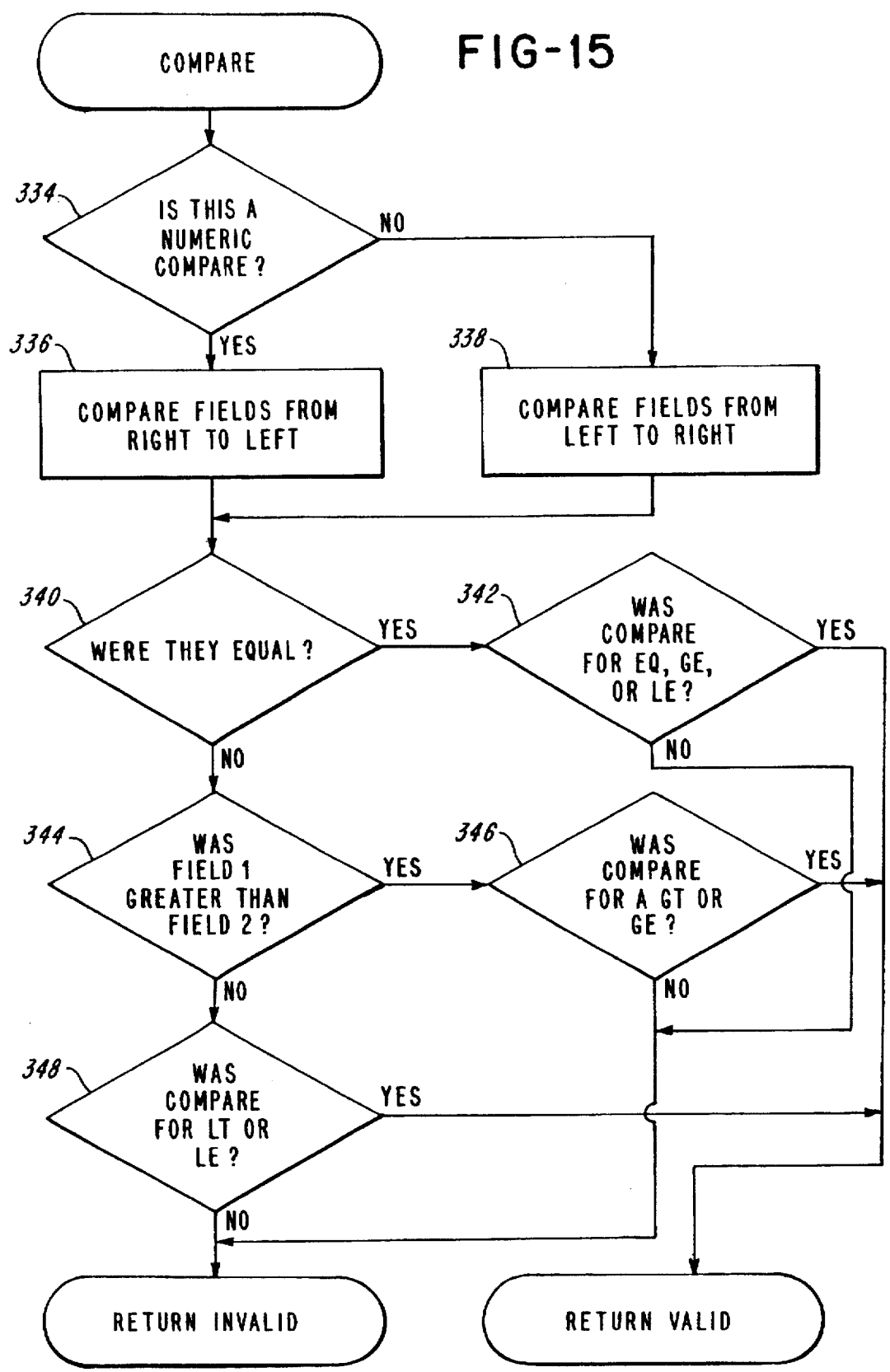
FIG. 15 is a flow chart illustrating a Compare command routine of the labeler.

A Compare command and command routine as shown in FIG. 15 is used to compare the contents of a first field with the contents of a second field. More particularly, the Compare command includes information indicating whether the Compare is to determine whether the contents of the first field is equal to the contents of the second field specified in the Compare command; or whether the contents of the first field is less than the contents of the second field specified in the Compare command; or whether the contents of the first field is greater than the contents of the second field specified in the Compare command; or whether the contents of the first field is less than or equal to the contents of the second field or whether the contents of the first field is greater than or equal to the contents of the second field. The first and second fields specified in the Compare command may each be a particular field in the input buffer 134, an ASCII string in the string table 128, a numeric field, a field in the temporary work buffer 118, a field in the data collect work buffer 126, a field in the look up table work buffer 120 or a field in the header work buffer 122.

In response to a Compare command the microprocessor 110 at a block 334 first determines whether the fields being compared are numeric or not. If the fields to be compared are numeric, the microprocessor 336 compares the specified fields from right to left; but if the compare is not numeric the microprocessor 110 at block 338 compares the fields from left to right. From blocks 336 and 338 the microprocessor proceeds to block 340 to determine whether the fields specified in the Compare command are equal and if so proceeds to block 342 to determine whether the Compare command was to determine whether the fields are equal, greater than or equal to or less than or equal to. If so, the microprocessor 110 sets the return value to valid. If the microprocessor 110 determines at block 342 that the Compare command was not to determine whether the fields were equal, greater than or equal to or less than or equal to, the microprocessor 110 sets the return status to invalid. If the microprocessor 110 determines at block 340 that the fields are not equal to one another, the microprocessor 110 proceeds to block 344 to determine whether the first field is greater than the second field. If the microprocessor determines that the first field is greater than the second field the microprocessor 110 proceeds to block 346 to determine whether the Compare command specified a greater than compare or a greater than or equal to compare and if so, the microprocessor sets the return status to valid. If the microprocessor at block 344 determines that the first field is not greater than the second field so that the first field must be less than the second field, the microprocessor 110 proceeds to block 348. At block 348 the microprocessor 110 determines whether the Compare command specified a less than compare or a less than or equal to compare and if so the microprocessor 110 sets the return value to valid. If however the microprocessor 110 at block 348 determines that the Compare command did not specify a less than compare or a less than or equal to compare, the microprocessor 110 set s the return value to the invalid status.

Figure 16:
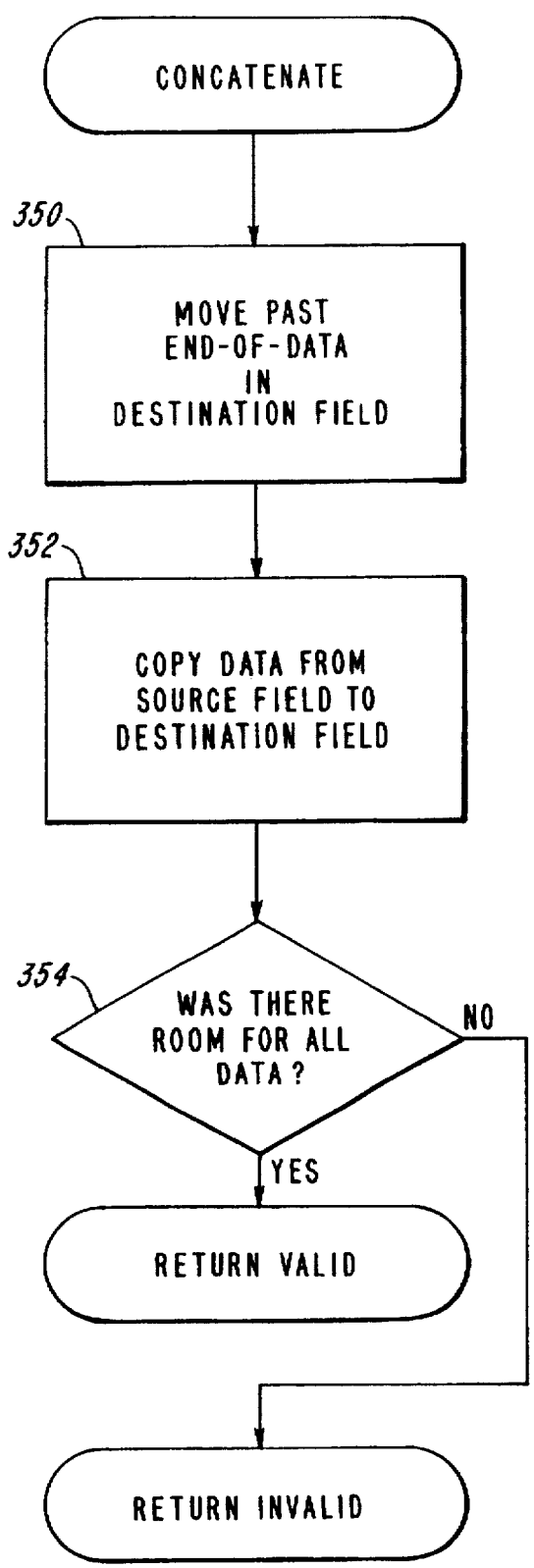
FIG. 16 is a flow chart illustrating a Concatenate command routine of the labeler.

A Concatenate command and command routine as shown in FIG. 16 is used to append data in a source field to data in a destination field but does not affect the contents of the source field. The Concatenate command includes information identifying the source field of data as well as information identifying the destination field of data. The source field of data may be the input buffer 134, a ASCII string number, a literal value, a field in the temporary work buffer 118, a field in the data collect buffer 126, a field in the look up table work buffer 120 or a field in the header work buffer 122. The destination field for the data may be the input buffer 134, a field in the print buffer 124, a field in the temporary work buffer 118, a field in the data collect work buffer 126, a field in the look up table work buffer 120 or a field in thee header work buffer 122. The microprocessor 110 is responsive to a Concatenate command to move at block 350 a pointer past the end of data in the destination field specified in the Concatenate command. Thereafter at a block 352, the microprocessor 110 copies the data from the source field identified in the Concatenate command to the specified destination field. At a block 354 the microprocessor 110 determines whether there was room in the destination field for the data from the source field and if not, the microprocessor 110 sets the return value to the invalid status. Otherwise, the microprocessor 110 sets the return value to the valid status.

Figure 17:
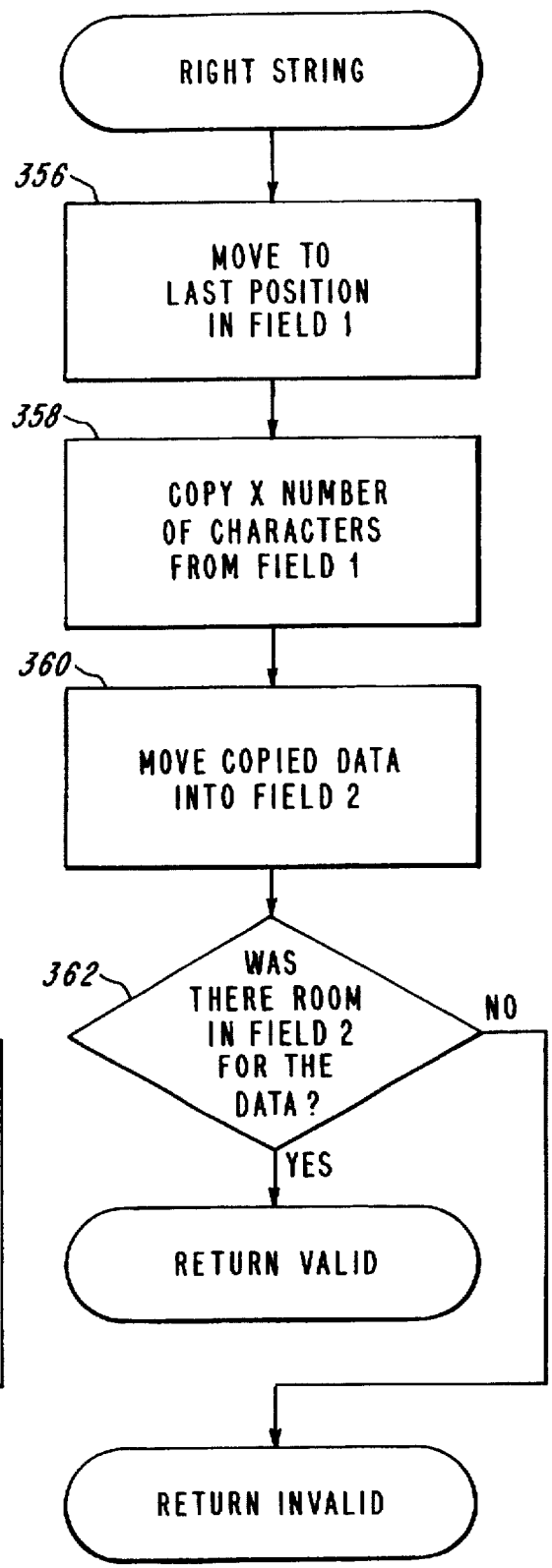
FIG. 17 is a flow chart illustrating a Right String command routine of the labeler.

A right string command and command routine as shown in FIG. 17 is used to extract a specified number of the right most characters from a string in a specified first field and copies them to a specified second field. The string command includes information identifying the number of right most characters to be extracted as well as the identity of the first and second fields which may be fields from the temporary work buffer 118, the data collect work buffer 126, the look up table work buffer 120 and the header work buffer 122. The first field may also be a field in the input buffer 133. The microprocessor 110 is responsive to a right string command to first move to the last position in the first field specified in the command string at a block 356. Thereafter, at a block 358, the microprocessor 110 copies the specified number of characters from the first field and at a block 360 moves the copied data into the specified second field. At a block 362 the microprocessor 110 determines whether there was enough space in the second field for the data in the first field. If not, the microprocessor 110 sets the return value to the invalid status. Otherwise, the return value is set to the valid status.

The left string command and command routine depicted in FIG. 18 is essentially the same as the right string command except that it is used to extract a specified number of the leftmost characters from the specified first field and to copy those characters to the specified second field. More particularly, the microprocessor 110 is responsive to a left string command to copy the specified leftmost characters in the first field specified in the left string command and at block 366 moves the copied characters into the second field specified in the left string command. Thereafter, the microprocessor 110 determines whether there was enough room in the second field for the data from the first field and if not, the microprocessor 110 sets the return value to the invalid status. Otherwise, the microprocessor 110 sets the return value to the valid status.

A mid string command and command routine as shown in FIG. 19 is similar to the right string and left string commands and command routines but is used to move characters in a specified mid position in a first field to a specified second field. The mid string command includes information identifying the first and second fields which can be any field from the buffers discussed above with the respect to the right string. The mid string command also includes information identifying the starting position in the first field from which the characters are to be taken and the number of the characters to be copied. More particularly, the microprocessor 110 is responsive to a mid string command to move at block 370 to the position specified in the mid string command in the specified first field to start to copy characters. Thereafter, the microprocessor 372 copies the specified number of characters starting with the specified position from the first field and at block 374 moves the copied characters into the specified second field. Thereafter, the microprocessor at block 376 determines whether there was enough room in the second field for the characters copied from the first field. If not, the microprocessor 110 sets the return value to the invalid status; otherwise, the return value is set to the valid status.

Figure 20:
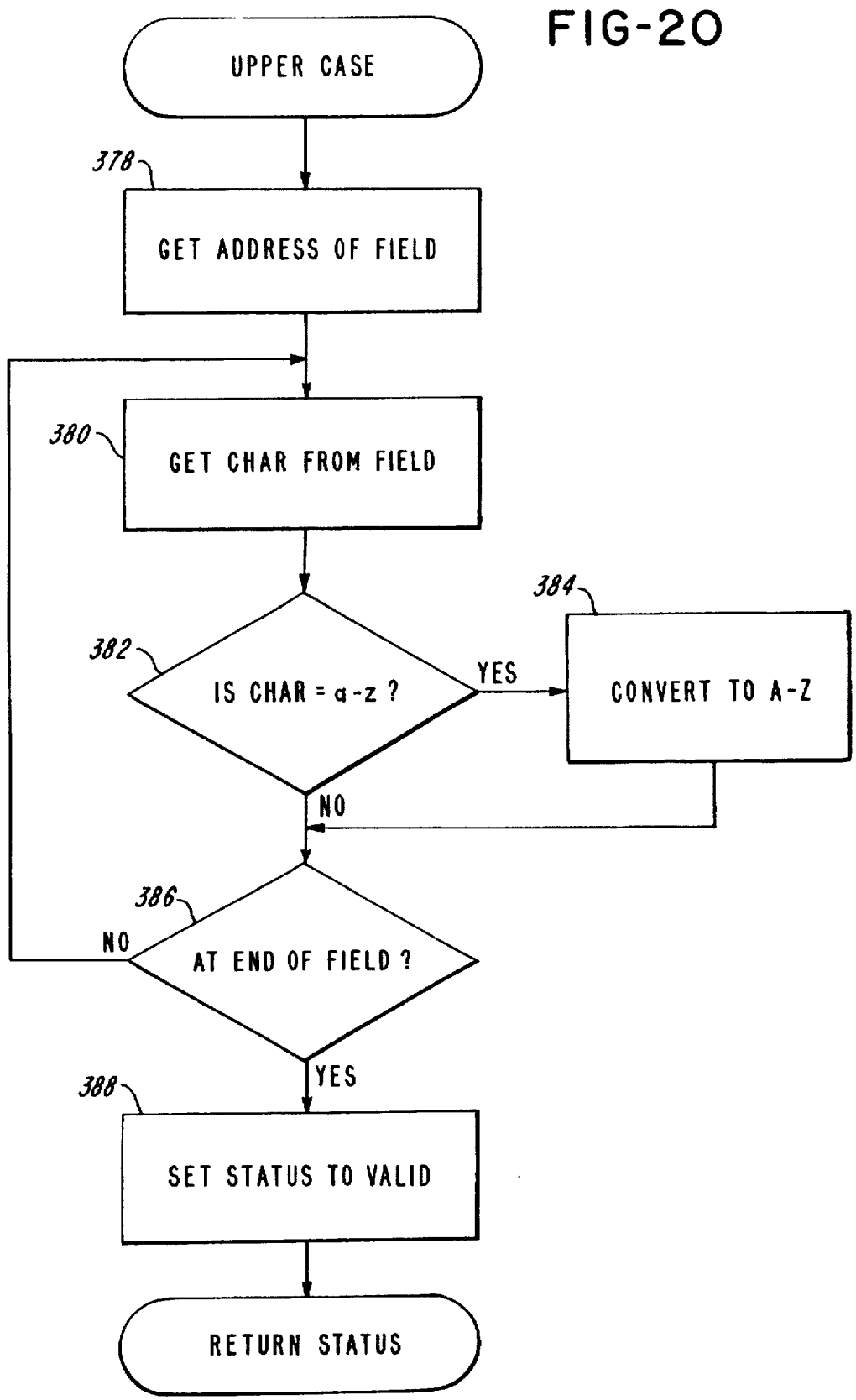
FIG. 20 is a flow chart illustrating an Upper case command routine of the labeler.

An Upper Case command and command routine as depicted in FIG. 20 is used to convert lower case characters to upper case characters wherein the Upper Case command specifies the field to be converted, the field being a field in the input buffer 134, the temporary buffer 118, the data collect work buffer 136, the look up table work buffer 120 or the header work buffer 122. More particularly, the microprocessor 110 is responsive to an upper case command to get at a block 378 the specified field from the Upper Case command. Thereafter, at a block 380 the microprocessor 110 gets a character from the field, incrementing a pointer to the next character in the field. At a block 382, the microprocessor 110 determines whether the character that was got at block 380 is a character from small a to small z and if so, the microprocessor 110 converts the character to a capital letter at a block 384. The microprocessor 386 then determines whether all of the alpha characters in the specified field have been capitalized and if not returns to block 380. When all of the alpha characters have been capitalized, the microprocessor 110 proceeds to block 388 to set the return value to the valid status.

Figure 47:
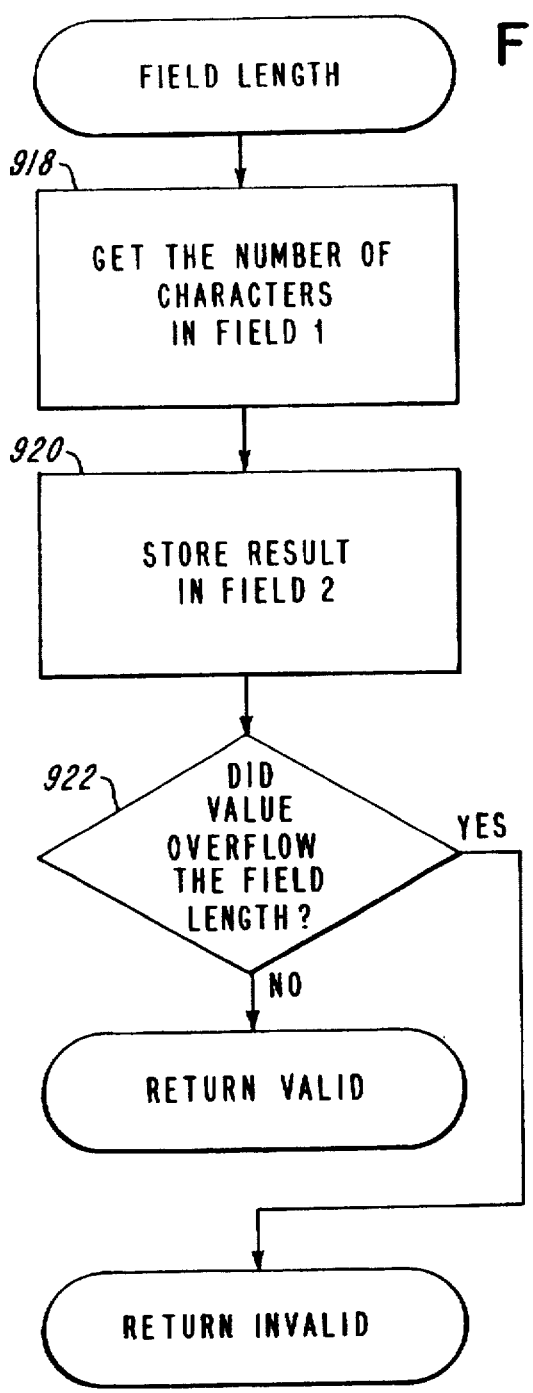
FIG. 47 is a flow chart illustrating a Field Length command routine of the labeler.

A Field Length command and command routine as depicted in FIG. 47 is used to place the length of the contents of a specified source field into a specified destination field. The source field identified in the Field Length command may be a field in the temporary work buffer 118, the data collect work buffer 126, the look up table work buffer 120 or the header work buffer 122. The destination field specified in the Field Length command may be a field from the temporary work buffer 118, the data collect work buffer 126, the look up table work buffer 120, the header work buffer 122 or the print work buffer 124. The microprocessor is responsive to a Field Length command to get the number of characters in the specified source field and at block 920 the microprocessor 110 stores the number in the specified destination field. Thereafter, the microprocessor determines at a block 922 whether the value stored in the destination field overflowed the field length. If so, the microprocessor sets the return value to invalid. Otherwise, the return value is set to valid.

Figure 49:
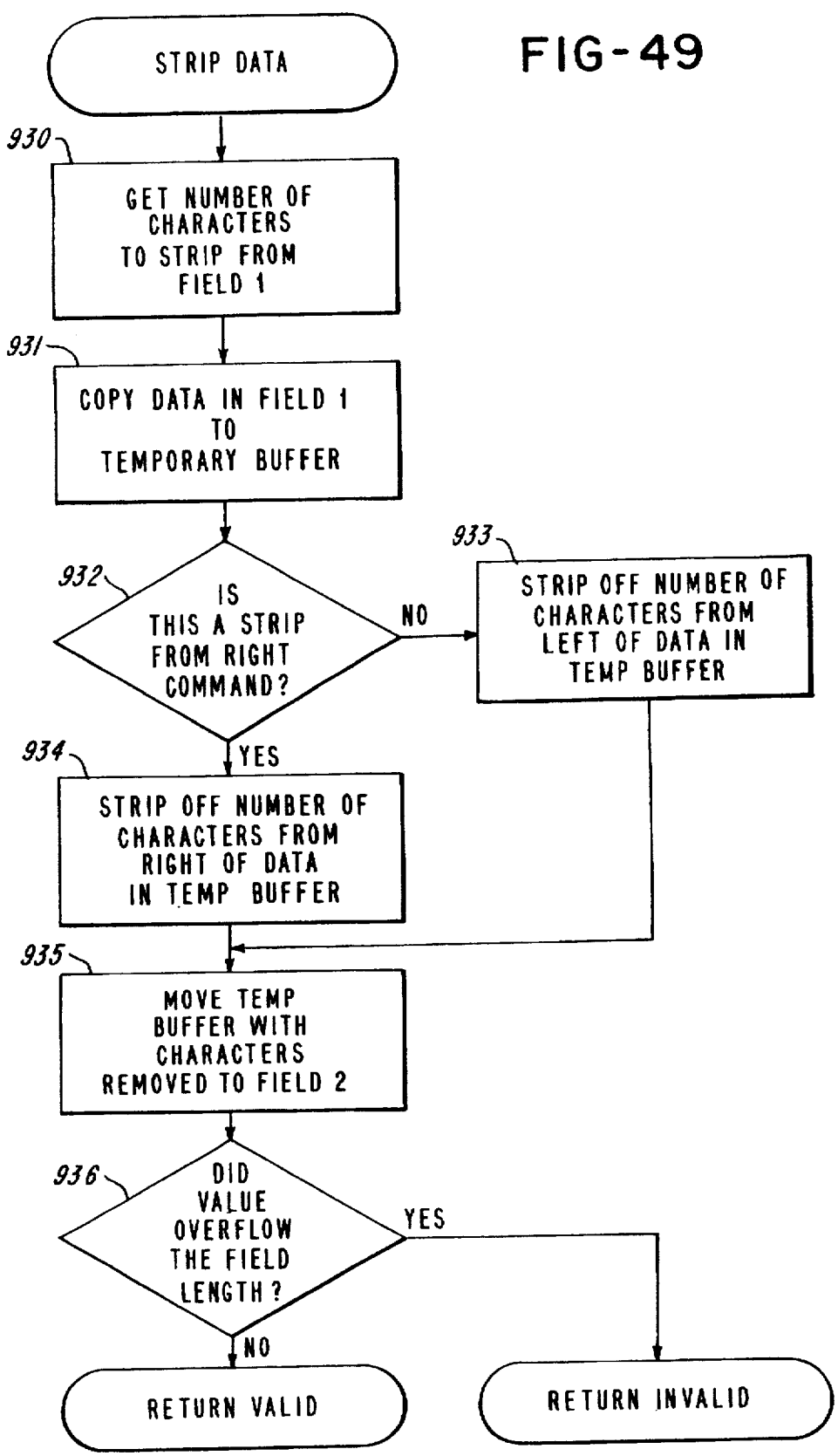
FIG. 49 is a flow chart illustrating a Strip command routine of the labeler.

A Strip command and command routine as depicted in FIG. 49 is used to strip off a number of characters specified in the command from a first field and to store the remaining characters of the first field in the second field. The Strip command includes information identifying whether the characters are to be stripped from the right or left and information identifying the number of characters to be stripped, the number being any number from 1 to 64. The first field specified in the Strip command may be a field in the input buffer 133, the temporary work buffer 118, the data collect work buffer 126, the look up table work buffer 120 or the header work buffer 122. The second field may be a field in the temporary work buffer 118, the data collect work buffer 126, the look up table work buffer 120 or the header work buffer 122. The microprocessor 110 is responsive to a Strip command to get at a block 930 the number of characters to be stripped as specified in the command. Thereafter, the microprocessor 110 at a block 931 copies the data in the specified first field to the temporary work buffer 118. At a block 932 the microprocessor 110 determines whether the characters are to be stripped from the right and if not, the microprocessor proceeds to block 933 to strip off the specified number of characters in the data field stored in the temporary work buffer from the left. Otherwise, the microprocessor proceeds from block 932 to block 934 to strip off the specified number of characters from the data field stored in the temporary work buffer from the right. At a block 935, the microprocessor 110 moves the remaining characters of the first field that are stored in the temporary work buffer to the second field designated in the Strip command. At a block 936, the microprocessor 110 determines whether the data overflowed the designated second field. If so, the microprocessor 110 sets the return value to the invalid status. Otherwise, the microprocessor sets the return value to the valid status.

An Add command and command routine is used to add the numerical values from a first and a second field both of which are identified in the Add command. The first and second fields may be any field in the temporary work buffer 118, the data collect work buffer 126, the look up table buffer 120 or the header work buffer 122. In addition, the first field may be a literal value that is specified in the Add command. The result of the add operation is saved in the second field. More particularly, the microprocessor 110 is responsive to an Add command to add at a block 390 the contents of the first field specified in the command to the contents of the second specified field, the sum being saved in the second specified field. Thereafter, the microprocessor 110 determines whether the sum overflowed the field length and if so sets the return status to invalid. Otherwise the return value is set to valid.

A Subtract command and command routine as depicted in FIG. 22 is used to subtract the contents of a first specified field from the contents of a second specified field, the result being stored in the second specified field. The first and second fields for a Subtract command may be chosen from the same buffers as discussed above with respect to the Add command wherein the first field may also be a specified literal value. The microprocessor 110 is responsive to a Subtract command to subtract at a block 394 the contents of the first specified field from the contents of the second specified field. Thereafter, at a block 396 the leading zeros, if any, are stripped and at block 398 the microprocessor determines whether the resulting value in the second field went negative. If so, the return value is set to the invalid status; otherwise the return value is set to the valid status.

An Increment command and command routine as depicted in FIG. 23 is similar to the Add command and command routine but is used to increment a specified numeric field by one. The Increment command includes the identity of the field to be incremented which may be a field from the temporary work buffer 118, the data collect work buffer 136, the look up table work buffer 120, or the header work buffer 122. More particularly, the microprocessor 110 is responsive to an increment command to add one to the contents of the specified second field at a block 400. Thereafter, at a block 402 the microprocessor determines whether the value overflowed the length of the specified second field and if so sets the return value to invalid. Otherwise, the microprocessor 110 sets the return value to the valid status.

A Decrement command and command routine as depicted in FIG. 24 is similar to the Subtract command and command routine but is used to decrement a specified numeric field by one. The Decrement command includes the identity of the second field which may be a field in the temporary work buffer 118, the data collect buffer 126, the look up table work buffer 120 or the header work buffer 122. The microprocessor 110 is responsive to a decrement command to subtract at a block 404 one from the contents of the second field specified in the Decrement command. Thereafter, at block 406, the microprocessor 110 strips the leading zeros if there are any. At block 408 the microprocessor determines whether the value in the second field went negative and if so sets the return value to the invalid status. Otherwise, the microprocessor 110 sets the return value to the valid status.

Figure 48:
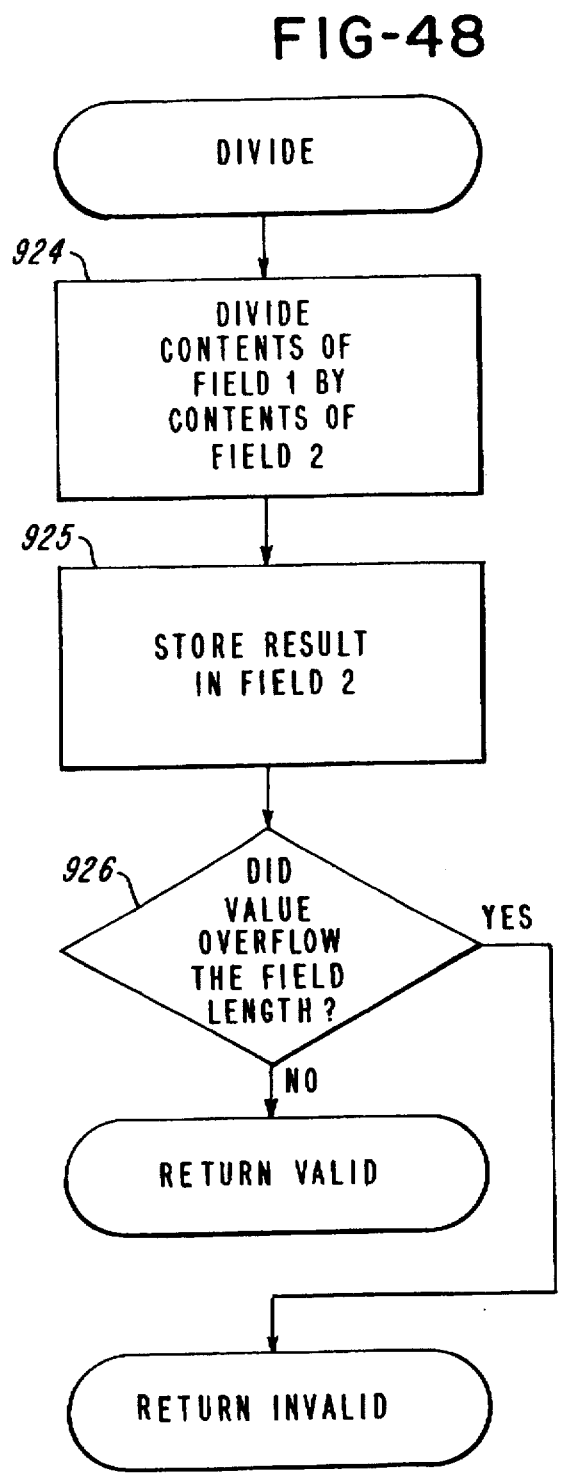
FIG. 48 is a flow chart illustrating a Divide command routine of the labeler.

A Divide command and command routine as depicted in FIG. 48 is used to divide the contents of a specified first field by the contents of a specified second field. This is an integer divide operation where the result of the operation is rounded up and stored in the designated second field. The first field may be a field from the temporary work buffer 118, the data collect work buffer 126, the look up table work buffer 120 or the header work buffer 122. The first field may also be a specified numeric value. The second field may be a designated field in the temporary work buffer 118, the data collect work buffer 126, the look up table work buffer 120 or the header work buffer 122. The microprocessor 110 is responsive to a Divide command to divide at a block 924 the contents of the specified first field by the contents of the specified second field. At a block 925, the microprocessor 110 stores the result in the second field. At a block 926 the microprocessor 110 determines whether the value overflowed the second field and if so, the microprocessor sets the return value to the invalid status. Otherwise, the microprocessor sets the return value to the valid status.

A Multiply command and command routine as depicted in FIG. 50 is used to multiply the contents of a first specified field by the contents of a second specified field, the result being saved in the second specified field. The first field may be a field from the temporary work buffer 118, the data collect work buffer 126, the look up table work buffer 120 or the header work buffer 122. The first field may also be a specified numeric value. The second field may be a field from the temporary work buffer 118, the data collect work buffer 126, the look up table work buffer 120 or the header work buffer 122. In response to a Multiply command the microprocessor 110 at a block 938 multiplies the contents of the first field by the contents of the second field. At block 940, the microprocessor 110 stores the product of the two fields in the second field. The microprocessor 110 then determines at a block 942 whether the product overflowed the second field. If so, the return value is set to invalid. Otherwise the return value is set to valid.

Figure 25C:
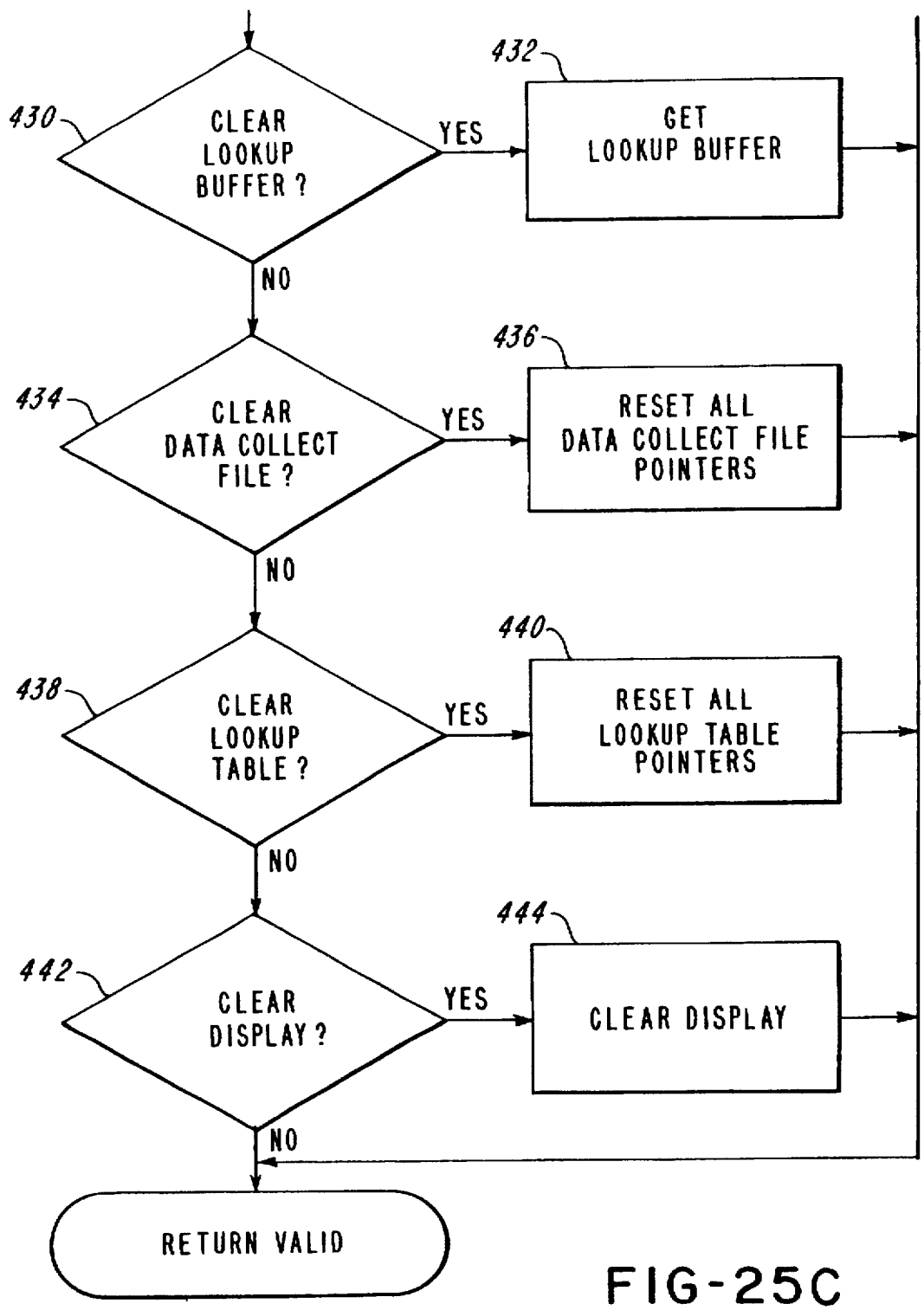
FIG. 25 is a flow chart illustrating a Clear command routine of the labeler.
Figure 26:
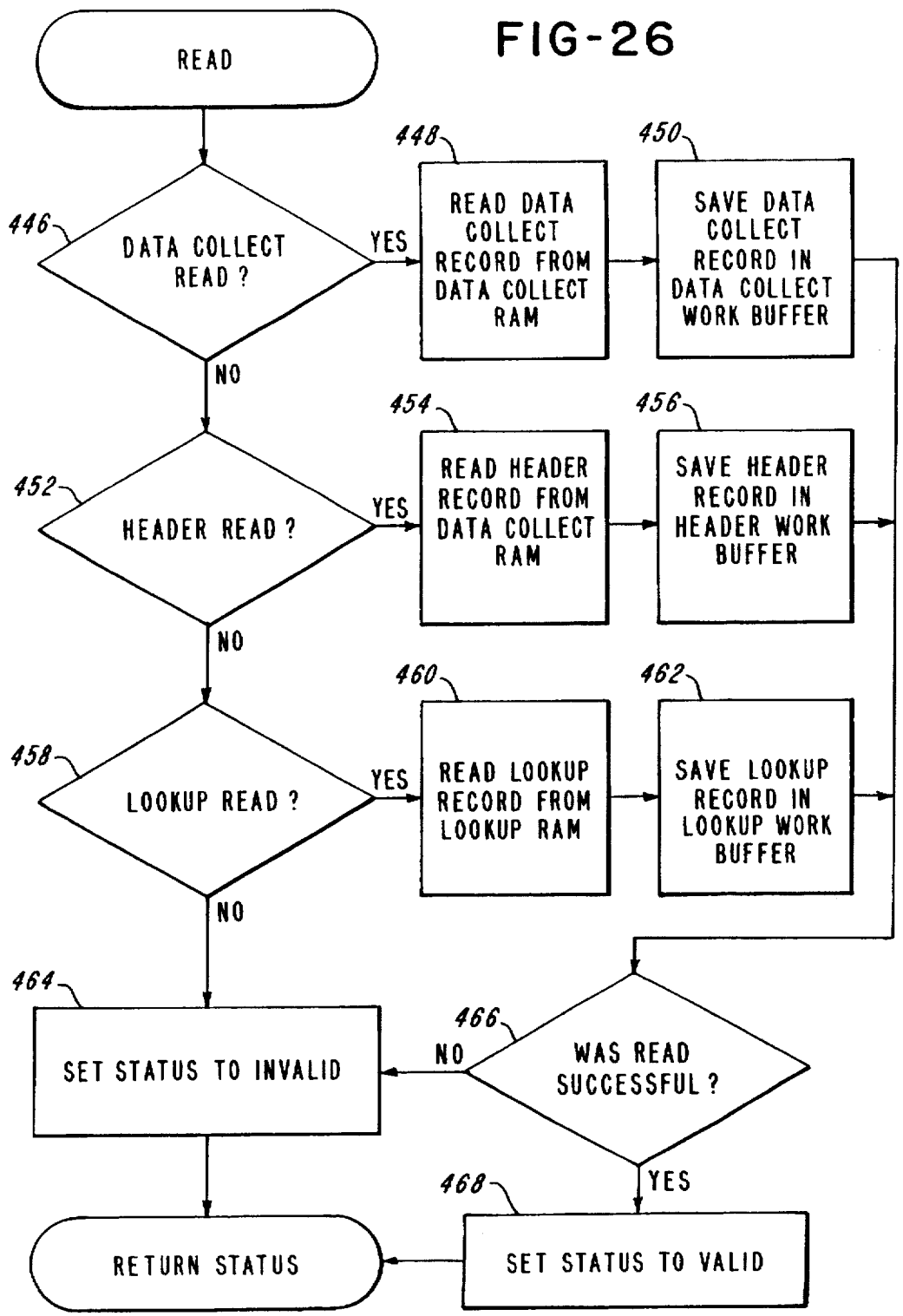
FIG. 26 is a flow chart illustrating a Read command routine of the labeler.

A Clear command and command routine as depicted in FIG. 25 is used to clear the work buffers, the files, the display 16 or a specified field. More particularly, the Clear command includes the identity of the labeler element to be cleared such as the print buffer 124, the data collect work buffer 126, the entire data collect file 132, the look up table work buffer 120, the entire look up table file 130, the temporary work buffer 118, the header buffer 122, the input buffer 134, the display 16 or a specified field in the temporary work buffer 118, the data collect work buffer 126, the look up table work buffer 120, the header work buffer 122 or in the print buffer 124. More particularly, the microprocessor 110 is responsive to a Clear command to first determine at a block 410 whether the Clear command specifies a particular field to be cleared and if so, the microprocessor proceeds to block 412 to clear the specified field, thereafter, setting the return value to the valid status. If the microprocessor 110 determines at a block 414 that the Clear command specifies the data collect buffer 126, the microprocessor 110 at a block 416 gets the address of the data collect work buffer 126 and clears the buffer. Similarly, if the microprocessor 110 determines at respective blocks 418, 422, 426 and 430 that the Clear command specifies the temporary work buffer 118 or the print buffer 124 or the input buffer 134 or the look up table work buffer 120, the microprocessor 110 at a respective block 420, 424, 428 or 432 gets the address of the buffer specified in the Clear command and clears the specified buffer. If the microprocessor 110 determines at a block 434 that the Clear command specifies that the data collect file 132 is to be cleared, the microprocessor proceeds to block 436 to reset all of the data collect file pointers to clear the file. Similarly, if the microprocessor 110 determines at a block 438 that the Clear command specifies that the look up table file 130 is to be cleared, the microprocessor proceeds to block 440 to reset all of the look up table pointers to clear the file 130. If the microprocessor 110 determines that the display 16 is to be cleared at a block 442, the microprocessor proceeds block 444 to clear the display, thereafter setting the return value to the valid status.

A Read command and command routine is used to move records from either the data collect file 132 or the look up table file 130 into the appropriate work buffer. The Read command includes information identifying whether a data collect read, header read or look up read is to be performed. More particularly, the microprocessor 110 is responsive to a Read command to first determine at a block 446 whether the Read command specifies the data collect file. If so, the microprocessor 110 proceeds to block 448 to copy a data record to which a pointer is pointing from the data collect file 132 to the data collect work buffer 126 where the data collect record is saved at a block 450. If the Read operation is successful as determined by the microprocessor at block 466 the microprocessor sets the return value to the valid status at a block 468; otherwise, the return value is set to the invalid status at a block 464. If the microprocessor 110 determines that the Read command identifies the header work buffer at a block 452, the microprocessor 110 proceeds to a block 454. At the block 454, the microprocessor 110 reads a header record pointed to in the data collect file 132 and at block 456 copies and saves the read header record in the header work buffer 122. Thereafter, the microprocessor 110 proceeds to block 466. If the microprocessor 110 determines at a block 458 that the Read command specifies the look up file 130, the microprocessor proceeds to block 460. At block 460 the microprocessor 110 reads the look up table record from the file 130 that is being pointed to and at block 462 the microprocessor 110 saves the look up record in the look up work buffer 120. Thereafter, the microprocessor proceeds to block 466.

Figure 27:
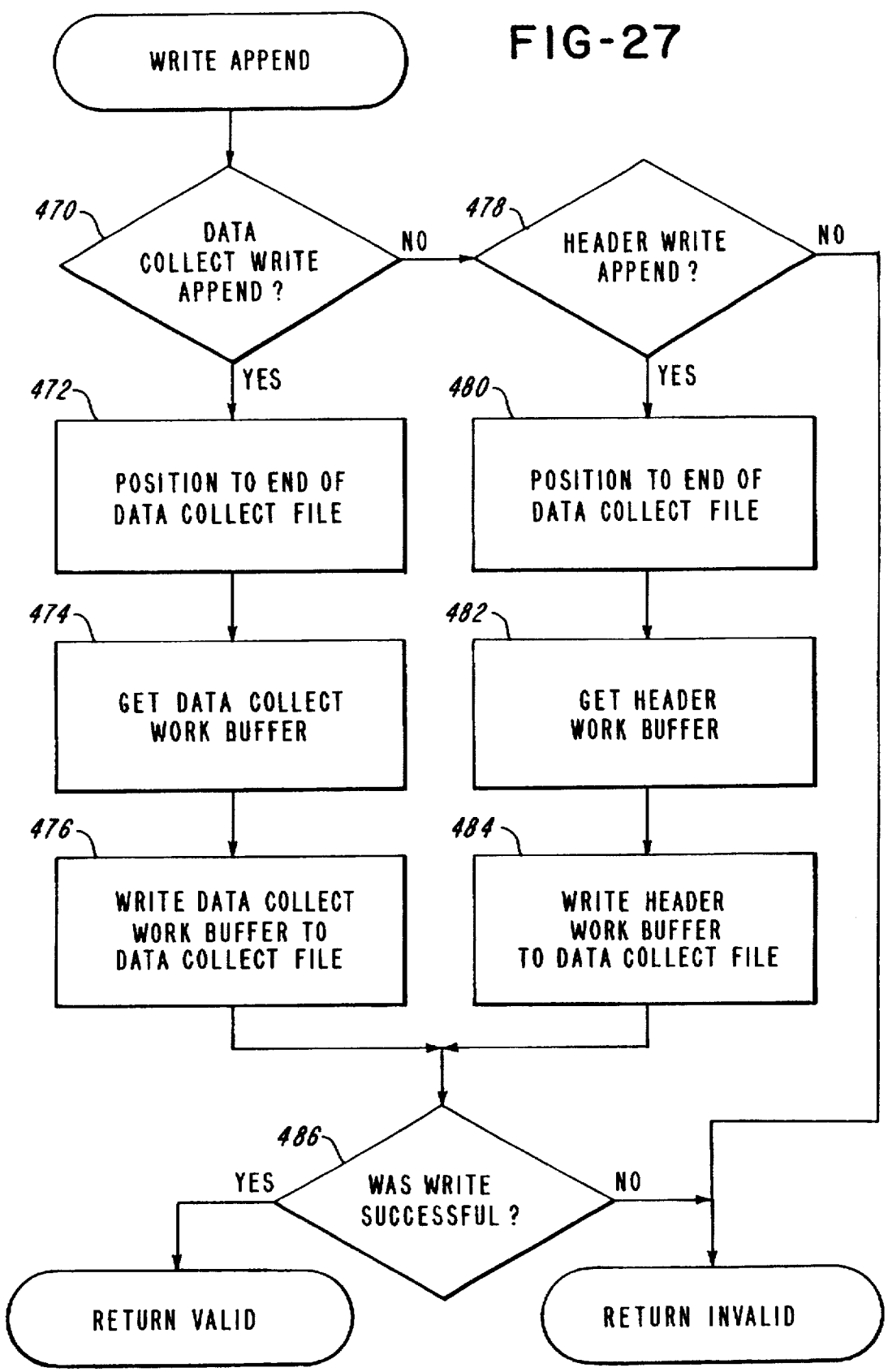
FIG. 27 is a flow chart illustrating a Write Append command routine of the labeler.

A Write Append command and command routine as shown in FIG. 27 is used to save the contents of a specified work buffer in the data collect file 132. The Write Append command includes information identifying whether the contents of the header buffer 122 or the data collect buffer 126 is to be saved in the data collect file 132. The microprocessor 110 is responsive to a Write Append command to first determine at a block 470 whether the command specifies the data collect work buffer. If so, the microprocessor 110 proceeds to block 472 to position a pointer to the end of the data collect file 132. Thereafter, at a block 474, the microprocessor 110 gets the data in the data collect work buffer 126 and at a block 476 writes the data to the data collect file 132 starting at the position in the file 132 determined at block 472. If the microprocessor 110 determines at a block 478 that the Write Append command specifies the header work buffer 122, the microprocessor proceeds to block 480. At block 480 the microprocessor 110 positions a pointer to the end of the data collect file 132. Thereafter, at a block 482, the microprocessor 110 gets the data in the header work buffer 122 and at a block 484 writes the data from the header work buffer 122 into the data collect file 321. If the microprocessor 110 determines at block 486 that the Write command was successful, the microprocessor sets the return value to the valid status; otherwise the return value is set to the invalid status.

Figure 28:
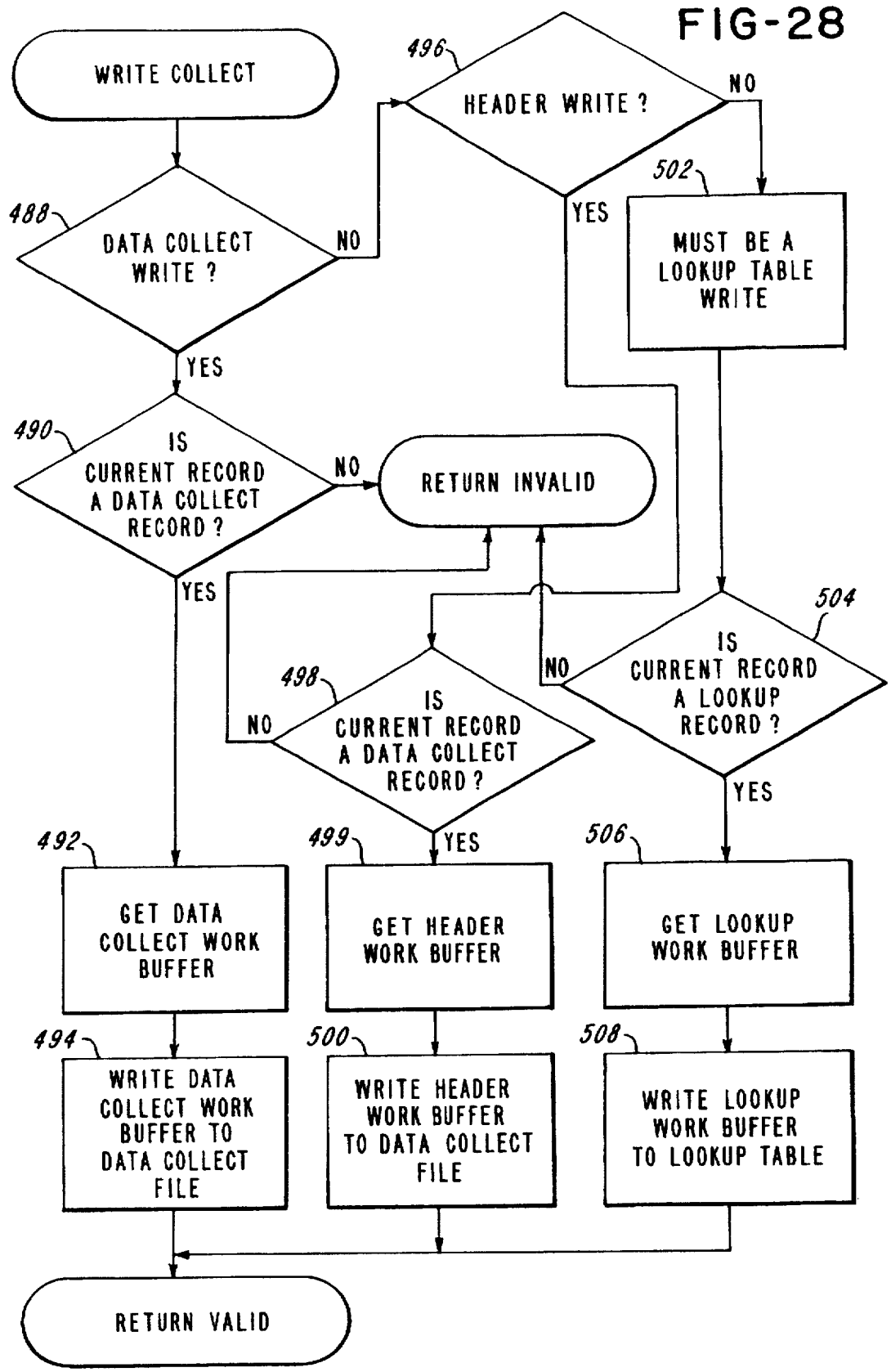
FIG. 28 is a flow chart is a Write Current command routine of the labeler.

The Write Current command and command routine depicted in FIG. 28 is used to save a specified work buffer in either the data collect file 132 or in the look up table file 130 at the current pointer location. This command allows an edit type function to occur. The Write Current command includes information identifying the work buffer to be saved such as the look up table work buffer 120, the data collect work buffer 126 or the header work buffer 122. The microprocessor 110 is responsive to a Write Current command to first determine at a block 488 whether the Write Current command specifies the data collect work buffer 126. If so, the microprocessor 110 proceeds to a block 490 to determine whether the records currently being pointed to is a data collect record and if so, the microprocessor at block 492 gets the record from the data collect work buffer and at block 494 writes the record to the data collect file 132. If the microprocessor 110 determines at a block 496 that the Write Current command specifies the header work buffer 122, the microprocessor 110 proceeds to block 498. At block 498, the microprocessor 110 determines whether the record currently being pointed to is a header record in the header work buffer 122 and if so, the microprocessor proceeds to block 499 to get that header record and at block 500 to write the header record from the header work buffer 122 to the data collect file 132. If the microprocessor 110 determines at a block 502 that the Write Current command specifies the look up table work buffer 120, the microprocessor 110 proceeds to block 504. At block 504, the microprocessor 110 determines whether the current record being pointed to is a record in the look up table work buffer 120 and if so the microprocessor proceeds to block 506 to get the record from the look up table work buffer 120 and to write the record at a block 508 to the look up table file 130.

Figure 29:
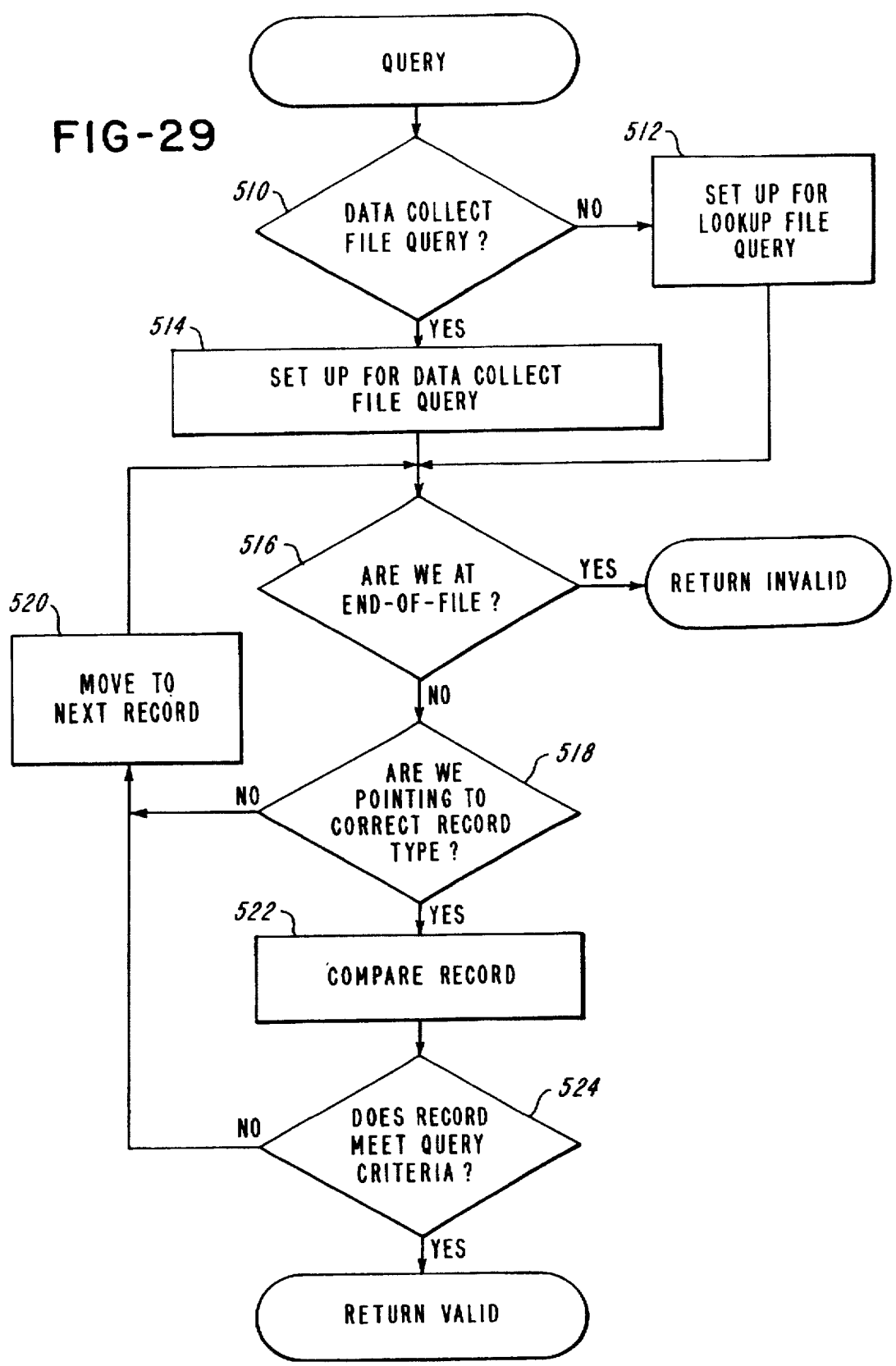
FIG. 29 is a flow chart illustrating a Query command routine of the labeler.
Figure 30:
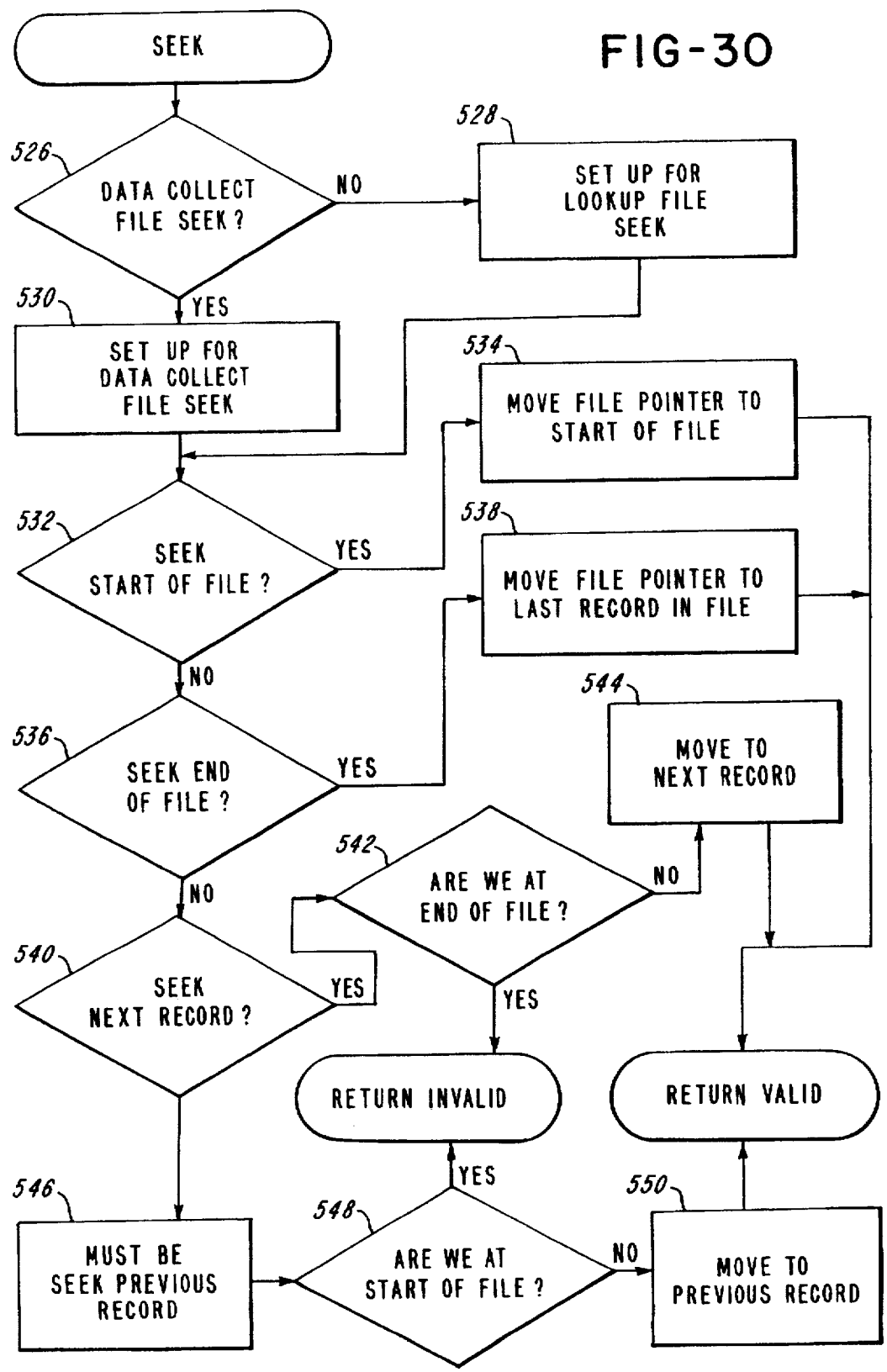
FIG. 30 is a flow chart illustrating a Seek command routine of the labeler.

A Query command and command routine as shown in FIG. 29 is used to search the data collect file 132 or the look up file 120 to find a record that contains a specific value. This command can be used to validate data entered from any of the input sources 12, 14 or 15. The Query command includes information identifying the type of query as well as a first field and a second field. The first field may be taken from the input buffer 134, or it may be an ASCII string or numeric string from the table 128, or a particular field in the temporary work buffer 118, the data collect work buffer 126, the header work buffer 122 or the look up table work buffer 120. The second field specified in the Query command is the field to be searched. The second field identifies a specific field in the look up table file 130, the data collect file 132 or the header work buffer 122. The type of query may be an equal to query to locate the first record where the specified second field is equal to the contents of the specified first field; a less than query to locate the first record where the contents of the specified second field is less than the contents of the specified first field; a greater than query to locate the first record where the contents of the second specified field is greater than the contents of the first specified field; a less than or equal to query to locate the first record where the contents of the second specified field is less than or equal to the contents of the first specified field; or a greater than or equal to query to locate the first record where the contents of the second specified field is greater than or equal to the contents of the first specified field.

The microprocessor 110 is responsive to a query command to determine at a block 510 whether the second field, i.e., the field to be searched specifies the data collect file 132 or the look up table file 130. If the second field specified in the query command is the data collect file 132, the microprocessor 110 proceeds to block 514 to initialize a pointer to search the data collect file 132. If the look up table file 130 is to be searched, the microprocessor 110 proceeds to a block 512 to set up the look up table file 130 for a query command search. From blocks 512 and 514, the microprocessor 110 proceeds to block 516 to determine whether the file 132 or 130 being searched has been completely searched. If not, the microprocessor 110 proceeds to block 518 to determine whether the pointer is pointing to the correct record type and if not, the microprocessor proceeds to block 520 to increment the pointer to point to the next record. If the record being pointed to is of the correct type, the microprocessor proceeds to block 522 to implement the compare designated by the type of query to be made in the query command. Thereafter at block 524, the microprocessor 110 determines whether the record being pointed to meets the query criteria and if so, the microprocessor 110 sets the return value to valid.

A Seek command and command routine is used to position a pointer within a specified file. The seek command includes information identifying either the data collect file 132 or the look up table file 130 and information identifying whether the pointer is to be positioned at the start of the file, the end of the file, to the next record in the file or to the previous record in the file relative to the current pointer position. The microprocessor 110 is responsive to a seek command to first determine at a block 526 whether the file designated is the data collect file 132 and if so, the microprocessor proceeds to block 530 to set up for a data collect file seek operation. Otherwise, the microprocessor proceeds from block 526 to block 528 to set up for a look file seek operation. From either of blocks 528 or 530 the microprocessor proceeds to block 532. At block 532 the microprocessor 110 determines whether the seek command identifies that the pointer is to be positioned at the start of the designated file and if so, the microprocessor at block 534 moves the file pointer to the start of the file. Thereafter the microprocessor 110 sets the return value to valid. If the microprocessor 536 determines that the seek command designates that the pointer is to be positioned at the end of the designated file, the microprocessor at a block 538 moves the file pointer to the last record in the designated file. If the microprocessor 510 determines at a block 540 that the seek command designates that the next record, the microprocessor proceeds to block 542. At block 542, the microprocessor determines whether the current pointer position is at the last record, and if so, the microprocessor sets the return value to invalid. If the current pointer's position is not pointing to the last record in the designated file, the microprocessor at block 544 moves the pointer to the next record in the file. If the microprocessor determines at a block 546, that the seek command specifies the previous record, the microprocessor proceeds to block 548 to determine whether the current pointer position is pointing to the first record in the designated file. If so, the microprocessor sets the return value to invalid. Otherwise, the microprocessor proceeds from block 548 to block 550 to move the pointer from its current position to the previous record.

An Exit command and command routine is depicted in FIG. 31. The Exit command is used to exit an application program. The Exit command may include a suspend option which enables the application program execution to be resumed at the command line immediately following the Exit command upon reentry to the application. If the suspend option is not specified in the Exit command, program execution is resumed at the first line of the application upon reentry to the program. More particularly, the microprocessor 110 is responsive to an Exit command received at block 552 to determine at a block 554 whether the suspend option is specified in the command or not. If the suspend option is designated in the Exit command, the microprocessor 110 proceeds to block 558 to set an exit with suspend flag. Thereafter, the microprocessor 110 sets the terminate flag 560. The application interpreter is responsive to the exit with suspend flag to save the current position in the application program as discussed above. If the suspend option is not designated in the Exit command, the microprocessor proceeds from block 554 to block 556. At block 556 the microprocessor 110 reinitializes the current script position to zero as discussed in detail below.

Figure 33:
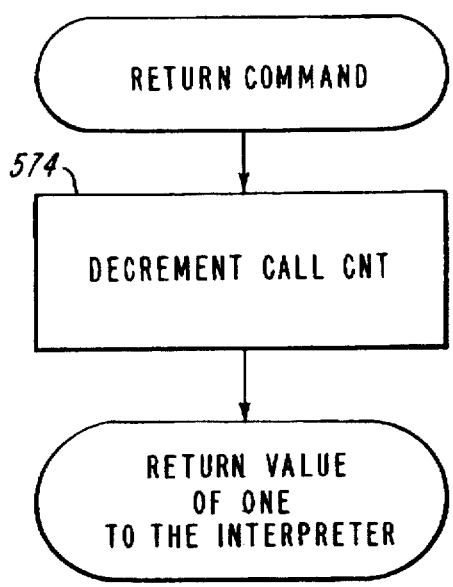
FIG. 33 is a flow chart illustrating a Return command routine of the labeler.

A Call command and command routine as shown in FIG. 32 provides a method to call a subroutine. In response to a call command, the microprocessor 110 at a block 562 determines whether a call count is greater than or equal to 25 calls. The labeler 10 limits the number of calls that may be performed to 25 so that if the call count is greater than or equal to 25 in response to a new Call command, the microprocessor 110 proceeds from block 562 to block 568 to generate a call overload error. Thereafter, the microprocessor proceeds to block 570 to reinitialize the current script position to zero and to set at a block 572 the terminate flag, the return value being set to invalid. If however, the call count is less than 25, the microprocessor proceeds to block 564 to increment the call count and to call the line number specified in the Call command for execution. It is noted that the call count points to a particular location in a current script position array which stores a value representing the position of the line of code of the application program that is currently being executed. When a call command is to be executed the call count is incremented to point to the next element in the current script position array wherein the value stored in the preceding position of the current script position array is preserved so that after the execution of the lines of code in the subroutine specified in the call command, execution of the application program can resume at the next command in the application program following the Call command by using a Return command. More particularly, the Return command as depicted in FIG. 33 performs the opposite operation of the Call command by decrementing at a block 574 the call count variable to put the application back to the previous current script position. It is noted that a system error is generated if no call command is executed before a return command is executed.

Figure 34:
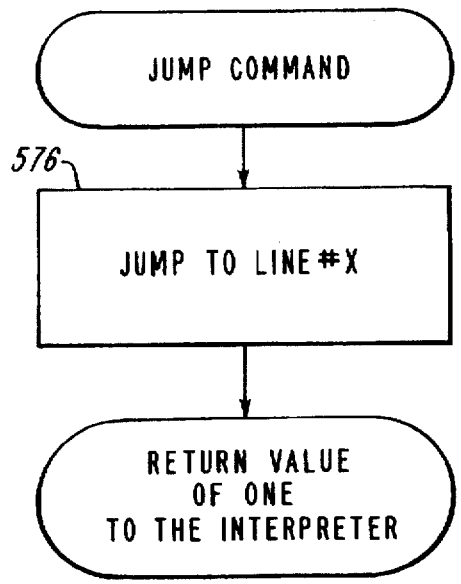
FIG. 34 is a flow chart illustrating a Jump command routine of the labeler.
Figure 35:
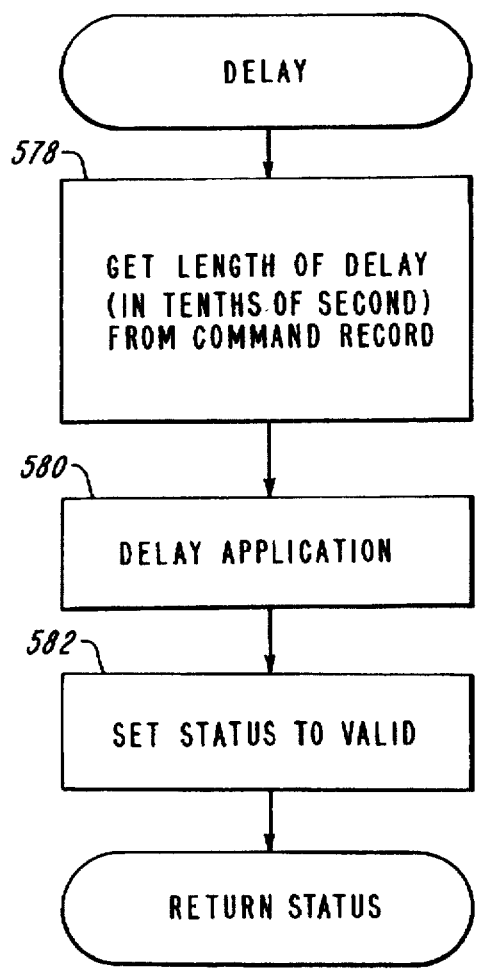
FIG. 35 is a flow chart illustrating a Delay command routine of the labeler.
Figures 36A, 36D, 36E:
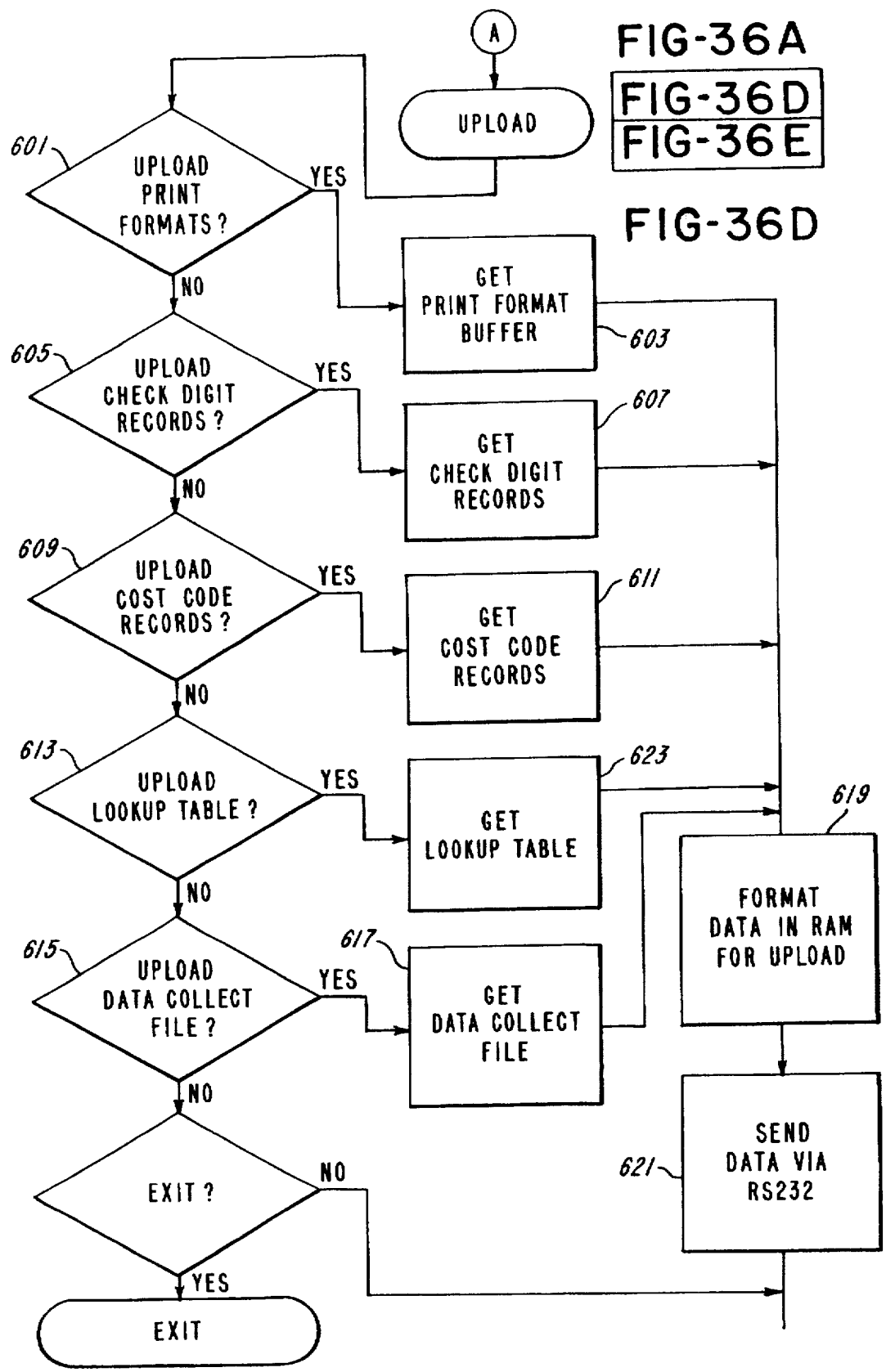
FIGS. 36A–B form a flow chart illustrating the processing of the labeler during a download of information to the labeler.
Figure 36B:
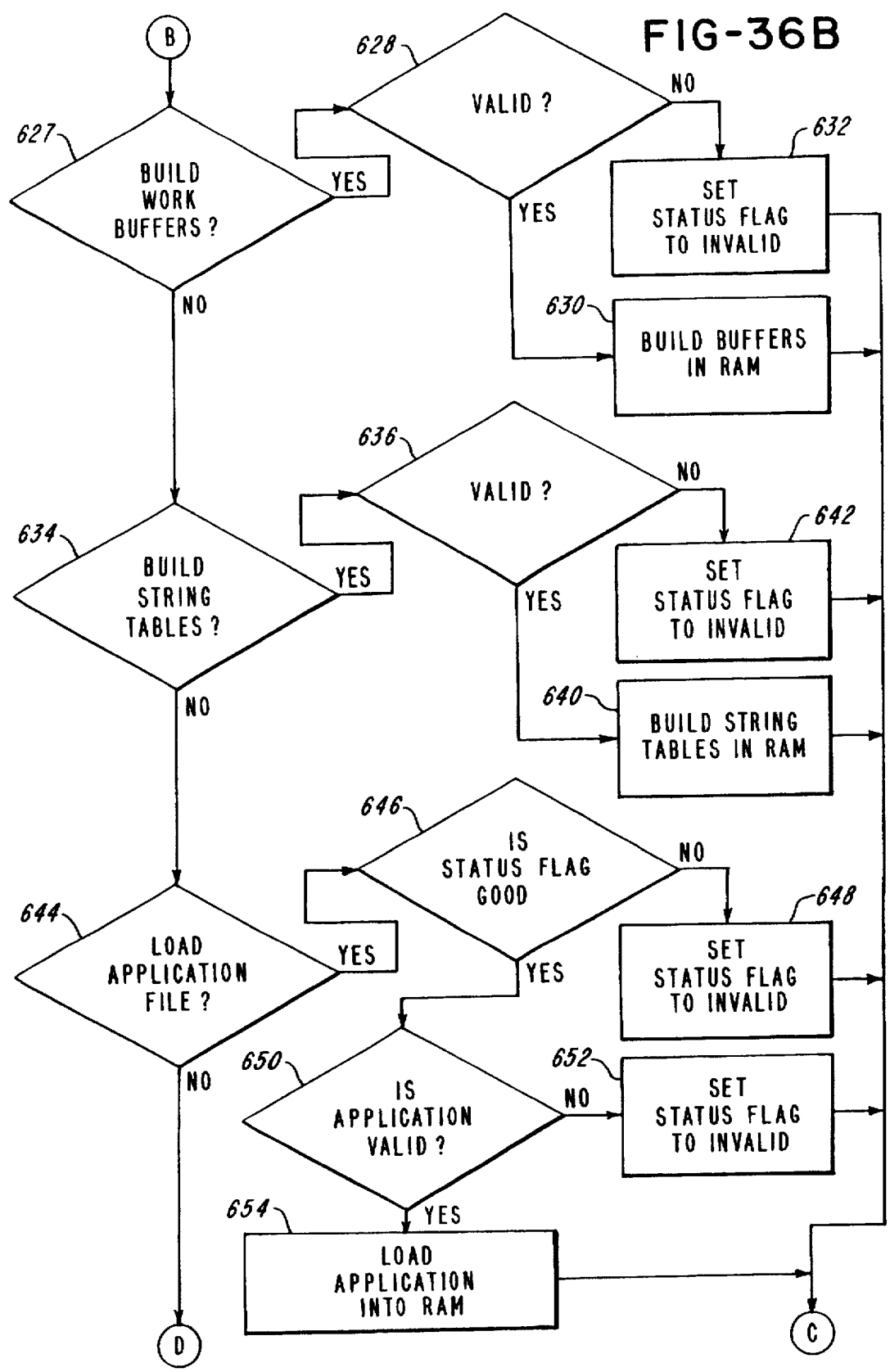
Figure 36C:
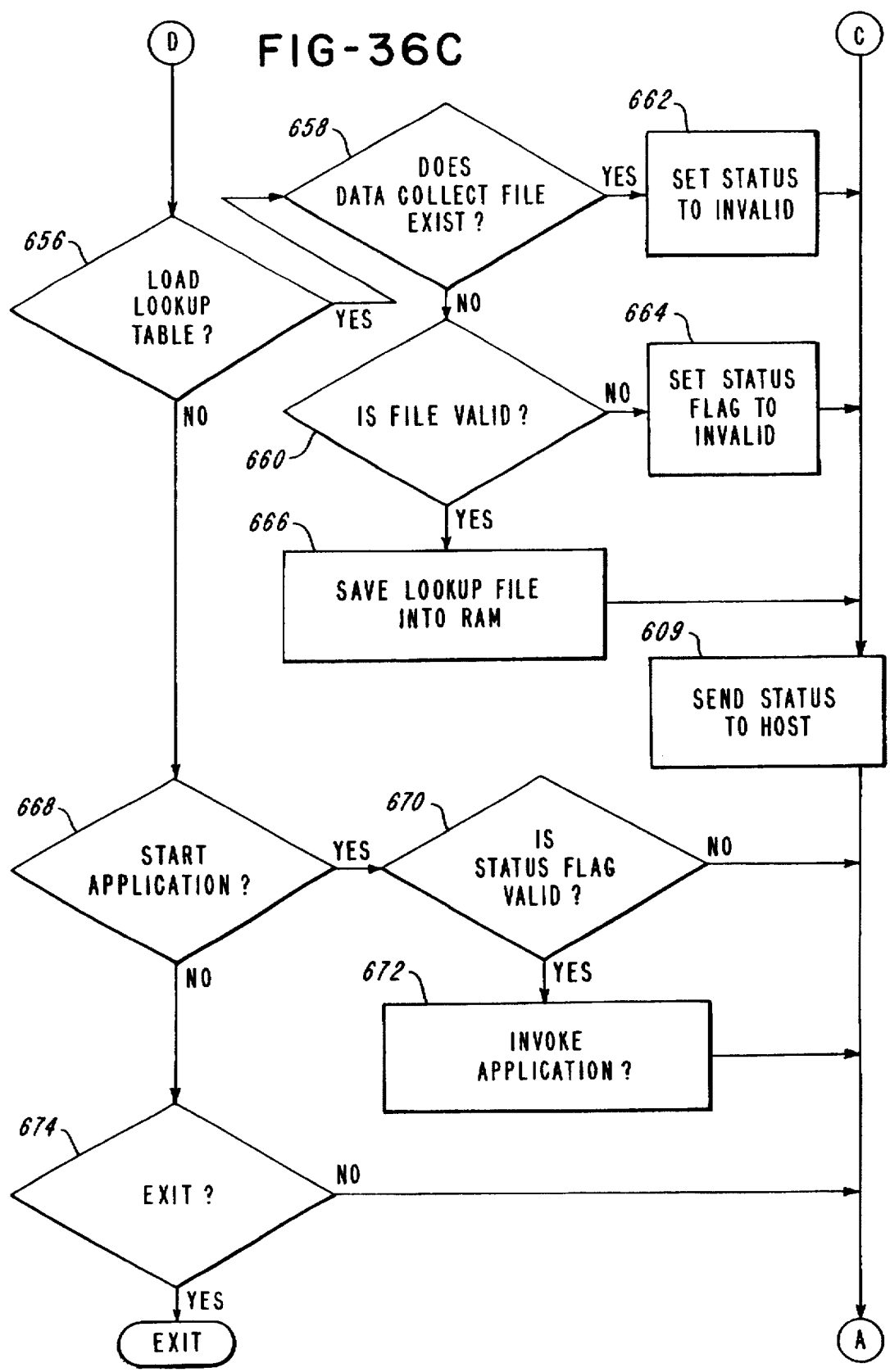
Figure 36E:
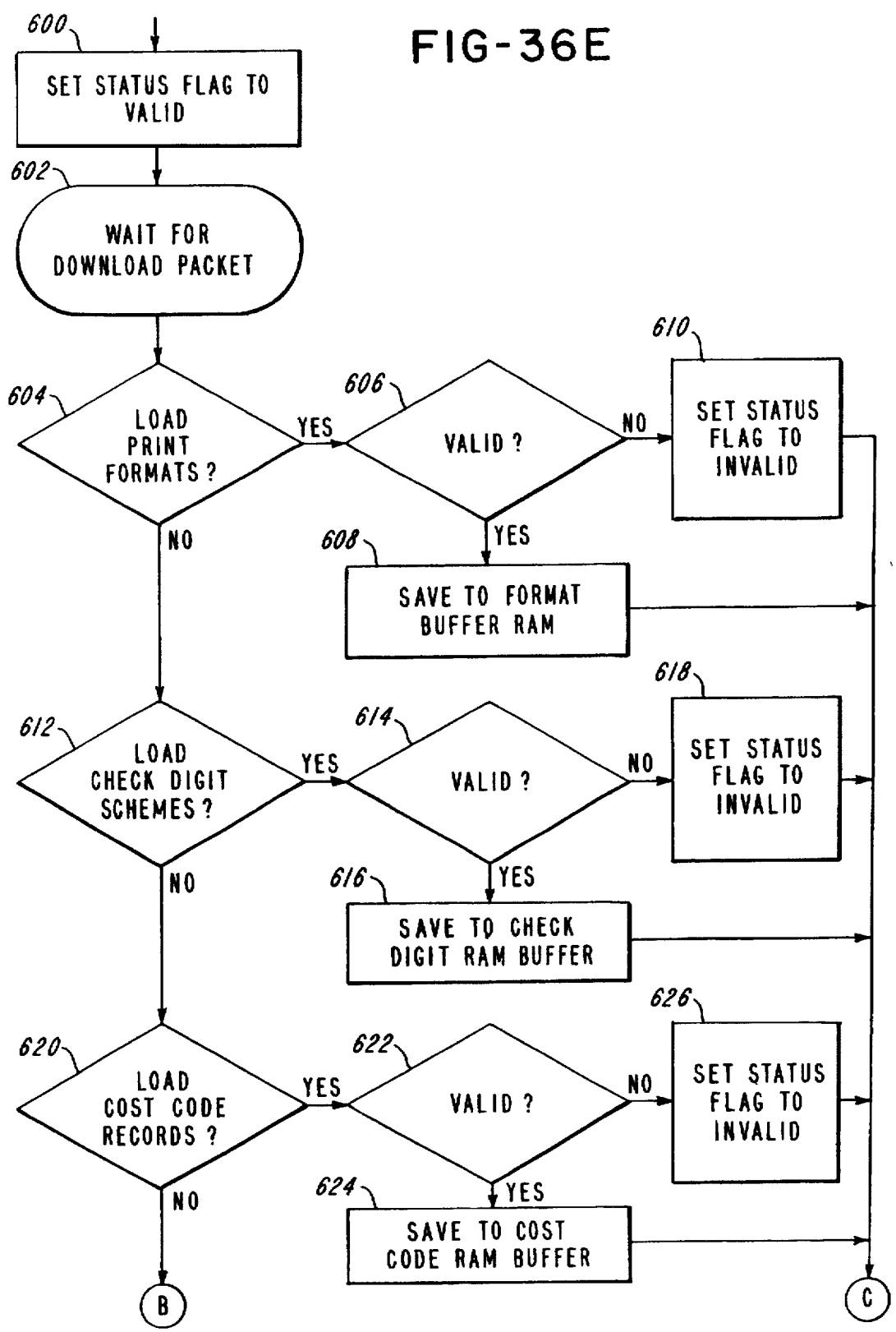

The Jump command and command routine as shown in FIG. 34 provides a method to allow the program to jump to a specified line number. More particularly, the microprocessor 110 is responsive to a jump command to jump to the line number specified in the command at a bock 576. A Delay command and command routine is depicted in FIG. 35. The Delay command is used to delay the execution of the application for a period of time as specified in the Delay command wherein the delay time may be 0.1 second to 9.9 seconds. In response to a delay command, the microprocessor 110 at a block 578 gets the length of the delay from the delay command and at block 580 delays the application for the specified time. Thereafter, at a block 582, the microprocessor 110 sets the return value to valid.

An upload/download processing routine as depicted in FIG. 36 controls the uploading of information to the host computer and the downloading or receipt of the work buffer configuration records as well as the look up table file 130 and a new application program for storage in the RAM 114. More particularly, during upload processing, the microprocessor 110 at a block 601 determines whether print formats are to be uploaded. If so, at a block 603 the microprocessor 110 gets the contents of the print format buffer. The data is then formatted for an upload at block 619 and sent to the host computer via the communication port 15 at a block 621. Thereafter, the microprocessor proceeds to block 600. If the microprocessor similarly determines at respective blocks 605, 609, 613 and 615 that check digit records, cost code records, the look up table or the data collect file is to be uploaded, the microprocessor 110 proceeds to a respective block 603, 607, 611, 623 or 617 to get the data to be uploaded. Thereafter, the microprocessor proceeds to blocks 619 and 621 to format the retrieved data for an upload and to send data to the host computer.

Upon receipt of a request from the host computer via the communication port 15 to download a packet, the microprocessor 110 at a block 600 sets a status flag to valid and proceeds to block 602 to wait for the downloaded packet. When the packet is received, the microprocessor at a block 604 determines whether print formats are being downloaded to the labeler 10 and if so proceeds to a block 606 to determine whether the print formats are valid. If not, the microprocessor at a block 610 sets a status flag to invalid. However, if the print formats are valid, the microprocessor proceeds to block 608 to save the print format in the print format buffer 140. From block 608, the microprocessor proceeds to block 609 to send the status of the download back to the host computer via the communication port 15. If the microprocessor determines at a block 612 that a check digit scheme is being downloaded, the microprocessor proceeds to block 614 to determine whether the scheme is valid.

If it is, the microprocessor proceeds to block 616 to save the check digit scheme in the RAM 114; otherwise, the status flag is set to invalid at a block 618. If the microprocessor determines at a block 620 that cost code records are being downloaded, the microprocessor proceeds to block 622 to determine if they are valid. If they are, the microprocessor at block 624 saves the cost code records in the RAM 114. Otherwise, the microprocessor at a block 626 sets a status flag to invalid. At a block 627 the microprocessor determines whether work buffer configuration records are being downloaded. If so, the microprocessor proceeds from block 627 to block 628 to determine if the work buffer definitions are in a prescribed format and if not, the microprocessor at a block 632 sets a status flag to invalid. If the work buffer definitions are valid, the microprocessor proceeds to block 630 to build the work buffers in the RAM 114.

Figure 37A:
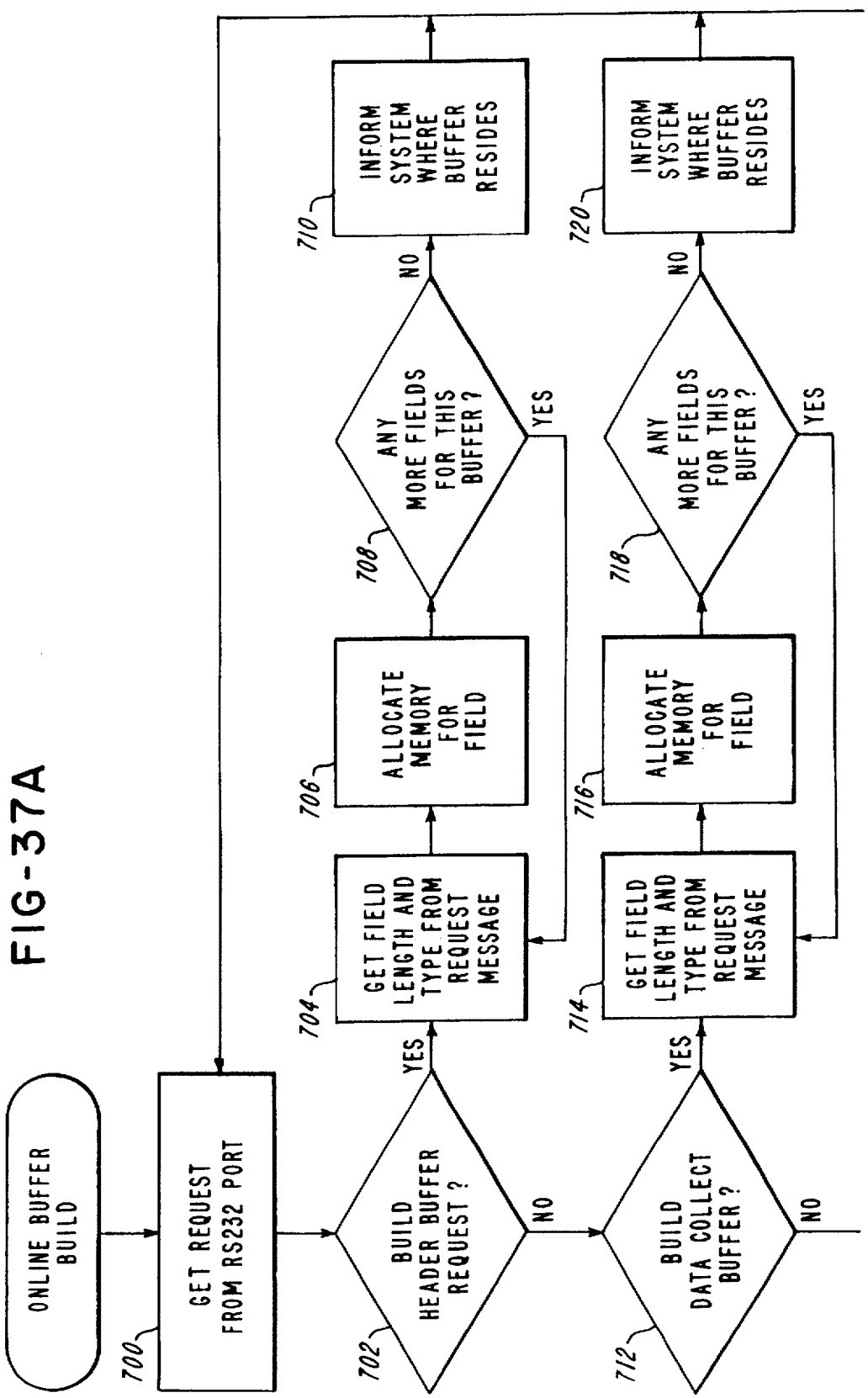
FIG. 37 is a flow chart illustrating how the work buffers of the labeler are dynamically built.
Figure 37B:
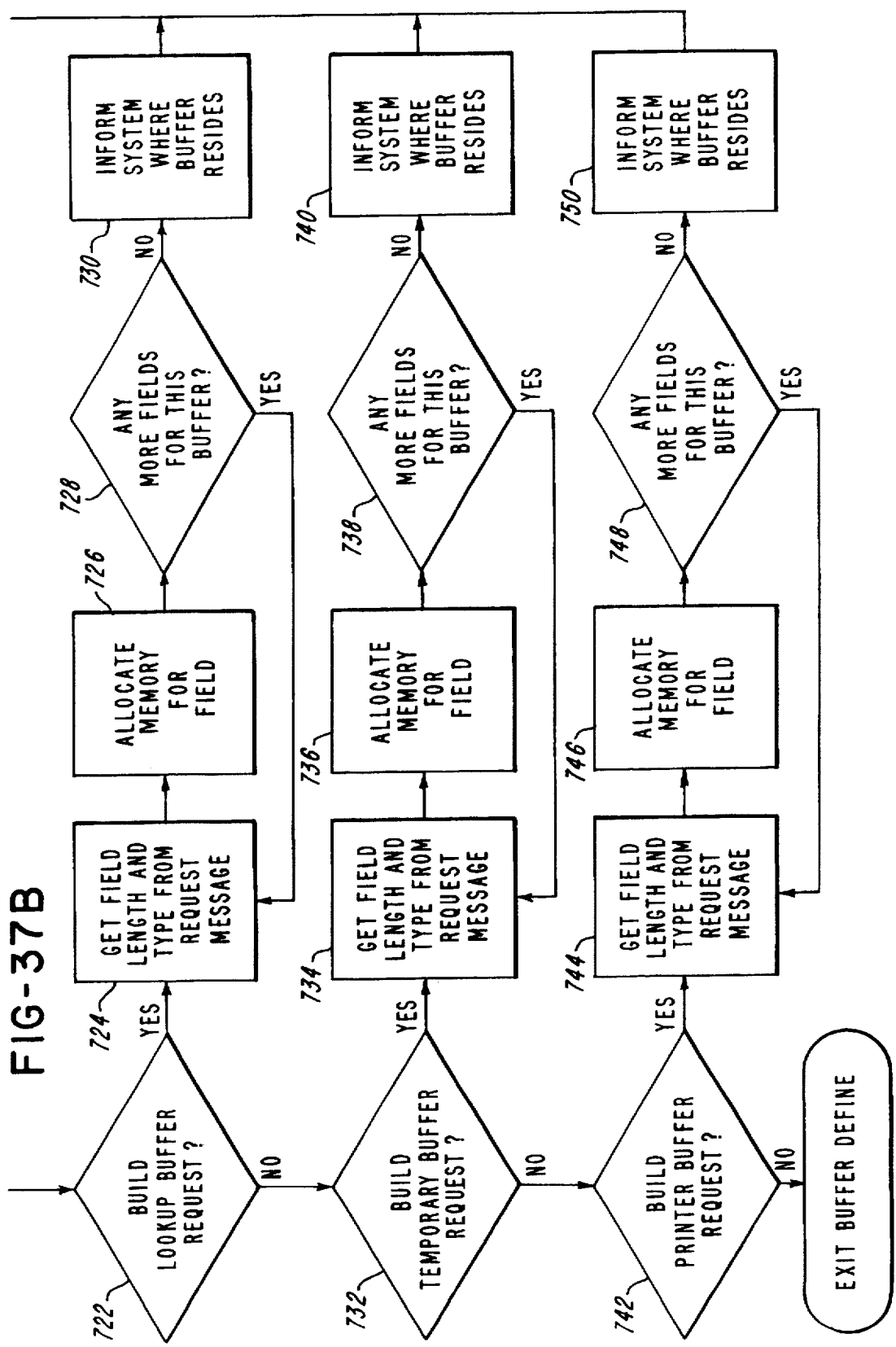

As shown in FIG. 37, upon receiving a request to build work buffers the microprocessor 110 proceeds from a block 700 to a block 702 to determine whether a configuration record received is for the header work buffer 122. If it is, the microprocessor 110 proceeds to a block 704 to get information from the configuration record defining the length and the type of the first field in the header buffer. Thereafter, at a block 706, the microprocessor 110 allocates space in the RAM 114 for the header work buffer field. After all of the fields defined in the header work buffer configuration record have had space in the RAM 114 allocated thereto as determined by the microprocessor at a block 708, the microprocessor at a block 710 stores the address of the header work buffer 122. If the microprocessor 110 determines at a block 712 that a data collect work buffer configuration record has been received, the microprocessor proceeds to a block 714. After retrieving the length and type information for the first field defined in the data collect work buffer configuration record at block 714, the microprocessor at block 716 allocates memory for the field. After allocating space in the RAM 114 for each of the fields defined in the data collect work buffer configuration record as determined by the microprocessor at block 718, the microprocessor proceeds to block 720 to store the address of the data collect work buffer 126. The temporary work buffer is built in a similar manner in accordance with blocks 732, 734, 736, 738 and 740 whereas the print buffer 124 is dynamically built in accordance with block 742, 744, 746, 748, and 750.

Returning to FIG. 36, at a block 634, if the microprocessor determines a string table is to be built and that the string table definition is valid as determined at block 36, the microprocessor proceeds to 640 to build the string table 128 in the RAM 114. Otherwise, the microprocessor proceeds from block 636 to block 642 to set a status flag to invalid. If the microprocessor determines at a block 644 that an application program is being downloaded, the microprocessor 110 proceeds to a block 646 to determine whether a status flag is good or not. If it is not, the microprocessor at a block 648 sets a further status flag to invalid. Otherwise, the microprocessor proceeds to blocks 650 to determine whether the structure of the application program is valid. If the structure is not valid, the microprocessor sets the status flag to invalid at a block 652. However, if the structure of the application program is valid, the microprocessor 110 loads the application program into the file 116 at a block 654. If the microprocessor 110 determines at a block 656 that a look up table is being downloaded the microprocessor proceeds to block 658 to determine whether a data collect file exists. If the data collect file does exist, the status flag is set to invalid at block 662. If the data collect file does not exist, the microprocessor 110 proceeds to block 660 to determine whether the look up table is valid. If it is, the microprocessor 110 proceeds to block 666 to save the look up table in the look up table file 130 of the RAM 114. After storing the look up table in the look up table file 130, the microprocessor 110 allocates whatever memory is remaining in the RAM 114 to the data collect file 132 so that the data collect file in the labeller 10 is of a variable size that depends on the size of the application program stored in the application file 116 as well as the size of the work buffers as defined by the work buffer configuration records. If the microprocessor determines that at a block 668 that the application downloaded is to start automatically, the microprocessor proceeds to block 670 to determine whether the application status flag is valid. If so, the microprocessor 110 at a block 672 invokes the application by calling the application interpreter shown in FIG. 38. If the application is not to start automatically, the microprocessor 110 proceeds from block 668 to block 678 to determine whether the download processing routine should be exited from and if not, the microprocessor returns to block 602.

Figures 39, 40:
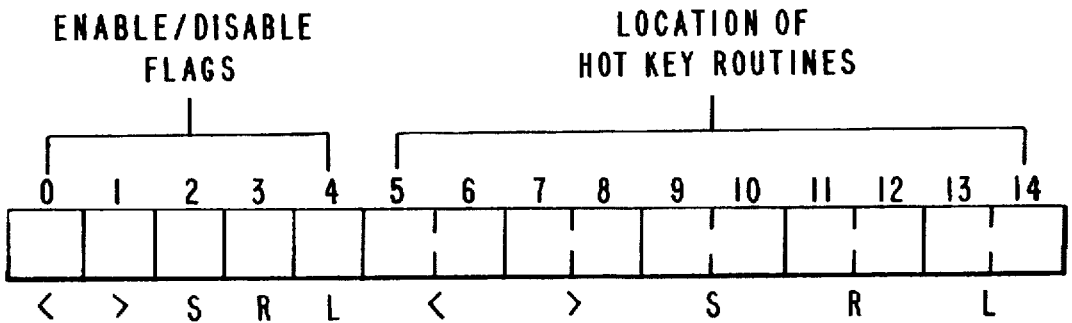
FIG. 39 is an illustration of a Current Script Position Array of the labeler.
FIG. 40 is an illustration of a programmable key buffer of the labeler.

Before the application program interpreter is discussed, reference is had to the current script position array shown in FIG. 39. The current script position array is a 25 element array that allows 25 imbedded calls in an application program. If there are no imbedded calls, only the first array element at position 00 is used to store the current script position, i.e. the current line number in the application program.

Figure 38A:
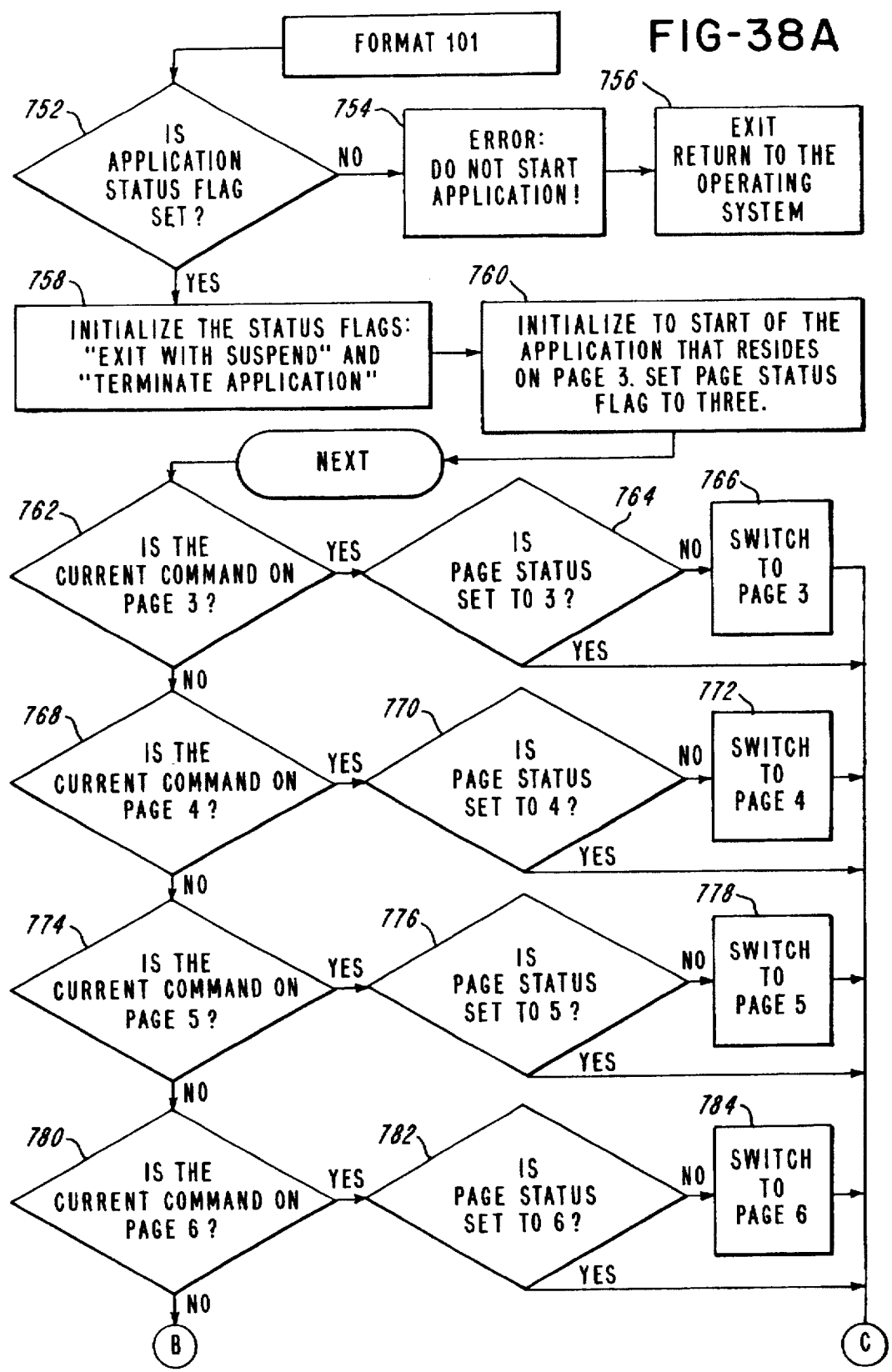
FIGS. 38A–B form a flow chart illustrating an Application Program Interpreter of the labeler.
Figure 38B:
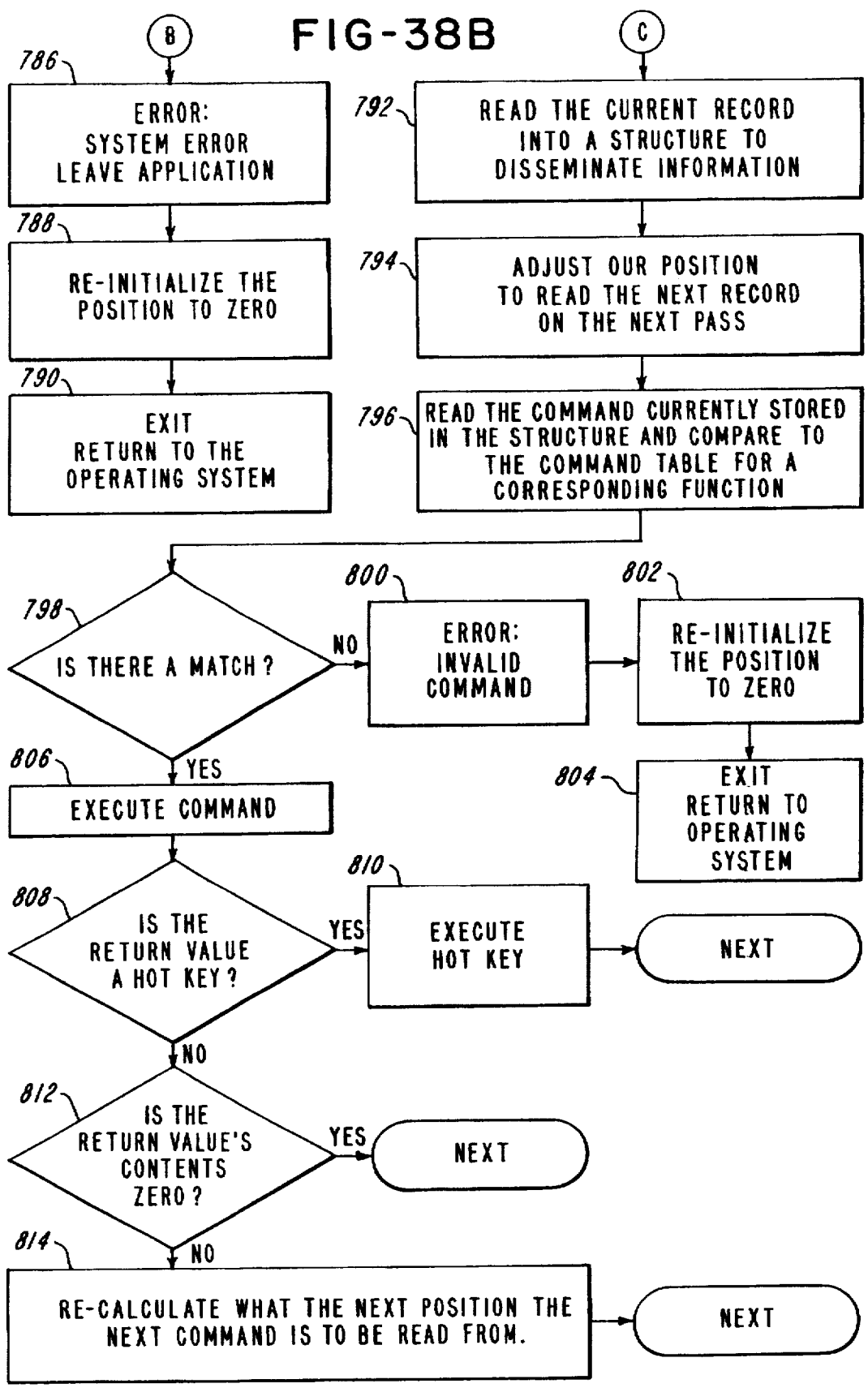

The application program interpreter as shown in FIG. 38 is initiated automatically as discussed above or upon entry via the keyboard of a format number 101 in response to a format prompt depicted on the display 16. Upon entering the application interpreter, the microprocessor 110 at a block 752 determines whether the application status flag is set or not. The application status flag is set only if during the downloading operation the microprocessor 110 confirms that the entire application program has been received from the remote location. Therefore, if the application status flag is not set, the microprocessor at a block 754 generates an error flag and at block 756, the microprocessor 110 exits the application interpreter routine. If the application status flag is set, the microprocessor 110 proceeds to block 758 to initialize the exit with suspend status flag and the terminate application status flag. At a block 760, the microprocessor initializes the page in the RAM 114 to the number 3 which is the start of the application program. A page status flag is also set to 3. Thereafter, at a block 762, the microprocessor 110 determines whether the current script position in the current script position array is within the boundaries of page 3 and, if so, the microprocessor proceeds to block 764. At block 764, the microprocessor 110 determines whether the page status flag is set to 3 and, if so, proceeds to block 792, otherwise the page status is switched to page 3 at block 766. If the microprocessor determines at block 762 that the current script position is not within the current boundaries of page 3, the microprocessor at respective blocks 768, 774 and 780 determines whether the current script position is within the boundaries of respective pages 4, 5 or 6 of the RAM 114. If not, the microprocessor proceeds to block 786 to generate a system error. At block 788, the current script position is reinitialized to zero, and at block 790 the application interpreter is exited. If, however, the current script position is within a page of the RAM 114, the microprocessor proceeds to block 792 to read the command of the application program to which the current script position is pointing into a temporary storage structure in the RAM 114 so that the command information can be disseminated. At block 794, the current script position in the current script position array is incremented to the next position at block 794. Thereafter, at a block 796, the microprocessor 110 reads the command currently stored in the temporary structure of the RAM 114 and compares the command to a command table to determine if there is a corresponding command function stored in the table. At block 798, the microprocessor 110 determines whether there is a match or not, and, if not, the microprocessor at respective blocks 800, 802 and 804 generates an invalid command error, reinitializes the current script position to zero and exits the interpreter. If the microprocessor determines at block 798 that there is a match, the microprocessor proceeds to block 806 to execute the command by calling the associated command routine stored in the EPROM 112. After executing the associated command routine stored in the EPROM 112, the microprocessor at a block 808 determines whether the return value represents a programmable key and if so the microprocessor proceeds to block 810 to execute the associated programmable key subroutine as discussed below in detail. If the return value does not designate a programmable key, the microprocessor proceeds to block 812 from block 808. At block 812, the microprocessor determines whether the return value is zero or not. If the return value is zero, the next command in the application program is executed in accordance with the current script position of that command as stored in the current script position array at block 794. If, however, the return value is not zero, the microprocessor proceeds to block 814 to recalculate the position of the next command to be executed which position will represent a valid path in the application program if the return value is set to valid. Alternatively, if the return value is set to invalid the position of the next command represents the invalid path to be taken in the application program. The respective valid or invalid path position path is stored at block 814 in the current script position array. From block 814, the microprocessor proceeds to block 762 to determine the page of the current script position held in the current script position array.

Programmable keys of the keyboard 14 will now be discussed with reference to FIGS. 40–41. Five keys of the keyboard 14 may be programmed such that upon actuation of the respective key, an associated programmable key routine will be executed. It is noted, however, that the actuation of a programmable key will be responded by the labeler 10 only during the execution of a Get command wherein the microprocessor 110 is getting keyboard information as discussed above. The programmable keys of the keyboard 14 have the designations "<" i.e. left arrow, ">" i.e. right arrow, "S" for the space key, "R" for the recall key, and "L" for the load key. As shown in FIG. 40, a programmable key buffer residing in the RAM 114 stores in the first byte positions an enable or disable byte for the associated programmable key. More particularly, if a one byte of ones's is stored in the zeroth byte position of the programmable key buffer, the left arrow programmable key is to be enabled; but if a byte of zeros is stored, the left arrow programmable key is disabled. Enable or disable bytes are similarly stored in positions 1 through 4 of the programmable key buffer for the remaining four programmable keys. The programmable key buffer stores in positions 5 through 14 the location of the respective programmable key subroutines. More particularly, in the fifth and sixth byte positions of the programmable key buffer, the location of the programmable key routine associated with the left arrow programmable key is stored. Similarly, in the seventh and eighth byte positions of the buffer, the location of the right arrow programmable key routine is stored. The ninth and tenth positions of the programmable key buffer store the location of the programmable key routine for the space key; whereas, the eleventh and twelfth positions of the programmable key buffer store the location of the recall programmable key. Finally, the thirteenth and fourteenth positions of the programmable key buffer store the location of the load programmable key routine.

Figure 41:
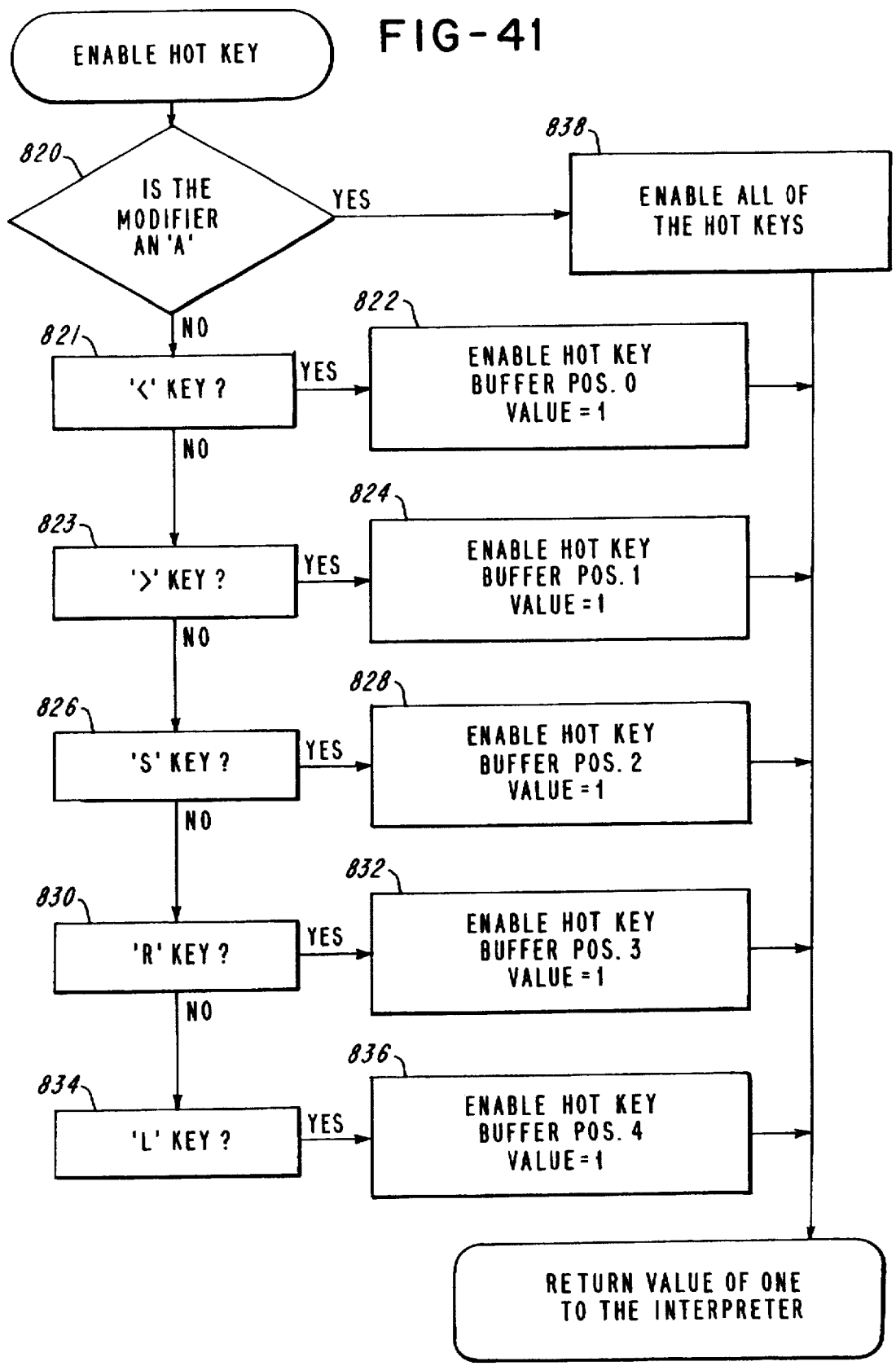
FIG. 41 is a flow chart illustrating a programmable key enable routine of the labeler.
Figure 42:
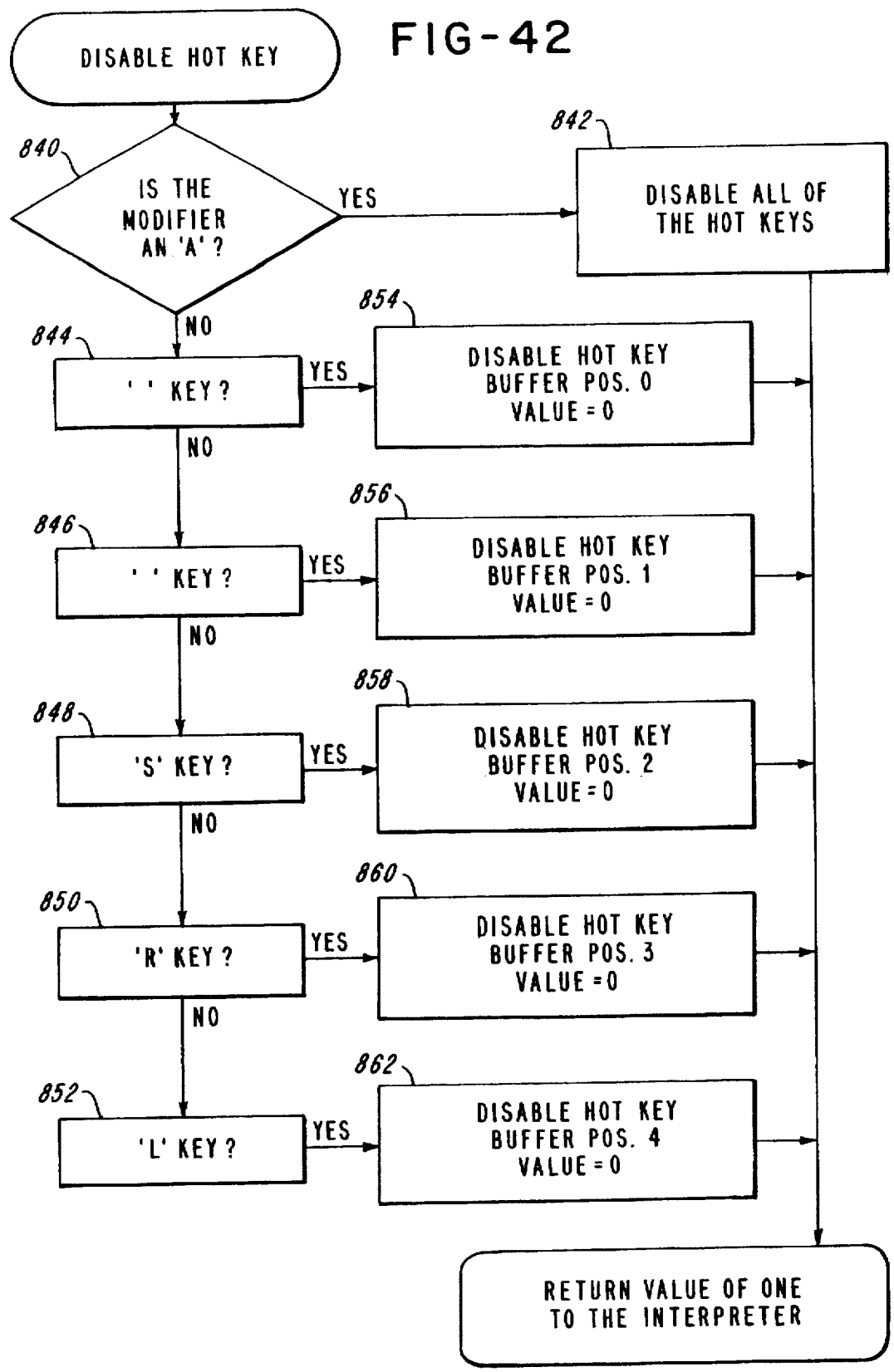
FIG. 42 is a flow chart illustrating a programmable key disable routine of the labeler.

A programmable key enable routine is used to enable a particular programmable key as shown in FIG. 41. More particularly, at block 820, the microprocessor 110 determines whether a modifier "A" is specified in the enable programmable key command. If so, the microprocessor proceeds to block 838 to enable all of the programmable keys. If not, the microprocessor proceeds to block 821 to determine whether the left arrow programmable key is to be enabled and, if so, the microprocessor at a block 822 enables the programmable key buffer byte position zero by storing all 1's therein. Similarly, the right programmable key arrow is enabled at block 824, the space programmable key is enabled at a block 828, the recall programmable key is enabled at a block 832, or the load programmable key is enabled at a block 836. The microprocessor is responsive to a disable programmable key command as shown in FIG. 42 by first determining at a block 840 whether the disable programmable key command includes the "A" modifier. If so, the microprocessor proceeds from block 840 to block 842 to disable all of the five programmable keys. Otherwise, the microprocessor proceeds to respective blocks 844, 846, 848, 850 or 852 to determine which of the programmable keys is specified in the disable programmable key command. After determining which of the programmable keys is to be disabled from the command, the microprocessor proceeds to a respective block 854, 856, 858, 860 or 862 to disable the programmable key by inserting a byte of 0's into the programmable key buffer position associated with the designated programmable key.

Figure 43:
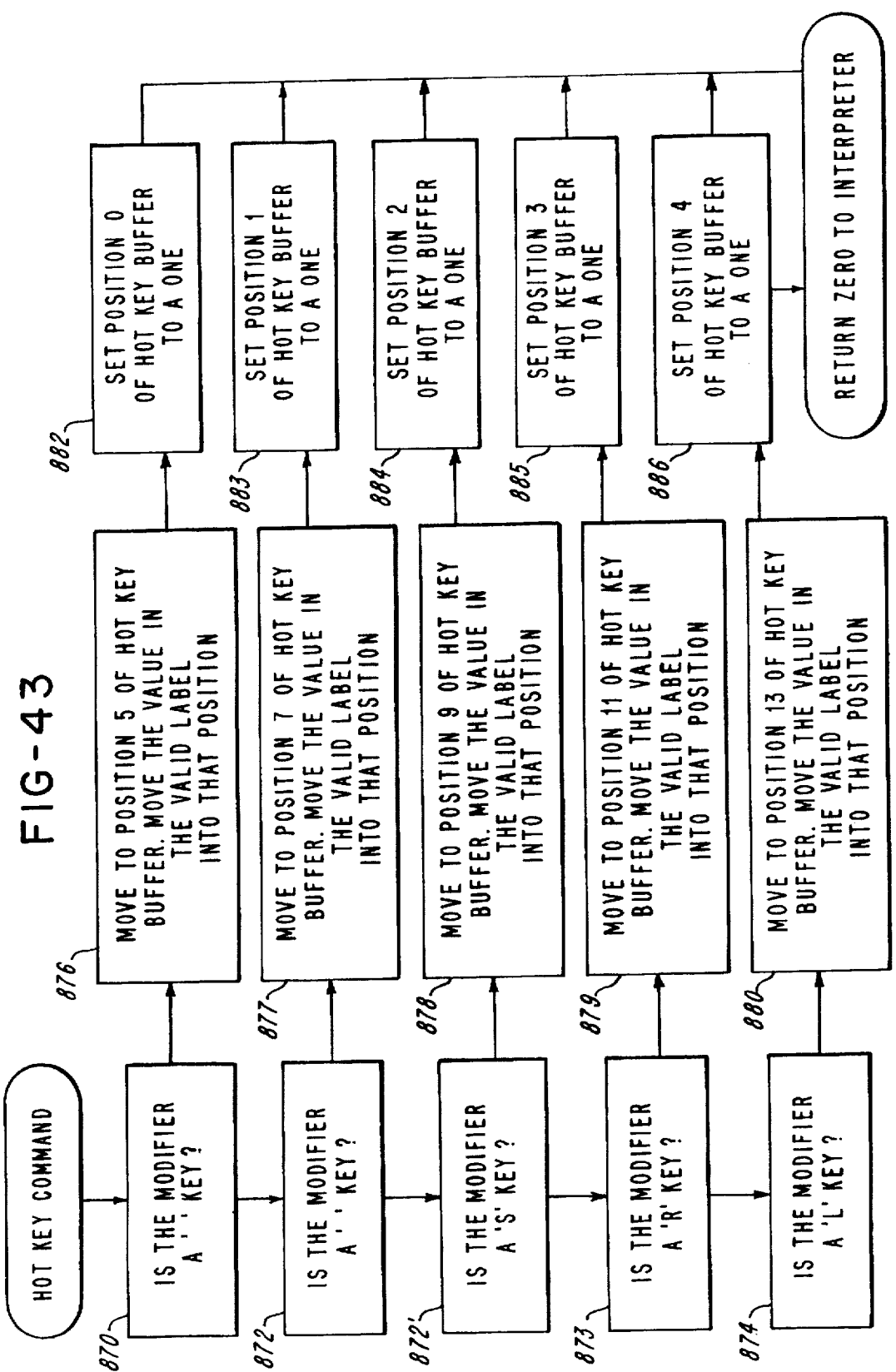
FIG. 43 is a flow chart illustrating a programmable key command routine of the labeler.

Microprocessor 110 is responsive to a programmable key define command as depicted in FIG. 43 to load the location of the specified programmable key routine into the programmable key buffer. More particularly, at blocks 870–874, the microprocessor determines which of the five programmable keys is to be defined. Thereafter, at a respective block 876–880, the microprocessor moves to the respective position 5, 7, 9, 11 or 13 in the programmable key buffer to load the location of the associated programmable key command routine into that position of the programmable key buffer. Thereafter, at respective blocks 882–886, the microprocessor 110 sets respective positions 0, 1, 2, 3 or 4 to enable the programmable key.

Figure 44:
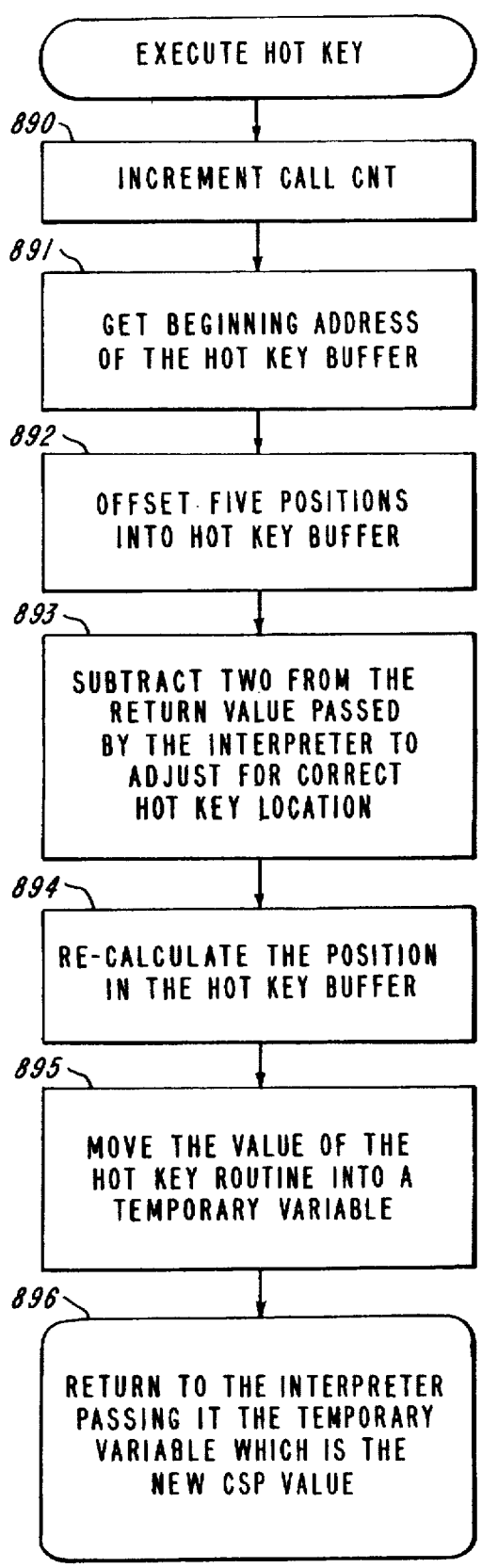
FIG. 44 is a flow chart illustrating the programmable key function of the labeler.

A programmable key command routine is executed in accordance with the routine depicted in FIG. 44. More particularly, the routine depicted in FIG. 44 is entered by the microprocessor 110 at block 118 of the application program interpreter. Upon entering the programmable key function routine, the microprocessor at a block 890 increments the call counter. Thereafter, at a block 891, the microprocessor 110 gets the beginning address of the programmable key buffer depicted in FIG. 40. At a block 892, the microprocessor 110 moves to the fifth position in the programmable key buffer and at a block 893, the microprocessor subtracts 2 from the return value passed by the interpreter to adjust for the correct programmable key location. Thereafter, at a block 894, the microprocessor recalculates the position in the programmable key buffer so as to point to the appropriate buffer location, 5, 7, 9, 11 or 13 in the programmable key buffer. Thereafter, the microprocessor 110 at a block 895 moves the location value of the designated programmable key command routine into a temporary storage location of the RAM 114. At block 896, the microprocessor 110 then returns to the application program interpreter the value stored in the temporary location which becomes the new current script position.

The input/output command routines as well as the data manipulation command routines are called by the microprocessor 110 in executing a sequence of commands forming the application program 116 to allow selected data to be moved among the work buffers and files of the RAM 114 as discussed above so as to associate selected data with any other selected data stored in the RAM 114. The associated data may then be printed on a label together or the associated data may be coupled to the communication port 15 for uploading to the host computer, minimizing the need for processing of the collected data at the host computer. Using the command routines, a look-up file can be downloaded from the host computer to the labeler 10, the look-up file modified and uploaded back to the host computer. The data manipulation routines also allow data input to the labeler from any of the input sources to be verified using, for example, the query command routine or the compare command routine. The command routines also allow data to be input to the labeler 10 from any combination of the input sources including the keyboard 14, the scanner 12, and the communication port 15, wherein a label can be printed with data received from any combination of these input sources. The command routines further allow data to be input to the labeler 10 independent of a print format so that data can be entered once for printing in accordance with a number of different formats. Two application programs illustrative of the flexibility of the labeler of the present invention are found in respective appendices A and B.

More particularly, the application program illustrated in Appendix A allows the labeler 10 to get information input thereto from the keyboard 14, the scanner 12 and the communication port 15. This routine is also capable of printing selected data and uploading the data collect file. The header work buffer 122 is defined so as to contain the operator, date, purchase order and container numbers. The data collect work buffer 126 is defined to store a part number and a value designated "quantity in a box". Further, the print buffer 124 is defined so that a label can be printed with a given part number and the quantity of the part in a given box. The application program that follows the buffer definitions allows the labeler 10 to prompt the user for his operator number and the date so as to fill in the header information in the buffer 122. The header information is entered by a user via the keyboard 14, the application program next displays a menu to the user via the display 16 allowing the user to select a given operation, i.e. to receive date, to upload data, or to exit the application. In response to a user selecting the receive data option, the scanner 12 is initialized and the user is prompted via the display 16 to enter a purchase order number and container number. This information can be entered by the user utilizing the scanner 12 or the keyboard 14. Once the information is entered and stored, the header information is written from the header work buffer 122 to the data collect file 132. When the application program gets the part number from the keyboard or scanner, a search is done to find a matching part number in the look-up table file 130. If a match is found, the field in the look-up file called "quantity in box" is moved to the print buffer 124. If a match is not found, a message requesting the needed message is moved to the communication port 15 so that it can be sent to the host computer. The microprocessor 110 then, in accordance with the application program, waits for the necessary information to be received from the host computer via the communication port 15. The information that is received from the communication port 15 is stored in the input buffer 134, then moved from the input buffer to the print buffer 124. A counter is initialized to keep track of how many labels are printed. The number of labels printed along with the part number is then written to and stored in the data collect file 132. The user is prompted to see if additional part numbers are needed. If not, the main menu is returned to. Otherwise, the process starts again at the prompt for entering a part number. The upload option of the application program further allows all of the information that has been collected to be uploaded to the host computer.

Figure 45A:
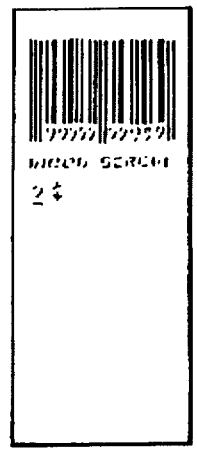
FIGS. 45A–B respectively illustrate bar codes printed in accordance with two different print formats.
Figure 45B:
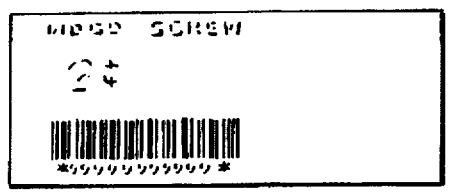

The application program depicted in Appendix B allows the microprocessor 110 to prompt a user to enter bar code information, a description of an item and the price of the item so that two labels can be printed in different formats, such as a UPC format and a Code 39 format, as depicted in FIGS. 45a and 45b. The application program illustrated in Appendix B as well as the application program illustrated in Appendix A are just two examples of possible application programs that may be generated by a user utilizing various combinations of the command routines stored in the EPROM 112 of the labeler 10 of the present invention.

Many modifications and variations of the present invention are possible in light of the above teachings. Thus, it is to be understood that, within the scope of the appended claims, the invention may be practiced otherwise then as described herein above.

APPENDIX A

```
;*****************************************
;********* DEFINITIONS *******************
;*****************************************
;********* HEADERS ***********************
DEFINE HEADER,OPERATOR,4,N              ;STORAGE FOR OPERATOR NUMBER
DEFINE HEADER,DATE,6,N                  ;STORAGE FOR DATE NUMBER
DEFINE HEADER,PO,10,N                   ;STORAGE FOR P.O. NUMBER
DEFINE HEADER,CONTAINER,20,N            ;STORAGE FOR CONTAINER NUMBER
;********* DATA COLLECT ******************
DEFINE DATACOLLECT,D_PART,12,N          ;DATACOLLECT PART NUMBER
DEFINE DATACOLLECT,QTY_RECV,4,N         ;DATACOLLECT QUANTITY RECEIVED VALUE
;********* LOOK UP ***********************
DEFINE LOOKUP,L_PART,12,N               ;LOOKUP PART NUMBER
DEFINE LOOKUP,QTY_IN_BOX,4,N            ;LOOKUP QUANTITY IN BOX VALUE
;********* PRINTER ***********************
DEFINE PRINTER,P1,12                    ;PART
DEFINE PRINTER,P2,4                     ;QTY IN BOX
DEFINE PRINTER,P3,10
;********* TEMPORARY *********************
DEFINE TEMPORARY,T_COUNT,2,N            ;TEMPORARY STORAGE OF COUNTER VALUE
;********* UPLOAD ************************
UPLOADDEF JOB,DC,RECEIVE,PO             ;UPLOAD DEFINITION OF DATACOLLECT FILE TO PC
;*****************************************
;********* MAIN PROGRAM ******************
;*****************************************
;**** CREATE AND DISPLAY MENU *****
FUNCTION START                          ;START PROGRAM HERE
BEGIN
  CLEAR DISPLAY                         ;CLEAR THE DISPLAY OF ALL INFORMATION
  MOVE "OPERATOR#:",DISPLAY             ;MOVE THE STRING "OPERATOR#:" TO THE DISPLAY
  LOCATE 1,12                           ;POSITION THE CURSOR TO THE FIRST ROW AND TWELFTH COLUMN
  GET KEYBOARD,1,4,N                    ;GET MINIMUM OF ONE AND MAXIMUM OF FOUR NUMERICS FROM KEYBD
  MOVE INPUT,OPERATOR                   ;MOVE THE INFORMATION IN THE INPUT BUFFER TO STORAGE FOR OPERATOR
  LOCATE 2,1                            ;POSITION THE CURSOR TO THE SECOND ROW AND THE FIRST COLUMN
  MOVE "DATE:",DISPLAY                  ;MOVE THE STRING "DATE:" TO THE DISPLAY
  LOCATE 2,7                            ;POSITION THE CURSOR TO THE SECOND ROW AND THE SEVENTH COLUMN
  GET KEYBOARD,1,6,N                    ;GET MINIMUM OF ONE AND MAXIMUM OF SIX NUMERICS FROM KEYBD.
  MOVE INPUT,DATE                       ;MOVE THE INFORMATION IN THE INPUT BUFFER TO THE STORAGE FOR DATE
*AGAIN                                  ;AGAIN SUBROUTINE LABEL
  CLEAR DISPLAY                         ;CLEAR THE DISPLAY OF ALL INFORMATION
  LOCATE 1,1                            ;POSITION THE CURSOR TO FIRST ROW AND FIRST COLUMN
  MOVE "RECV=1 UPLOAD=2 ",DISPLAY       ;MOVE THE STRING "RECV=1 UPLOAD=2" TO THE DISPLAY
  LOCATE 2,1                            ;POSITION THE CURSOR TO THE SECOND ROW AND THE FIRST COLUMN
  MOVE "EXIT=3 OPTION: ",DISPLAY        ;MOVE THE STRING "EXIT=3 OPTION:" TO THE DISPLAY
  LOCATE 2,15                           ;POSITION THE CURSOR TO THE SECOND ROW AND THE FIFTEENTH COLUMN
  GET KEYBOARD,1,1,N                    ;GET MINIMUM OF ONE AND MAXIMUM OF ONE NUMERIC FROM KEYBD.
```

APPENDIX A-continued

```
COMPARE INPUT,EQ,#1,*RECV_OPT        ;COMPARE THE INPUT BUFFER TO THE VALUE OF ONE, IF EQUAL GOTO RECEIVE SUBROUTINE
COMPARE INPUT,EQ,#2,*UPLOAD_OPT      ;COMPARE THE INPUT BUFFER TO THE VALUE OF TWO, IF EQUAL GOTO UPLOAD SUBROUTINE
COMPARE INPUT,EQ,#3,,*EXIT_OPT       ;COMPARE THE INPUT BUFFER TO THE VALUE OF THREE, IF EQUAL GOTO EXIT SUBROUTINE
JUMP *AGAIN                          ;GOTO LABEL - AGAIN
*RECV_OPT                            ;RECEIVE SUBROUTINE LABEL
  CALL RECEIVE                       ;CALL THE RECEIVE FUNCTION
  CALL PRT                           ;CALL THE PRINT FUNCTION
  JUMP *AGAIN                        ;GOTO LABEL - AGAIN
*UPLOAD_OPT                          ;UPLOAD SUBROUTINE LABEL
  CALL UP                            ;CALL THE UPLOAD FUNCTION
  JUMP *AGAIN                        ;GOTO LABEL - AGAIN
*EXIT_OPT                            ;EXIT SUBROUTINE LABEL
  EXIT                               ;EXIT THE PROGRAM
END
;**********************************
;***** GET DATA FROM CRATE LABEL ***
;**********************************
FUNCTION RECEIVE                     ;START OF RECEIVE FUNCTION
BEGIN
  CLEAR DISPLAY                      ;CLEAR THE DISPLAY OF ALL INFORMATION
  SCANSET 2,77                       ;INITIALIZE THE SCANNER
  MOVE "ENTER PO#",DISPLAY           ;MOVE THE STRING "ENTER PO#" TO THE DISPLAY
  GET KEYBOARD,SCANNER,1,10,N        ;GET MINIMUM OF ONE AND MAXIMUM OF TEN NUMERICS FROM THE KEYBD. OR THE SCANNER
  MOVE INPUT,PO                      ;MOVE THE INFORMATION IN THE INPUT BUFFER TO STORAGE FOR PO
  CLEAR DISPLAY                      ;CLEAR THE DISPLAY OF ALL INFORMATION
  MOVE "CONTAINER#:",DISPLAY         ;MOVE THE STRING "CONTAINER#" TO THE DISPLAY
  GET KEYBOARD,SCANNER,1,20,N        ;GET MINIMUM OF ONE AND MAXIMUM OF TWENTY NUMERICS FROM THE KEYBD. OR SCANNER
  MOVE INPUT,CONTAINER               ;MOVE THE INFORMATION IN THE INPUT BUFFER TO STORAGE FOR CONTAINER
  WRITE HEADER,APPEND                ;WRITE THE HEADER INFORMATION TO THE DATACOLLECT FILE
  CLEAR DISPLAY                      ;CLEAR THE DISPLAY OF ALL INFORMATION
  RETURN                             ;RETURN BACK TO THE CALLING ROUTINE
END
;**********************************
;****** UPLOAD DATA TO PC **********
;**********************************
FUNCTION UP                          ;START OF UPLOAD FUNCTION
BEGIN
  CLEAR DISPLAY                      ;CLEAR THE DISPLAY OF ALL INFORMATION
  MOVE "UPLOADING....",DISPLAY       ;MOVE THE STRING "UPLOADING...." TO THE DISPLAY
  UPLOAD DATACOLLECTFILE             ;UPLOAD THE DATACOLLECT FILE TO HOST - PC
  CLEAR DATACOLLECTFILE              ;CLEAR ALL INFORMATION IN THE DATACOLLECT FILE
  RETURN                             ;RETURN BACK TO THE CALLING ROUTINE
END
;**********************************
;******** PRINT BOX LABELS *********
;**********************************
FUNCTION PRT                         ;START OF THE PRINT FUNCTION
BEGIN
*NEXT_PART                           ;NEXT PART SUBROUTINE LABEL
  CLEAR DISPLAY                      ;CLEAR THE DISPLAY OF ALL INFORMATION
  MOVE "ENTER PART#:",DISPLAY        ;MOVE THE STRING "ENTER PART#" TO THE DISPLAY
  GET KEYBOARD,SCANNER,1,12,N        ;GET MINIMUM OF ONE AND MAXIMUM OFTWELVE NUMERICS FROM KEYBD. OR SCANNER
```

APPENDIX A-continued

```
MOVE INPUT,D_PART                    ;MOVE THE INFORMATION IN THE INPUT BUFFER TO STORAGE D_PART
SEEK START,LOOKUPFILE                ;SEARCH THE THE LOOKUPFILE FROM THE START OF THE FILE
QUERY L_PART,EQ,D_PART,*BAD,*GOOD    ;CHECK TO SEE IF THE LOOKUP PART IS THE SAME AS THE DATACOLLECT PART
*BAD                                 ;BAD SUBROUTINE LABEL
MOVE "NEED PART",COMM                ;MOVE THE STRING "NEED PART" TO COMM PORT
GET COMM,4,4,N                       ;GET MINIMUM OF FOUR AND MAXIMUM OF FOUR FROM COMM PORT
MOVE INPUT,P2                        ;MOVE THE INFORMATION IN THE INPUT BUFFER TO THE PRINT BUFFER POSITION TWO
JUMP *FIN                            ;GOTO FIN LABEL
*GOOD                                ;GOOD SUBROUTINE LABEL
READ LOOKUP                          ;READ IN THE DATA CONTAINED IN THE LOOKUPFILE
MOVE QTY_IN_BOX,P2                   ;MOVE THE CURRENT QUANTITY IN BOX FIELD TO THE PRINT BUFFER POSITION TWO
*FIN                                 ;FIN SUBROUTINE LABEL
MOVE L_PART,P1                       ;MOVE THE CURRENT VALUE IN THE L_PART FIELD TO THE PRINT BUFFER POSITION ONE
CLEAR DISPLAY                        ;CLEAR THE DISPLAY OF ALL INFORMATION
MOVE #0,T_COUNT                      ;MOVE THE NUMBER ZERO INTO THE TEMPORARY COUNTER
PRINT 1,*CONT                        ;PRINT FORMAT ONE AND IF AN EXCEPTION KEY HAS BEEN HIT GOTO CONT LABEL
INC T_COUNT                          ;INCREMENT TEMPORARY COUNTER
*PRT_AGAIN                           ;PRINT AGAIN SUBROUTINE LABEL
PRINT 0,*CONT                        ;PRINT THE LAST FORMAT AGIN WITHOUT RE-IMAGING AND IF EXCEPTION KEY GOTO CONT
INC T_COUNT                          ;INCREMENT TEMPORARY COUNTER
JUMP *PRT_AGAIN                      ;GOTO PRINT AGAIN LABEL
*CONT                                ;CONT SUBROUTINE LABEL
CLEAR DISPLAY                        ;CLEAR THE DISPLAY OF ALL INFORMATION
MOVE "QTY RECVED:",DISPLAY           ;MOVE THE STRING "QTY RECVED:" TO THE DISPLAY
LOCATE 1,13                          ;POSITION THE CURSOR TO THE FIRST ROW AND THE THRITEENTH COLUMN
MOVE T_COUNT,DISPLAY                 ;MOVE THE VALUE IN THE TEMPORARY COUNTER TO THE DISPLAY
MOVE T_COUNT,QTY_RECV                ;MOVE THE VALUE IN THE TEMPORARY COUNTER TO QTY_RECV STORAGE
DELAY 10                             ;DELAY THE PROGRAM ONE SECOND
WRITE DATACOLLECT,APPEND             ;WRITE THE INFORMATION INTO THE DATACOLLECT FILE
CLEAR DISPLAY                        ;CLEAR THE DISPLAY OF ALL INFORMATION
MOVE "ANOTHER PART# ?",DISPLAY       ;MOVE THE STRING "ANOTNER PART# ?" TO THE DISPLAY
LOCATE 2,1                           ;POSITION THE CURSOR TO THE SECOND ROW AND THE FIRST COLUMN
MOVE "YES=1/NO=2:",DISPLAY           ;MOVE THE STRING "YES=1/NO=2:" TO THE DISPLAY
GET KEYBOARD,1,1,N                   ;GET MINIMUM OF ONE AND MAXIMUM OF ONE NUMERIC FROM KEYBOARD
COMPARE INPUT,EQ,#1,,*NEXT_PART      ;COMPARE THE INPUT BUFFER TO THE VALUE OF ONE, IF NOT EQUAL GOTO NEXT PART
RETURN                               ;RETURN BACK TO THE CALLING ROUTINE
END
```

APPENDIX B

```
;Patender Application file
;Aplication:          :
;Author               :
;Date                 :
;************** DEFINITIONS ****************
;
DEFINE TEMPORARY,barcode,12,n    ;BARCODE FIELD
DEFINE TEMPORARY,info,10,a       ;INFO FIELD
DEFINE TEMPORARY,price,10,n      ;PRICE FIELD
DEFINE PRINTER,P1,12             ;BARCODE FIELD
DEFINE PRINTER,P2,10             ;INFO FIELD
DEFINE PRINTER,P3,10             ;PRICE FIELD
;
;*********** COLLECT INFORMATION *******
;********************************
FUNCTION START
BEGIN
   CLEAR DISPLAY                              ;CLEAR THE DISPLAY OF ALL INFOMATION
   MOVE "BARCODE DIGITS:",DISPLAY             ;MOVE THE STRING "BARCODE DIGITS" TO DISPLAY
   GET KEYBOARD,12,12,N                       ;GET MINIMUM OF TWELVE AND MAXIMUM OF TWELVE FROM KEYBD.
   MOVE INPUT,BARCODE                         ;MOVE THE INFORMATION IN THE INPUT BUFFER TO STORAGE BARCODE
   CLEAR DISPLAY                              ;CLEAR THE DISPLAY OF ALL INFORMATION
   MOVE "INFO FIELD:",DISPLAY                 ;MOVE THE STRING "INFO FIELD " TO THE DISPLAY
   GET KEYBOARD,1,10,A                        ;GET MINIMUM OF ONE AND MAXIMUM OF TEN ALPHA CHARACTERS FROM KEYBD.
   MOVE INPUT,INFO                            ;MOVE THE INFORMATION IN THE INPUT BUFFER TO STORAGE INFO
   CLEAR DISPLAY                              ;CLEAR THE DISPLAY OF ALL INFORMATION
   MOVE "PRICE:",DISPLAY                      ;MOVE THE STRING "PRICE" TO THE DISPLAY
   GET KEYBOARD,1,10,A                        ;GET MINIMUM OF ONE AND MAXIMUM OF TEN ALPHA CHARACTERS FROM KEYBD.
   MOVE INPUT,PRICE                           ;MOVE THE INFORMATION IN THE INPUT BUFFER TO STORAGE PRICE
   CALL PRT_SET                               ;CALL THE PRINT SETUP FUNCTION
*AGAIN                                        ;AGAIN SUBROUTINE LABEL
   CLEAR DISPLAY                              ;CLEAR THE DISPLAY OF ALL INFORMATION
   MOVE "UPC=1 CODE39=2",DISPLAY              ;MOVE THE STRING "UPC=1 CODE39=2" TO THE DISPLAY
   LOCATE 2,1                                 ;LOCATE THE CURSOR TO ROW TWO AND COLUMN COLUMN ONE
   MOVE "EXIT=3 OPTION:",DISPLAY              ;MOVE THE STRING "EXIT=3 OPTION:" TO THE DISPLAY
   GET KEYBOARD,1,1,N                         ;GET MINIMUM OF ONE AND MAXIMUM OF ONE NUMERIC FROM KEYBD.
   COMPARE INPUT,EQ,#1,*UPC_OPT               ;COMPARE THE INPUT BUFFER TO THE NUMBER ONE AND GOTO UPC SUBROUTINE IF EQUAL
   COMPARE INPUT,EQ,#2,*CODE39_OPT            ;COMPARE THE INPUT BUFFER TO THE NUMBER TWO AND GOTO CODE39 SUBROUTINE IF EQUA
   COMPARE INPUT,EQ,#3,*AGAIN                 ;COMPARE THE INPUT BUFFER TO THE NUMBER THREE AND GOTO AGAIN LABEL IF NOT EQUA
   EXIT                                       ;EXIT TO THE OPERATING SOFTWARE
*UPC_OPT                                      ;UPC OPTION SUBROUTINE LABEL
   CALL UPC                                   ;CALL THE UPC FUNCTION
   JUMP *AGAIN                                ;GOTO LABEL - AGAIN
*CODE39_OPT                                   ;CODE39 OPTION SUBROUTINE LABEL
   CALL CODE39                                ;CALL THE CODE39 FUNCTION
   JUMP *AGAIN                                ;GOTO LABEL - AGAIN
END
;*********** UPC FUNCTION *************
```

APPENDIX B-continued

```
;*************************************
FUNCTION UPC
BEGIN
    PRINT 1                    ;PRINT FORMAT 1 - THE UPC LABEL
    RETURN                     ;RETURN BACK TO CALLING FUNCTION
END
;************** CODE39 FUNCTION *******
;*************************************
FUNCTION CODE39
BEGIN
    PRINT 2                    ;PRINT FORMAT 2 - THE CODE39 LABEL
    RETURN                     ;RETURN BACK TO CALLING FUNCTION
END
;*************************************
;**** MOVE FIELDS TO PRINT BUFFER ****
;*************************************
FUNCTION PRT_SET
BEGIN
    MOVE BARCODE,P1            ;MOVE THE TEMPORARY FIELD BARCODE TO THE FIRST FIELD IN PRINT BUFFER
    MOVE INFO,P2               ;MOVE THE TEMPORARY FIELD INFO TO THE SECOND FIELD IN THE PRINT BUFFER
    MOVE PRICE,P3              ;MOVE THE TEMPORARY FIELD PRICE TO THE THIRD FIELD IN THE PRINT BUFFER
END
```

We claim:

1. A hand held labeler comprising:

a print driver controllable to print information on a label;

means for inputting data and user selection information to said labeler;

a first memory means for storing data including said print data and information representing a plurality of selectable print formats;

a processor;

a second memory storing software routines according to which said processor operates to control said printer including data collection routines to allow said printer to receive and store in said first memory means print data independent of the selection of a print format, and a print routine for controlling the printing of data by said print driver.

2. A method of operating a hand held labeler having a processor, a first memory storing fixed information, a second memory storing variable information, input means for entering information to said labeler and a print driver controllable by said processor to print information on a label comprising:

storing in said first memory a plurality of output command routines including a print command routine to control a print operation of said print driver, a plurality of data manipulation command routines to control a data manipulation operation and a data collection routine to control an operation for collecting data input to said labeler;

receiving from a remote location information defining each of a plurality of work buffers to be built in said second memory, said information including information representing the size of each of said work buffer;

dynamically allocating space in said second memory to the work buffers defined by said received information;

receiving from said remote location a sequence of commands forming an application program, each command in said application program selecting an associated command routine stored in said first memory for execution by said processor; and storing said received sequence of commands in said second memory.

3. A method of operating a hand held labeler as recited in claim 2 further including the step of executing said selected command routines stored in said first memory in accordance with said sequence of commands forming said application program stored in said second memory.

4. A method of operating a hand held labeler as recited in claim 3 wherein said executing step includes the steps of:

receiving data from said input means;

comparing said received data to data stored in said second memory to determine whether data associated with said received data is stored in said memory; and requesting said associated data from a remote location if said associated data is not stored in said memory.

5. A method of operating a hand held labeler as recited in claim 4 further including the step of controlling said print driver to print the information representing said received data and said associated data.

6. A method of operating a hand held labeler as recited in claim 3 wherein said executing step includes the steps of:

receiving a look up file from a remote location;

storing said look up file in a work buffer of said second memory;

receiving data from said input means;

modifying said look up file with said received data; and transmitting said modified look up file to said remote location.

7. A hand held labeler comprising:

a print driver controllable to print information on a label;

means for inputting data to said labeler from a plurality of input sources;

a first memory means for storing data;

a second memory means for storing software routines according to which said processor operates to control said labeler including a data collection routine to control the collection of data input to said labeler from said plurality of input sources for storage in said first memory, a plurality of data manipulation command routines to automatically move selected data in said first memory in association with other not previously associated data stored in said first memory, and a plurality of output command routines including a print command routine to control said print driver to print associated data.

8. A printer comprising:

a print driver controllable to print information on a label;

means for inputting data to said printer from a plurality of input sources;

a first memory means for storing data;

a second memory means for storing software routines according to which said processor operates to control said printer including a data collection routine to control the collection of data input to said printer from said plurality of input sources for storage in said first memory, a plurality of data manipulation command routines to automatically move selected data in said first memory in association with other not previously associated data stored in said first memory, and a plurality of output command routines including a print command routine to control said print driver to print associated data.

* * * * *